(12) United States Patent
Joyce et al.

(10) Patent No.: US 10,356,022 B2
(45) Date of Patent: Jul. 16, 2019

(54) SYSTEMS AND METHODS FOR MANIPULATING AND/OR CONCATENATING VIDEOS

(71) Applicant: Movy Co., Wilmington, DE (US)

(72) Inventors: Christopher Joyce, Wilmington, DE (US); Max Martinez, Barranquilla (CO)

(73) Assignee: Movy Co., Wilmington, DE (US)

( * ) Notice: Subject to any disclaimer, the term of this patent is extended or adjusted under 35 U.S.C. 154(b) by 273 days.

(21) Appl. No.: 15/324,510

(22) PCT Filed: Jul. 2, 2015

(86) PCT No.: PCT/US2015/039021
§ 371 (c)(1),
(2) Date: Jan. 6, 2017

(87) PCT Pub. No.: WO2016/007374
PCT Pub. Date: Jan. 14, 2016

(65) Prior Publication Data
US 2017/0201478 A1    Jul. 13, 2017

Related U.S. Application Data

(60) Provisional application No. 62/021,163, filed on Jul. 6, 2014, provisional application No. 62/026,635, filed
(Continued)

(51) Int. Cl.
| | | |
|---|---|---|
| H04L 12/58 | (2006.01) | |
| H04L 29/06 | (2006.01) | |
| H04N 21/2743 | (2011.01) | |
| H04N 21/235 | (2011.01) | |
| H04N 21/437 | (2011.01) | |
| H04N 21/63 | (2011.01) | |
| H04N 21/854 | (2011.01) | |
| H04N 21/8549 | (2011.01) | |

(Continued)

(52) U.S. Cl.
CPC .............. *H04L 51/10* (2013.01); *H04L 51/14* (2013.01); *H04L 51/16* (2013.01); *H04L 51/24* (2013.01); *H04L 67/42* (2013.01); *H04N 21/2353* (2013.01); *H04N 21/2743* (2013.01); *H04N 21/437* (2013.01); *H04N 21/632* (2013.01); *H04N 21/854* (2013.01); *H04N 21/8549* (2013.01)

(58) Field of Classification Search
USPC ........................................................ 709/219
See application file for complete search history.

(56) References Cited

U.S. PATENT DOCUMENTS

| | | | |
|---|---|---|---|
| 2012/0206558 A1* | 8/2012 | Setton | H04N 7/147 348/14.03 |
| 2012/0206560 A1* | 8/2012 | Setton | H04N 7/147 348/14.08 |

(Continued)

*Primary Examiner* — Jude Jean Gilles
(74) *Attorney, Agent, or Firm* — McCarter & English, LLP

(57) ABSTRACT

Exemplary embodiments of the present disclosure are directed to manipulating and/or concatenating videos, and more particularly to (i) compression/decompression of videos; (ii) search and supplemental data generation based on video content, (iii) concatenating videos to form coherent, multi-user video threads; (iv) ensuring proper playback across different devices; and (v) creating synopses of videos.

18 Claims, 50 Drawing Sheets

Related U.S. Application Data on Jul. 19, 2014, provisional application No. 62/028,299, filed on Jul. 23, 2014, provisional application No. 62/066,322, filed on Oct. 20, 2014, provisional application No. 62/119,160, filed on Feb. 21, 2015.

(51) Int. Cl.
*G06F 15/16* (2006.01)
*H04N 7/14* (2006.01)

(56) References Cited

U.S. PATENT DOCUMENTS

| | | | |
|---|---|---|---|
| 2015/0222682 A1* | 8/2015 | Lewis | H04N 21/44016 715/719 |
| 2015/0264303 A1* | 9/2015 | Chastney | H04N 7/147 709/206 |
| 2015/0264304 A1* | 9/2015 | Chastney | H04N 7/147 715/719 |
| 2015/0264305 A1* | 9/2015 | Chastney | G06F 3/0488 715/719 |
| 2015/0264312 A1* | 9/2015 | Chastney | H04N 7/148 715/719 |

* cited by examiner

Device Structure

Playback UI showing embedded hotspot with information

Playback UI showing embedded hotspot with url link

Playback UI showing embedded hotspot with calendar link

Create task (Calendar) with tapping hotspot

Video Frame Magnification to show pixels

Color information for each pixel

Calculation of fractal dimension

Device Elements

Video attributes stored in video metadata

SYSTEMS AND METHODS FOR MANIPULATING AND/OR CONCATENATING VIDEOS

CROSS REFERENCE TO RELATED APPLICATIONS

Related Applications

This application is a nation J stage application filed under 35 USC 371 of PCT/US2015/039021, filed Jul. 2, 2015, which claims priority to: (i) U.S. Provisional Application No. 62/021,163, filed on Jul. 6, 2014; (ii) U.S. Provisional Application No. 62/026,635, filed on Jul. 19, 2014; (iii) U.S. Provisional Application No. 62/028,299, filed on Jul. 23, 2014; (iv) U.S. Provisional Application No. 62/066,322, filed on Oct. 20, 2014; and (v) U.S. Provisional Application No. 62/119,160, filed on Feb. 21, 2015, the disclosures of which are incorporated by reference herein in their entirety.

TECHNICAL FIELD

Exemplary embodiments of the present disclosure are directed to manipulating and/or concatenating videos, and more particularly to (i) compression/decompression of videos; (ii) search and supplemental data generation based on video content, (iii) concatenating videos to form coherent, multi-user video threads; (iv) ensuring proper playback across different devices; and (v) creating synopses of videos.

BACKGROUND

Video can be effective for capturing and communicating with others and has become increasingly important, not only for unilateral broadcasting of information to a population, but also as a mechanism for facilitating bidirectional communication between individuals. Recent advance in compression schemes and communication protocols has made communicating using video over cellular and data networks more efficient and accessible. As a result, applications or "apps" that generate video content are fast becoming the preferred mode of sharing, educating or advertising products or services. This content is increasingly being designed for and viewed on mobile devices such as smartphones, tablets, wearable devices, etc. When video content is shared, there is a need for efficient data transfer through wired and/or wireless cellular and data networks. However, there remains challenges to the use and distribution of video over cellular and data networks.

One such challenge is the constraints associated with bandwidth for transmitting video over networks. Typically, the (memory) size of a video can be dependent on a length of the video. For example, raw digital video data captured at high resolution creates a large data file that is often too large to be efficiently transmitted. Under the transmission constraints of some networks, if a sender captures a video in high resolution, and transmits it to a recipient, the recipient may have to wait for seconds or minutes before the video is received and render. This time lag is both inconvenient and unacceptable.

To minimize the strain on mobile networks, video content is most often transmitted in compressed form. Videos are compressed by hardware or software algorithms called codecs. These compression/decompression methods are based on removing the redundancy in video data (Wade, Graham (1994). Signal coding and processing (2 Ed.). Cambridge University Press. p. 34. ISBN 978-0-521-42336-6). Video data may be represented as a series of still image frames. When displayed to the viewer at frame rates greater than 24 frames per second, the viewer perceives that the image is in motion, i.e. a video. For example, the noted algorithms analyze each frame and compare them to adjacent frames to look for similarities and differences. Instead of transmitting each entire frame, the codec only sends the differences between a reference frame and subsequent frames. The video is then reconstructed frame by frame based on this difference data. Some of these methods are inherently lossy (i.e. they lose some of the original video quality) while others may preserve all relevant information from the original, uncompressed video.

Such frame-based compression can be done by either transmitting (i) the difference between the current frame and one or more of the adjacent (before or after) frames, referred to as "interframe"; or (ii) the difference between a pixel and adjacent pixels of each frame (i.e. image compression frame by frame) referred to as "intraframe". The interframe method is problematic for mobile transmission because if and when the data connection is momentarily lost, the reference frame is lost and has to be retransmitted with the difference data. The intraframe method solves this issue and is therefore more commonly used for digital video transmission.

Examples of the most prevalent methods include MPEG-4 Part 2 or H.263 or MPEG-4 Part 10 (AVC/H.264) or the more recent H.265. Finally, these codecs may be further optimized for mobile phone network transmittal such as the 3GP or 3G2 standard.

The size of these frame-based compression methods is still dependent on the initial size of the raw digital video file and encodes and then decodes each frame one by one. Therefore they are all dependent on the duration of the raw video. For example a video that was recorded in 480p (i.e. 480×640 pixels) and with a duration of 1 minute creates a MPEG-4 video file of 28.2 MB. This 1 minute video file, when uploaded with a 3G wireless network connection (data transmission rate of 5.76 mbps or 0.72 MB/sec), takes approximately 39 seconds to upload. However, for the same 1 minute video at 1080p or HD resolution, the upload time balloons to 164 seconds or 2 minutes and 44 seconds. Although faster HSDPA and LTE data protocols are prevalent in North America, they only make up approximately 10-15% of all the world's 7 billion mobile phone users currently.

Another challenge regarding the use and distribution of video as a means of communicating, is the lack of a user-friendly, resource efficient platform that allows users to create video messing threads. For example, in recent years, a wide variety of text messaging applications or "apps" have been introduced for use on phones, smartphones and laptops. While many of these apps provide for the addition of images and videos into the text message thread, these conventional apps, are not designed or optimized for video messaging as they require multiple steps to create and send the video messages. These multiple steps are both cumbersome and on most devices not intuitive.

To illustrate this point conventional text messaging applications, such as native text messaging applications on phones or smartphones (e.g. WhatsApp Messenger from WhatsApp Inc., Facebook Messenger from Facebook, Kik Messenger from Kik Interactive Inc., etc.), typically require iterative interactions between the user and the user's phone (e.g., tapping a button, adding text, and swipe or other gestures) before a video can be incorporated into the text messaging application. For example on an Apple iPhone 5

(iOS version 6.1.4), creating a video message using the native "Messages" app requires a minimum of nine (9) distinct user steps or interactions. A similar number of user steps are required for a user to respond to a video message with another video message. This is not only time consuming and cumbersome requiring the user to first identify the correct steps and then execute them quickly and without error, but also an inefficient use of computing resources.

Some conventional video sharing apps offer some improvement in both the number of steps and time required to create a video using a mobile device. Examples of such video sharing apps are Keek from Keek Inc., Vine from Vine Labs, Inc., Viddy from Viddy Inc. Instagram video from Facebook. Creating a video message in these conventional video sharing applications, however, also requires multiple steps. For example on a Samsung Galaxy Note 2 (OS version 4.1.2), creating and sending a video message using Facebook's Instagram video app requires six (6) distinct steps. Additionally, most of these conventional video sharing apps, with the exception to Keek, cannot be used for video messaging (e.g., an exchange of sequential videos between individuals including video messages and video responses) as there is no capability to respond to the initial video message with a video message. Furthermore, most of these apps upload the videos to application servers in the app foreground, therefore suspending the use of the device until the video uploads, resulting in an inefficient use of computing resources.

Some conventional video messaging apps offer further improvement in both the number of steps and time as compared to text messaging and video sharing platforms. See U.S. Patent Application 20130093828. Examples of such conventional video messaging apps are Snapchat from Snapchat Inc., Eyejot from Eyejot, Inc., Ravid Video Messenger from Ravid, Inc., Kincast from Otter Media, Inc., Skype video messaging from Microsoft and Glide from Glide Talk, Ltd. These conventional video messaging apps, however, still maintain the format and structure of text based messaging. This message and response framework works well for text based messages, but is still slow, cumbersome and difficult to navigate with video messages and responses.

Furthermore, while some video platforms allow video to be delivered with additional features and functionalities, such as text transcripts and clickable hot spots that link to other content or information, the manner in which there additional features and functionalities are associated with or included in a video can also require additional steps or time, which introduces inefficiencies into providing supplemental information in or with videos that are distributed. For example, in the case of YOUTUBE, speech recognition is performed by a speech to text recognition engine or manually by the author after a video is uploaded to a remote server. This process of creating the text transcript can take several minutes to hours depending on the several factors. U.S. Patent Publication No. 2012/0148034 describes a method for transcribing speech.

Some conventional video platforms can be used to embed supplemental data, such as hot spots, into a video after a video has already been created such that the hotspots can be added to over overlaid on the video. As one example, when a hotspot in a video is scrolled over, the video can pause and the hotspot become active providing either information or links to additional information. As another example, U.S. Patent Publication No. 2012/0148034 provide for the ability of the author or a recipient a video to pause the playback of the video at a particular time and record a response in context to the content of the original message included in the video. When the original message is viewed for playback, the author or a recipient will be able to hear or see the message and see the embedded hot spot or thumbnail showing a response. When this thumbnail is clicked, the recipient is taken to the response recorded earlier. As with the earlier cited prior art, these hot spots are added only after the initial video is complete and viewed or reviewed upon playback (i.e., the prior art requires that the speech recognition and transcription take place only after the completion or upload of the video).

The slow and tedious video creation process of conventional apps cannot or does not easily facilitate the (i.) creation of video messages and responses (herein "video thread"); (ii.) creation of video thread by multiple users or respondents; (iii.) communication and collaboration between users where context and tonality is required; (iv.) creation of multi user or crowdsourced video content to be used to communicate information about an activity, product or service; and (v.) addition of supplemental content to videos.

Furthermore, the present disclosure relates to multimedia (e.g., picture and video) content delivery, preferably over a wireless network. Particularly, the present disclosure relates to dynamically optimizing the rendering of multimedia content on wireless mobile devices. Still more particularly, the present disclosure relates to the dynamic rendering of picture or video content regardless of device display orientation or dimensions or device operating system embellishments.

Another challenge is that devices on which videos are played back have different specifications and hardware configuration, which can result in the video being improperly displayed. For example, the use of mobile devices tethered to a wireless network is fast becoming the preferred mode of creating and viewing a wide variety of image content. Such content includes self-made or amateur pictures and videos, video messages, movies, etc. and is created on hand-held mobile devices. Furthermore, this content is delivered to a plurality of mobile devices and is rendered on the display of these devices. These mobile devices, such as mobile smartphones, are manufactured and distributed by a multitude of original equipment manufacturers (OEMs) and carriers. Each of these devices has potential hardware and software impediments that prevent the delivered content from being viewed "properly," e.g., rendering of the picture or video in the correct orientation (and not rotated 90° to the right or left or upside down) based on the orientation that the playback device is held and in the same aspect ratio as when captured or recorded. These impediments include differing display hardware, resolutions, aspect ratios and sizes as well as customized software overlays that alter the native operating system's (OS) display. For example, often the created video is of a different resolution and/or aspect ratio than the device that it is being viewed on. This creates a mismatch and the video is not properly rendered on the recipient's screen.

Specifically, some faults that can negatively affect viewing or playback of an image include the image rotated to an orientation other than the orientation of the playback device and image not rendered in the aspect ratio that the image was initially captured or recorded. For examples, rendered videos on playback devices can be rotated 90° to left or right or rotated 180° (upside) down or vertically or horizontally compressed or stretched or in some cases, only a portion of the video may be rendered. In the most severe case, the video may not render at all and the application terminates or crashes.

These faults can be caused by the inability of the playback device to read the encoded metadata that accompanies the video file. This metadata can contain information about the image such as its dimensions (resolution in width and height dimension), orientation, bitrate, etc. This information is used by the playback device's OS and picture or video playback software (or app) to correctly render the image on its display. The inability to read the encoded metadata can stem from the use of older OS, the picture or video is converted to an incompatible format or is resized that strips this metadata outright, or other. Examples of this older operating system incompatibility may be found in the Android OS prior to its API Level 17 or Android 4.2 release. In devices operating with OS versions prior to this, the orientation metadata is not recognized and used. There are also situations when the PBD's OEM has modified the OS with overlays. Such modifications can prevent the PBD from properly reading some or all of the picture or video metadata causing the image to be rendered incorrectly.

In a small, discrete universe of devices, these impediments can be addressed and overcome using a monolithic operating system such as the iOS operating system from Apple, Inc. In the case of a family of devices, the number of unique devices and display dimensions or resolutions is low, e.g. approximately 20 devices and approximately 5 unique versions of the iOS operating system. The corrections to the application delivering the image content are made on a case by case basis for each device and OS version.

However, for devices and operating systems, such as the Android OS from Google Inc., that are open source and allow for a large amount of hardware and OS variation, the number of unique device-OS combinations number in the thousands. Additionally, due to the nature of this industry, new devices are introduced on a daily basis. Therefore corrections for image resolution mismatches, orientation errors and software issues quickly become impossible to address on a case-by-case basis.

The industry has addressed this issue by using detailed libraries in the code that provide the necessary information for each possible device and their respective display sizes, aspect ratios and software limitations. By using a detailed library, when a particular device calls for a playback, the image is delivered and the app compares the playback device specifications to the library and makes the suitable corrections. This methodology is inefficient, in part, because of the delay from using an additional application that contains an extensive device library. It is also prone to error because of the necessity of the library to be constantly updated. See U.S. Pat. Nos. 8,359,369; 8,649,659; and 8,719,373; and U.S. Patent Publications Nos. 20130103800; 20120240171; 20120087634; and 20110169976, each of which are incorporated by reference in their entirety.

The present disclosure relates to a system and method of rendering any image, e.g., playback of a video, regardless of resolution or initial orientation, on any playback device with display resolutions, orientations, OS's and modifications different from the capturing device, such that the image is rendered without anomalies or faults.

SUMMARY

Exemplary embodiments of the present disclosure are directed to manipulating and/or concatenating videos, and more particularly to (i) compression/decompression of videos; (ii) search and supplemental data generation based on video content, (iii) concatenating videos to form coherent, multi-user video threads; (iv) ensuring proper playback across different devices; and (v) creating synopses of videos.

Embodiments of the present disclosure relate to video messaging. For example, the present disclosure relates to a series of video messages and responses created on a mobile device or other camera enabled device. Still more particularly, the present disclosure is related to multi user generated video messages for the purpose of sharing, collaborating, communicating or promoting an activity, product or service.

Systems and methods of creating, organizing and sharing video messages are disclosed. Video messages and video responses (herein video thread) created for the purpose of collaborating, communicating or promoting an activity, product or service is provided. To create a thread of videos, a program or application is used which can be run on a mobile device such as a smart phone. Unlike current text based messaging applications, this application can be completely video based and can capture a video message with, for example, only one or two screen taps. The video threads hereby created may be simple messages and responses, instructions, advertisements or opinions on specific topic or product. It may be between two users or hundreds of users using the aforementioned application to create video responses appended to the original thread. As such, a simplified process of creating a video message (i.e. requiring less steps) which is user intuitive. This simplification includes minimizing the number of UI interaction steps required to create the video.

In accordance with embodiments of the present disclosure, systems and methods for forming a multi-user video message thread are disclosed. The systems can include data storage device storing video messages and one or more servers having one or more processors operatively coupled to the data storage device. The server is operative coupled to a communication network and is programmed to perform one or more processes. The processing and methods can include receiving, at the server(s) via the communication network, a video message captured by a first user device. The video message can be associated with a first user account and can be stored in a database by the server. The processing and methods can also include transmitting, by the server(s) via the communication network, a notification to a contact associated with the user account that the video message is viewable by the contact; and receiving, by the server(s) via the communication network, in response to the notification, a response video message captured by a second user device. The response video message can be associated with a second user account belonging to the contact and can be stored in the database by the server. The processing and methods can also include forming, by the server(s) a video thread that includes the video message and the response video message and streaming the video thread to a third user device to facilitate playback of the video message and the response video message in sequence by the third user device.

In accordance with embodiments of the present disclosure, a further response video message to the video thread can be received by the server(s) from the third user device, and can be added to the video thread by the server(s). The server(s) can stream the video thread to one of the first user device, the second user device, or a fourth user device to facilitate playback of the video message, the response video message, and the further response video message in sequence by the first user device, the second user device, or the fourth user device.

In accordance with embodiments of the present disclosure, an indication from the first user device indicating that the user associated with the first user account wishes to share the video message with the contact can be received by the server(s) via the communications network.

In accordance with embodiments of the present disclosure, the contact can be prevented from distributing the video message to others by the server(s).

In accordance with embodiments of the present disclose, an indication from the first user device indicating that the user associated with the first user account wishes to share the video message with all contacts associated with the first user account can be received by the server via the communications network.

In accordance with embodiments of the present disclosure, supplemental data to embed in the video message or the response video message can be generated based on a transcription of an audio component of the video message or the response video message and a comparison of words or phrases included in the transcription to a library of words. The server(s) embed the supplemental data in the video message or the response video message upon determining that one of the words or phrases included in the transcription are also included in the library of words. The supplemental data can be embedded in the video message or response video message so that display of the supplemental data is aligned with an occurrence of the one of the words or phrases during playback. The supplemental data can include a selectable object that is selectable during playback of the video message or during playback the response video message and selection of the selectable object causes one or more actions to be performed.

Exemplary embodiments of the present disclosure can relate to using speech recognition to provide a text transcript of the audio portion of the video. For example, exemplary embodiments of the present disclosure can relate to the simultaneous recording and audio transcription of a video message such that the text transcript is available immediately after recording. With this same-time transcription during video recording, additional features can be incorporated into the video messages that are visible during playback.

Systems and methods of adding synchronous speech recognition and embedded content to a video and video messages are disclosed. The systems and methods can utilize the user's device and built-in device speech recognition capabilities to create a text transcript of the video. This synchronous speech recognition allows for faster delivery of additional information and features with the video message to the recipient. These include the ability to search for videos based on content or topic. These also include the addition of embedded information and functionalities to the video message when it is delivered to the recipient. These embedded features are created automatically by the app recognizing certain key words or phrases contained in the video message (e.g., used by the author). For example if the author creates a video message wherein he uses the words meeting and a specific date, the app will display an embedded calendar icon to the recipient when viewed. If the recipient wishes to add this meeting to their calendar, he simply needs to click on the calendar icon during playback and a new meeting is created in his device's calendar application associated with the video message author's name and indicated date.

In accordance with embodiments of the present disclosure, systems and methods for embedding supplemental data in a video file are disclosed. The systems can include a data storage device and one or more servers having one or more processors. The data storage device can store a video file and a transcription of an audio component of the video file and the processor(s) of the server(s) can be operatively coupled to the data storage device. The server(s) can be programmed to perform one or more processes. The processes and methods can include generating supplemental data to embed in the video file based on the transcription of the audio component of the video file and a comparison of words or phrases included in the transcription to a library of words. The supplemental data can be embedded in the video file upon determining that one of the words or phrases included in the transcription are also included in the library of words. The supplemental data can be embedded in the video file so that display of the supplemental data is aligned with an occurrence of the one of the words or phrases during playback. The supplemental data can include a selectable object that is selectable during playback of the video file and selection of the selectable object causes one or more actions to be performed.

Exemplary embodiments of the present disclosure can relates to video content uploaded or downloaded from a mobile device or computer. For example, exemplary embodiments of the present disclosure can relate to systems and methods for compressing and decompressing videos and/or video messages to minimize their size during delivery through wireless phone networks and the internet. Given that the prior art requires that the each frame is compressed based on difference information, there is a need for a more efficient compression method that is independent of the number of frames or pixels and therefore independent of the length or duration of the video. Specifically there is (i) a need for more efficient transfer (i.e. smaller data files) through slower networks to facilitate video messaging with minimal delay and (ii) a need for a compression and decompression method that is not dependent on the length of a video. To efficiently compress the video data, exemplary embodiments of the present disclosure can characterize the color values for each pixel for every frame and generate a fingerprint based on the characterization. Therefore, instead of sending frame by frame color data, only the fingerprint is sent. In some embodiments, the fingerprint can consist of only two numbers for each color element (i.e. red, green and blue) for a total of six numbers per pixel.

In accordance with embodiments of the present disclosure, systems and methods for compressing and/or decompressing a video file are disclosed. The systems can include a data storage device and a processing device operatively coupled to the data storage device. The data storage device can store a data file corresponding to a video file, where the data file represents a compressed version of the video file. The processor can be programmed to execute one or more processes. The processes and methods can include creating a numerical fingerprint for each pixel in a video file; and creating a data file containing the numerical fingerprint for each of the pixels of each of the video frames. The (memory) size of the data file is independent of a number of video frames included in the video file. The fingerprint can be created by creating a fingerprint of the color data for each pixel as a function of time. The fingerprint can be created by calculating a fractal dimension for each pixel, the fractal dimension representing the fingerprint. The data file can be created by including the fractal dimension for each pixel and a total duration of the video in the data file.

The processes and methods can also include obtaining a data file from a data storage device. The data file can represent a compressed version of a video file include a fractal dimension for each pixel and a total duration of the video included in the video file. The processes and methods can also include recreating the video file by creating a proxy plot for each color; and adjusts color values for the proxy plot until a simple linear regression converges to the fractal dimensions included in the data file.

In accordance with exemplary embodiments, systems and methods of rendering images, e.g., pictures, videos, etc., on electronic devices, e.g., mobile device displays, irrespective of their display sizes, OS level or modifications and rendering or playback orientation are disclosed. The systems and methods can include using a cloud storage server to extract elements of the encoded image metadata in order to transmit the information directly to the rendering or playback device when called for. By extracting and sending separately, the system and method enables rendering or playback in the correct orientation and in the same aspect ratio as when captured or recorded regardless of the device's display size, OS version or OS modification.

In some embodiment, the present disclosure can relate to a method for multimedia content delivery comprising providing a multimedia file on an electronic device, wherein the file has metadata related to its display orientation and dimensions, such as display size, aspect ratio and orientation angle, reading some or all of the metadata, extracting some or all of the metadata, adding the extracted metadata to the image file, and transferring the metadata to a playback device wherein the playback device is capable of rendering the image with the correct orientation and dimensions.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The present disclosure is better understood from the following detailed description when read in connection with the accompanying drawings. It should be understood that these drawings, while indicating preferred embodiments of the disclosure, are given by way of illustration only.

DETAILED DESCRIPTION OF THE INVENTION

Figure 1:
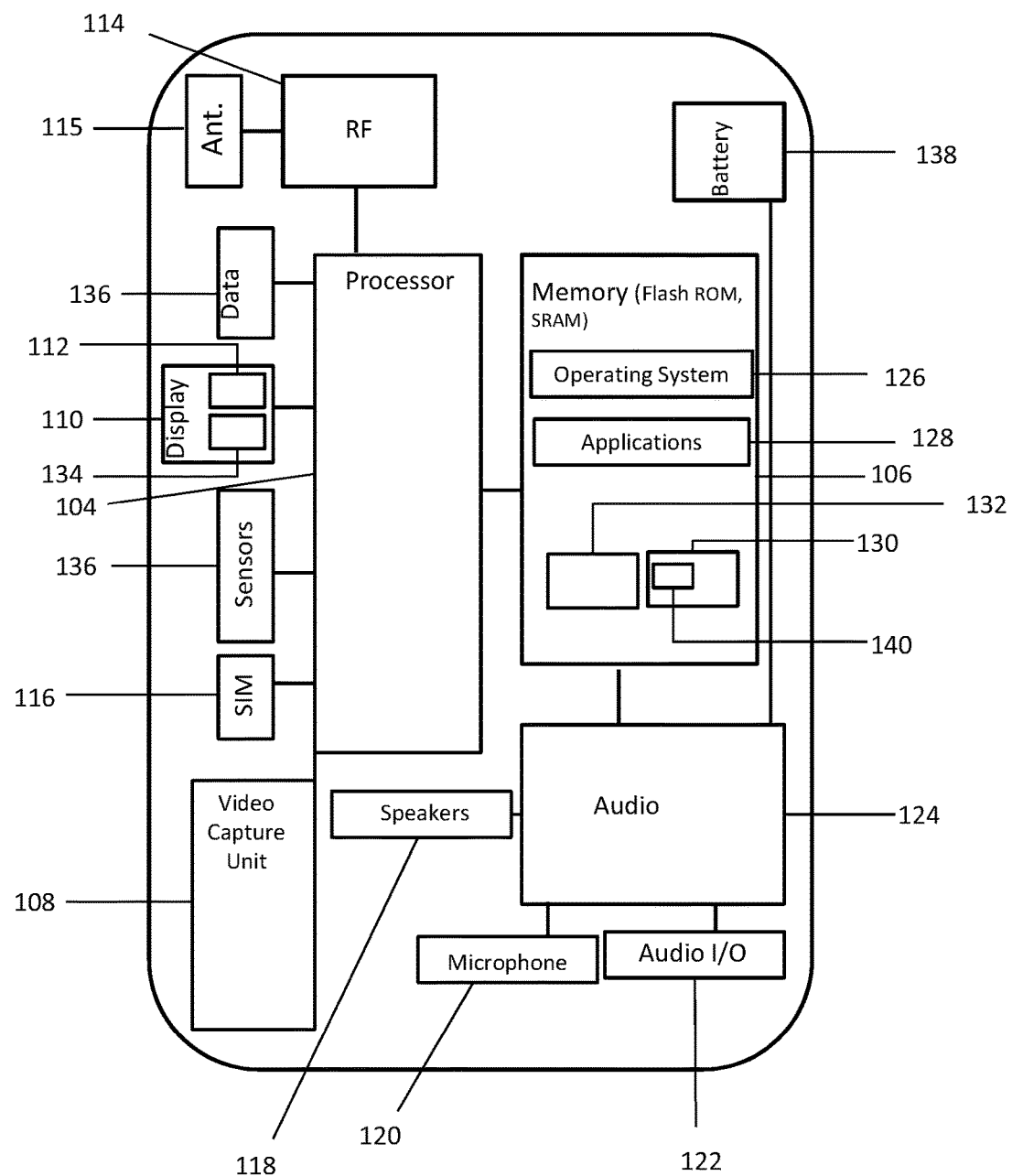
FIG. 1 is a block diagram of an exemplary user device for implementing exemplary embodiments of the present disclosure.

Exemplary embodiments of the present disclosure are related to the generation, manipulation, and/or concatenating of video. While exemplary embodiments may be described in relation of one or more non-limiting example applications (e.g., video messaging), exemplary embodiments of the present disclosure have broad applicability beyond such example applications. For example, the manipulation of video by data compression/decompression schemes and the introduction of supplemental data with or to a video are generally applicable to the transmission of video over networks and the conveyance of information that supplements a video, respectively.

The present disclosure provides for rapidly create a series of video messages (video thread) for the purpose of collaborating, communicating or promoting an activity, product or service. The videos can be organized with a thread starter created by a user and then followed by multiple video "responses" created by the user or other users. In this way the user can send a video message to another user or users detailing some activity, product or service. The message recipient can send a video response to the initial message and this message can then be appended chronologically to the initial message. Further responses and responses to responses may be additionally appended to the initial two videos to make up a video message thread.

This video thread can be created by an application or "app" that runs on a mobile or wearable device. Examples of such devices include but are not limited to cell phones, smart phones, wearable devices (smart watch, wrist bands, camera enabled eye spectacles, etc.) and wireless enabled cameras or other video capture devices. This "app" can be completely video based and in some embodiments does not require the text based structure of current "apps" designed for text messaging. It can be designed such that a video messages can be created and sent in as little as one or two screen taps.

Exemplary embodiments of the present disclosure can (i.) create and send video messages in the least number of user steps as possible to one or multiple recipients; (ii.) create and send video messages to any recipient, regardless of whether they have the app installed on their mobile device or not; (iii.) create video message responses from one or multiple recipients; (iv.) append the responses to the initial video message, thus creating a video thread; (v.) display these video message threads; (vi.) display information about the video messages such as the author, time and location of recording, number of responses, etc.; (vii.) notify the user about new video messages or information such as the delivery status notifications (return receipt), number of responses, number of views and rating; and (viii.) facilitate the sharing of an individual video message or video message thread to another user or third party as a continuous video with the video messages in the thread merged one after another.

The present disclosure also provides for rapidly deliver of both search capabilities and additional embedded in the digital video data in general or a video message. These additional functionalities enhance the nature of the conversation or collaboration as well as increase the productivity of the author and recipient. To enable these functionalities, exemplary embodiments of the present disclosure can transcribe the spoken content of a digital video and the transcription can be processed to identify words or phrases, which trigger one or more operations for automatically generating and/or associating supplemental data with the digital video.

The present disclosure provides for compressing and decompressing digital video data in generally or a video message. To efficiently compress the video data, exemplary embodiments of the present disclosure can characterize and generate fingerprints for color values for each pixel of every frame in the digital video data. As a result, instead of sending color data frame by frame, exemplary embodiments only send the fingerprint, which in some embodiments, can include only two numbers for each color element (i.e. red, green and blue) for a total of six numbers per pixel.

Exemplary embodiments can utilize a user's device and/or cloud server to compress video content or video messages for efficient transmission over cellular and/or data networks (e.g., the Internet) by forming a fingerprint of the entire video content or video messaging having a fixed size regardless of the length of the recording, and compressing and decompressing the fingerprint.

The disclosures of all cited references including publications, patents, and patent applications are expressly incorporated herein by reference in their entirety.

The present disclosure is further defined in the following Examples. It should be understood that these Examples, while indicating preferred embodiments of the invention, are given by way of illustration only.

As used herein the term(s) applications or "apps" refers to a program running on a mobile device in native form or on a web browser using a hypertext markup language such as HTML5.

As used herein the term(s) text messaging with video refers to applications that are specifically for text messaging but have the capability of sending and receiving videos as well.

As used herein the term(s) video sharing refers to applications that are designed for sharing short video segments or messages to the user community.

As used herein the term(s) video messaging refers to applications that are specifically designed for messaging in video, but retain the structure of the text message applications.

As used herein the term(s) video message or post refers to an individual video created or uploaded into the application.

As used herein the term(s) video thread refers to a series of video messages or segments containing a thread starter video followed by responses by any user within the user community.

As used herein the term(s) stream refers to a series of video threads with the first or initial video message (thread starter video) previewed on the application's user interface.

As used herein the term(s) user refers to a person with the application and the credentials to create send and receive video messages.

As used herein the term(s) original user refers to the thread starter video message.

As used herein the term(s) user community refers to the community of persons with the application and the credentials to create send and receive video messages.

As used herein the term(s) third party refers to an individual who does not have the application and the credentials to create send and receive video messages.

As used herein the term(s) crowdsourced thread refers to a video thread created by multiple users.

As used herein the term(s) home screen refers to the main screen of the application showing the individual video threads and user interface elements for navigation and creating a video message.

As used herein the term(s) gestures refer to any user interaction (e.g. hand or finger) with the user interface such as a swipe, tap, tap & hold used to create, respond to or navigate between video messages.

As used herein the term(s) public post or message refers to a message sent to all users in the user community As used herein the term(s) private post or direct message refers to a message sent to a specific user in the user community.

As used herein the term(s) stream playback refers to auto-play comments in the order they have been posted in order to follow the discussion flow.

As used herein the term(s) CDN refers to Content Delivery Network powered by Amazon S3 that hosts the video and thumbnail (previews) files to make them easily available on multiple servers and locations.

As used herein the term(s) GCM refers to Google Cloud Messaging service used for push notifications.

As used herein the term(s) ASYNC Notifications refers to parallel APi calls for faster responses.

As used herein the term(s) unclaimed profiles refers to recipients of video messages that are not part of the app user base.

As used herein the term(s) video message or post refers to an individual video created or uploaded into the application.

As used herein the term(s) video content refers to digital video content.

As used herein the term(s) pixel refers to the smallest unit of a video frame.

As used herein the term(s) compression refers to size reduction of a digital video data file.

As used herein the term(s) decompression refers to the reconstruction of the digital video file.

As used herein the term(s) codec refers to the software method or algorithm that compresses and decompresses the video file.

As used herein the term(s) fractal dimension D refers to the calculated dimension of a line created by the plot of the video color data. In this disclosure, the box counting method is used to calculate the fractal dimension.

As used herein the term(s) color number refers to the color information defining the color of each pixel. The color information consists of the constituent red, blue and green values each ranging between 0 and 255. They are represented in multiple forms including arithmetic, digital 8-bit or 16-bit data.

As used herein the term(s) upload refers to act of transmitting the compressed video file to application servers through the internet or mobile networks.

As used herein the term(s) download refers to act of transmitting the compressed video file from application servers to the recipient's device through the internet or mobile networks.

As used herein the term(s) bandwidth refers to the network speed in megabit per second or mbps. One million mbps equals 0.125 Megabytes per second (MB/sec) data transmission rate.

As used herein the term(s) network refers to mobile network bandwidths such as 2G, 3G, 4G, LTE, wifi, super-wifi, bluetooth, near field communication (NFC).

As used herein the term(s) network refers to digital cellular technologies such as Global System for Mobile Communications (GSM), General Packet Radio Service (GPRS), CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

As used herein the term(s) video resolution refers to the size in pixels of the video recording frame size. For example 480p refers to a frame that is 480 pixels tall and 640 pixels wide containing a total of 307,200 pixels. Other examples include 720p and 1080p.

As used herein the term(s) video frame speed of fps refers to the frame rate of the video capture or playback. In most cases this is between 24 and 30 frames per second.

I. Exemplary User Device

FIG. 1 depicts a block diagram of an exemplary user device 100 in accordance with exemplary embodiment of the present disclosure. The user device 100 can be a smartphone, tablet, subnotebook, laptop, personal computer, personal digital assistant (PDA), and/or any other suitable computing device that includes or can be operatively connected to an video capture device and can be programmed and/or configured to implement and/or interact with embodiments of a video messaging system. The user device 100 can include a processing device 104, such as a digital signal processor (DSP), microprocessor, and/or a microcontroller; memory/storage 106 in the form a non-transitory computer-readable medium; a video capture unit 108, a display unit 110, a microphone 120, a speaker 118, an radio frequency transceiver 114, and an digital input/output interface 122. Some embodiments of the user device 100 can be implemented as a portable computing device and can include components, such as sensors 136, a subscriber identity module (SIM) card 116, and a power source 138.

The memory 106 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 126 and applications 128 can be embodied as computer-readable/executable program code stored on the non-transitory computer-readable memory 106 and implemented using any suitable, high or low level computing language and/or platform, such as, e.g., Java, C, C++, C#, assembly code, machine readable language, and the like. In some embodiments, the applications 128 can include a video capture and processing engine 132 and/or a video messaging application 130 configured to interact with the video capture unit 108, the microphone, and/or the speaker to record video (including audio) or to play back video (including audio). While memory is depicted as a single component those skilled in the art will recognize that the memory can be formed from multiple components and that separate non-volatile and volatile memory device can be used.

The processing device 104 can include any suitable single- or multiple-core microprocessor of any suitable architecture that is capable of implementing and/or facilitating an operation of the user device 100. For example, to perform a video capture operation, transmit the captured video (e.g., via the RF transceiver 114), transmit/receive a metadata associated with the video (e.g., via the RF transceiver 114), display data/information including GUIs 112 of the user interface 134, captured or received videos, and the like. The processing device 104 can be programmed and/or configured to execute the operating system 126 and applications 128 (e.g., video capture and processing engine 132 and video messaging application 130) to implement one or more processes to perform an operation. The processing device 104 can retrieve information/data from and store information/data to the storage device 106. For example, the processing device 104 can retrieve and/or store captured or received videos, metadata associated with captured or received videos, and/or any other suitable information/data that can be utilized by the user device 100 and/or the user.

The RF transceiver 114 can be configured to transmit and/or receive wireless transmissions via an antenna 115. For example, the RF transceiver 114 can be configured to transmit data/information, such as one or more videos captured by the video capture unit and/or metadata associated with the captured video, directly or indirectly, to one or more servers and/or one or more other user devices, and/or to receive videos and/or metadata associated with the videos, directly or indirectly, from one or more servers and/or one or more user devices. The RF transceiver 114 can be configured to transmit and/or receive information having at a specified frequency and/or according to a specified sequence and/or packet arrangement.

The display unit 110 can render user interfaces, such as graphical user interfaces 112 to a user and in some embodiments can provide a mechanism that allows the user to interact with the GUIs 112. For example, a user may interact with the user device 100 through display unit 110, which, in some embodiments, may be implemented as a liquid crystal touch-screen (or haptic) display, a light emitting diode touch-screen display, and/or any other suitable display device, which may display one or more user interfaces (e.g., GUIs 112) that may be provided in accordance with exemplary embodiments.

The power source 138 can be implemented as a battery or capacitive elements configured to store an electric charge and power the user device 100. In exemplary embodiments, the power source 138 can be a rechargeable power source, such as a battery or one or more capacitive elements configured to be recharged via a connection to an external power supply.

In exemplary embodiments, video messaging applications 130 can include a codec 140 for compressing and decompressing video files as described herein. While codec 140 is shown as separate and distinct, exemplary embodiments may be incorporated and integrated into one or more applications such as video messaging application 130 or video capture and processing engine 132.

In some embodiments, the user device can implement an one or more processes described herein via an execution of the video capture and processing application 132 and/or an execution of one of the applications 128. For example, the user device 100 can be used for video messaging, can transcribe the audio of a video into machine-encoded data or text, can integrate supplemental data into the video based on the content of the audio (as transcribed), and/or can compress/decompress videos as described herein.

II. Exemplary Server

Figure 2:
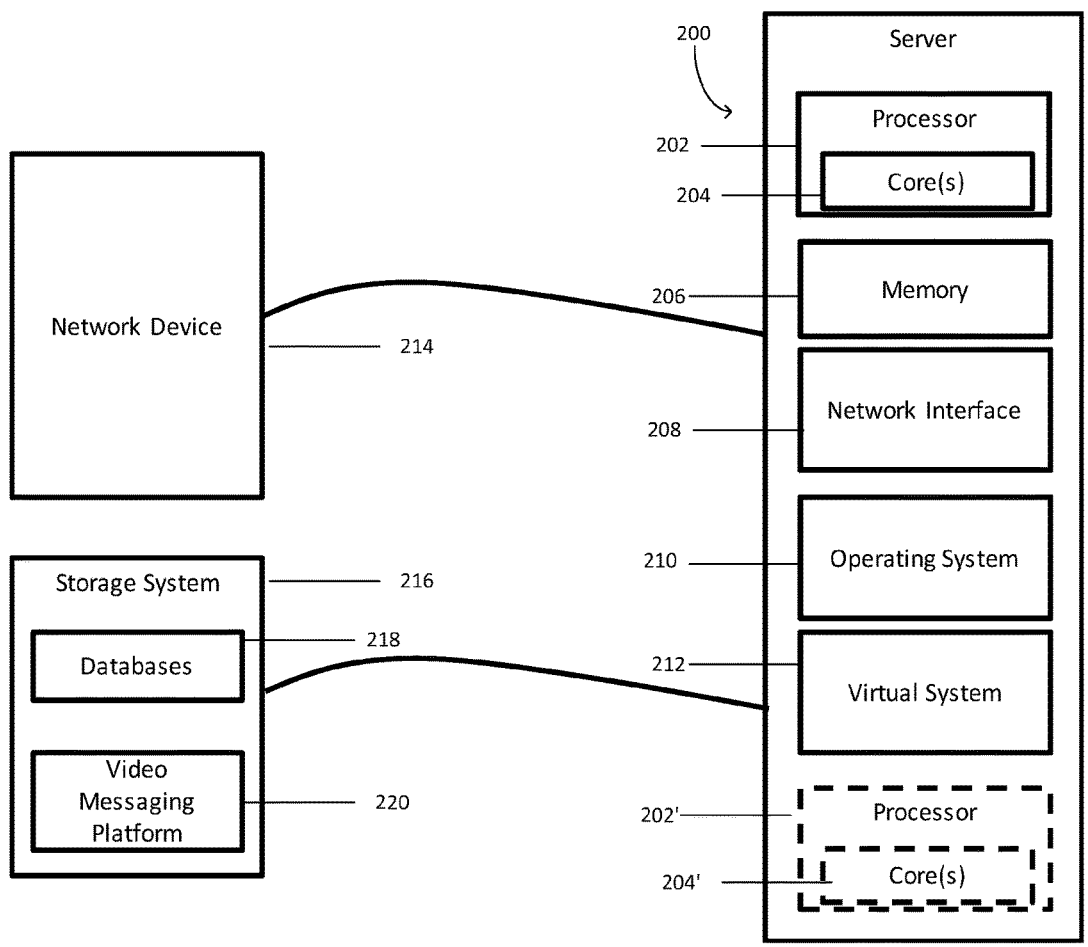
FIG. 2 is a block diagram of an exemplary server for implementation exemplary embodiments of the present disclosure.

FIG. 2 depicts a block diagram of an exemplary server 200 in accordance with exemplary embodiments of the present disclosure. The server 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 206 included in the server 200 may store computer-readable and computer-executable instructions or software for implementing exemplary embodiments of a video messaging platform 220. The video messaging platform 220, in conjunctions with video messaging applications 130 executed by user device can form a video messaging system.

The server 200 also includes configurable and/or programmable processor 202 and associated core(s) 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 or storage 224, such as the video messaging platform 260 and/or other programs. Execution of the video messaging platform 220 by the processor 202 can allow users to generate accounts with user profile information, upload video messages to the server, and allow the server to transmit messages to user devices (e.g., of account holders). In some embodiments, the video messaging platform can provide speech recognition services to transcribe an audio component of a video, can generate and/or supplemental data to videos, can concatenate videos to form video message threads (e.g., by associating, linking, or integrating video messages associated with a thread together). Processor 202 and processor(s) 202' may each be a single core processor or multiple core (204 and 204') processor.

Virtualization may be employed in the server 200 so that infrastructure and resources in the server may be shared dynamically. A virtual machine 214 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

The server 200 may also include one or more storage devices 216, such as a hard-drive, CD-ROM, or other computer readable media, for storing data and computer-readable instructions and/or software such as the video messaging platform 220. Exemplary storage device 216 may also store one or more databases for storing any suitable information required to implement exemplary embodiments. For example, exemplary storage device 216 can store one or more databases 218 for storing information, such user accounts and profiles, videos, video message threads, metadata associated with videos, and/or any other information to be used by embodiments of the video messaging platform 220. The databases may be updated manually or automatically at any suitable time to add, delete, and/or update one or more data items in the databases.

The server 200 can include a network interface 208 configured to interface via one or more network devices 214 with one or more networks, for example, Local Area Network (LAN). Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 208 may include a built-in network adapter, network interface card, PCMCIA network card, card bus network adapter, wireless network adapter, USB network adapter, modem or any other device suitable for interfacing the server 200 to any type of network capable of communication and performing the operations described herein. Moreover, the server 200 may be any computer system, such as a workstation, desktop computer, server, laptop, handheld computer, tablet computer (e.g., the iPad™ tablet computer), mobile computing or communication device (e.g., the iPhone™ communication device), internal corporate devices, or other form of computing or telecommunications device that is capable of communication and that has sufficient processor power and memory capacity to perform the operations described herein.

The server 200 may run any operating system 210, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the server and performing the operations described herein. In exemplary embodiments, the operating system 216 may be run in native mode or emulated mode. In an exemplary embodiment, the operating system 216 may be run on one or more cloud machine instances.

III. Exemplary Network Environment

Figure 3:
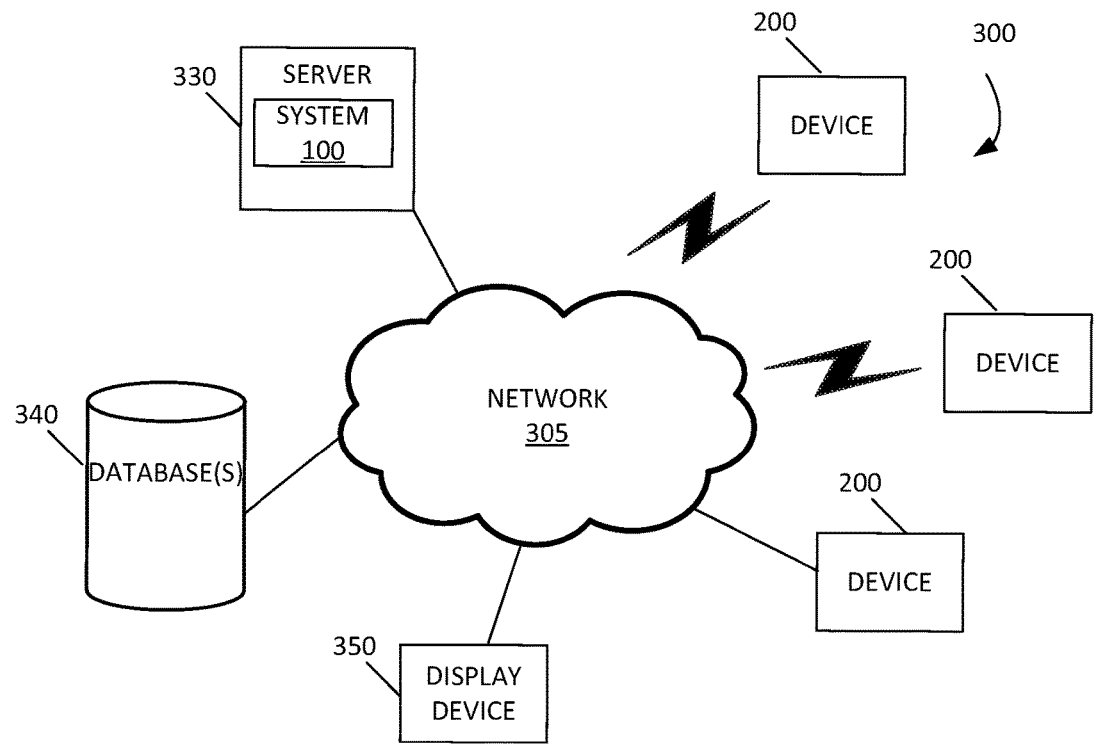
FIG. 3 is a block diagram of an exemplary network environment 300 for implementation exemplary embodiments of the present disclosure.

FIG. 3 depicts an exemplary network environment 300 for implementing exemplary embodiments of the present disclosure. The system 300 can include a network 305, a devices 200, a server 330, database(s) 340. Each of the devices 200, server 330, databases 340, is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The devices 200 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like.

The devices 200 may also include various external or peripheral devices to aid in performing video messaging. Examples of peripheral devices include, but are not limited to, monitors, touch-screen monitors, clicking devices (e.g., mouse), input devices (e.g., keyboard), cameras, video cameras, and the like.

Each of the devices 200 may connect to network 305 via a wired or wireless connection. Each of the device 200 may include one or more applications or systems such as, but not limited to, embodiments of the video capture and processing engine, and embodiments the video messaging application 130, and the like. In an example embodiment, the device 200 may perform all the functionalities described herein.

In other embodiments, video concatenation system may be included on all devices 200, and the server 330 performs the functionalities described herein. In yet another embodiment, the devices 200 may perform some of the functionalities, and server 330 performs the other functionalities described herein. For example, devices 200 may generate the user interface 132 including a graphical representation 112 for viewing and editing video files. Furthermore, devices 200 may use the video capture device 108 to record and the devices 200 may also transmit videos to the server 330.

The database(s) 340 may store data including video files, video message files, video message threads, video metadata, user account information, supplemental data in connection with the video concatenation system.

Each of the devices 200 server 330, database(s) 340 is connected to the network 305 either via a wired connection or connected to the network 305 via a wireless connection. Server 330 comprises one or more computers or processors configured to communicate with the device 200 and database(s) 330 via network 305. Server 330 hosts one or more applications or websites accessed by devices 200 and/or facilitates access to the content of database(s) 340. Server 330 also may include system 100 described herein. Database(s) 340 comprise one or more storage devices for storing data and/or instructions (or code) for use by server 330, device 200. Database(s) 340 and server 330 may be located at one or more geographically distributed locations from each other or from the devices 200. Alternatively, database(s) 340 may be included within server 330.

IV. Exemplary Video Messaging Environment

FIGS. 4-14 illustrate an exemplary elements of a video messaging environment in which a user device in the form of a mobile device (e.g., a smartphone) executes an embodiment of the video messaging application 130 in accordance with exemplary embodiments of the present disclosure.

Figure 4:
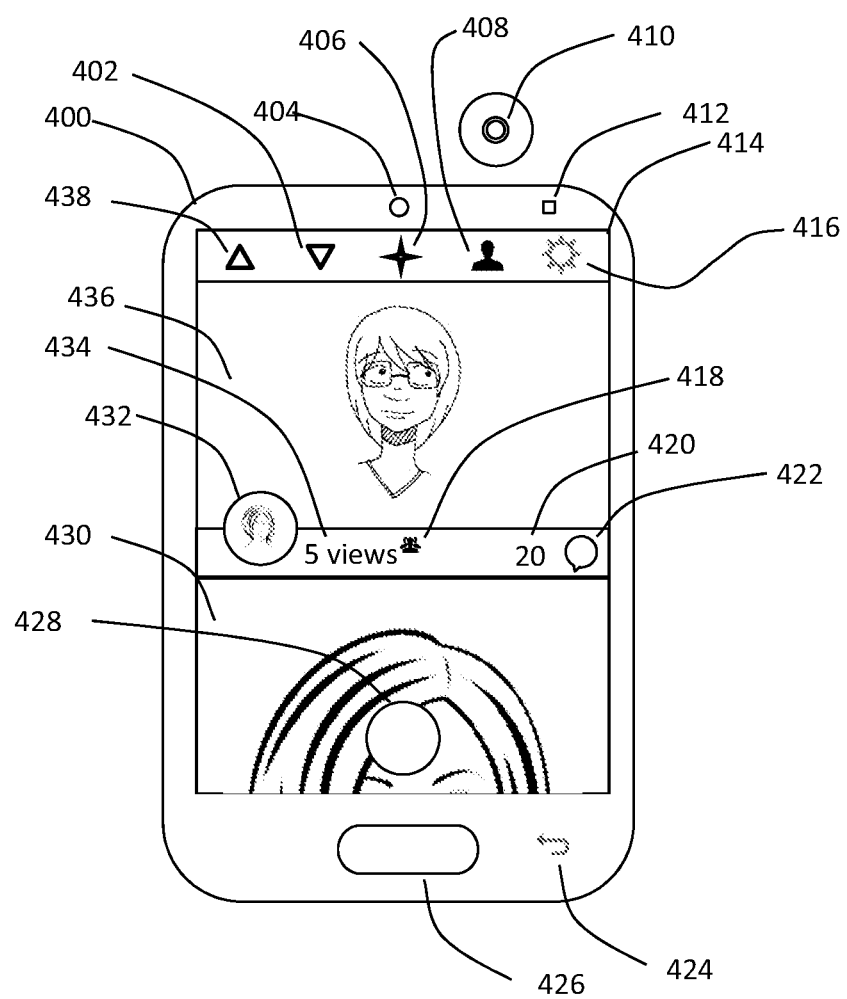
FIG. 4 shows a plan view of an exemplary user device having a display upon which a set of icons and informational elements are rendered to provide the user with navigation prompts and information about a video thread in accordance with exemplary embodiments of the present disclosure.

FIG. 4 shows mobile device 400 and user interface 405 of an embodiment of the video messaging application 130. The mobile device 400 includes a display 414, front 404 and rear facing cameras 410 (e.g., video capturing units), a microphone 412, a device "home" button 426, and a device "undo" button 424. Rendered on the display 414 are elements of the user interface (UI) generated by the video messaging application 130. Specifically, the UI renders on the display 414, a screen selection header (containing 438 to 416), a video preview of existing video messages 436 and 430, and a record icon 428. The header contains sub-elements including public posts 438, direct posts 402, notifications 406, contacts database 408 and settings 416. Additional information about each video message thread is also presented such as an original user 432 (the user that originates the video message), a number of video responses 420, respond or comment icon 422, a number of times a message has been viewed, a view counter 434, and names of participants in a message thread 418.

Figure 6:
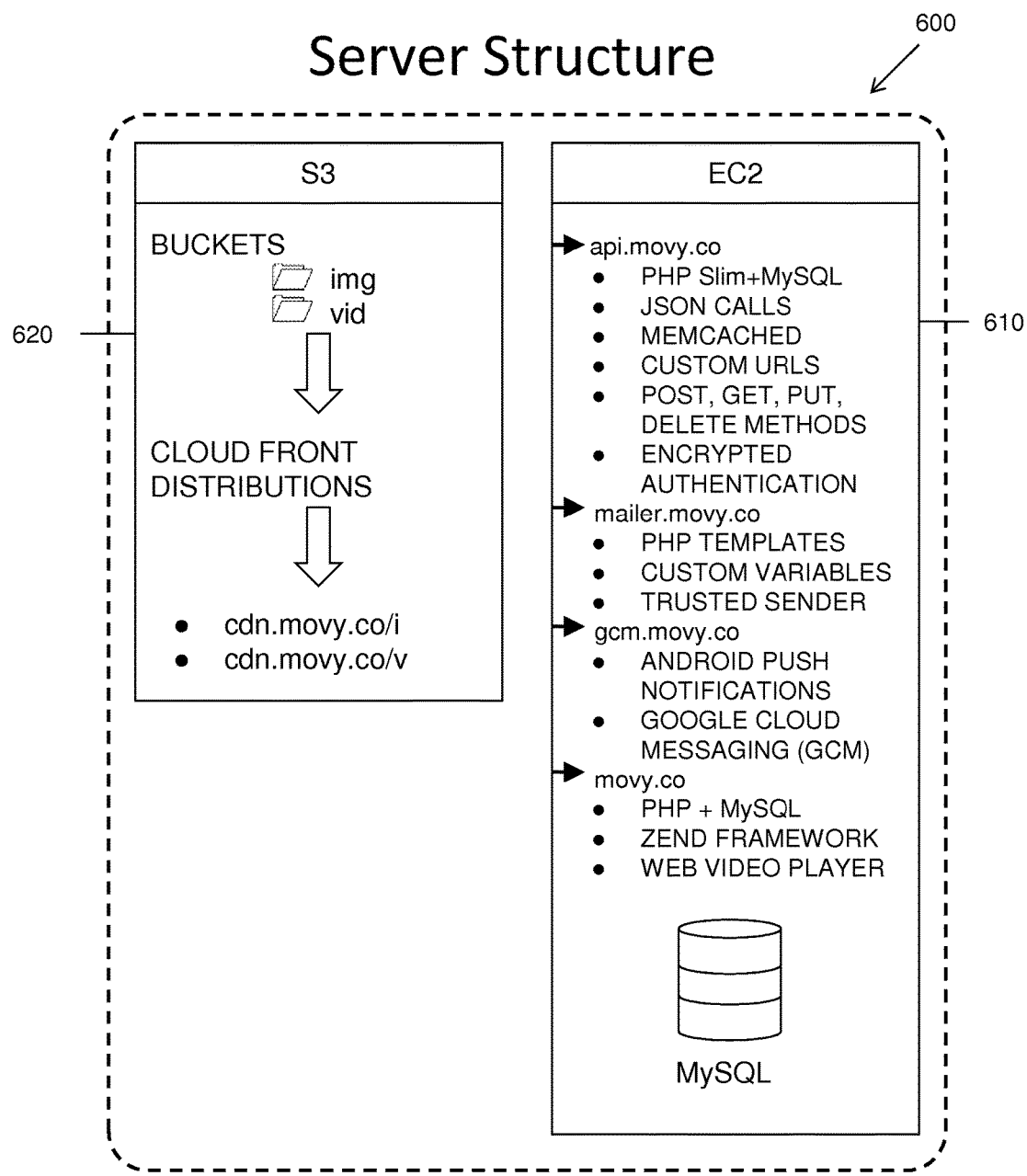
FIG. 6 shows a representation of cloud or server based elements for implementing exemplary embodiments of the video messaging system.

Exemplary embodiments of the video messaging application can take advantage of the processing power of the mobile device 400 and interfaces with cloud based servers (e.g., sever 330 shown in FIG. 3) to use the processing power of the servers. FIG. 6 shows one example embodiment of a basic structure of server based elements 600 that can be implemented or executed on a server to implement at least a portion of the video messaging platform. Is a non-limiting example, the servers can be implemented as the Amazon S3 (Simple Storage Service) server 620 and the Amazon EC2 (Elastic Compute) server 610. In other embodiments of the present disclosure, other elements having similar capabilities can be used.

The S3 or Simple Storage Service server 620 is can store thumbnail preview images of video messages in a specified file directory/structure (e.g., the "/img" file folder) and can store video messages in a specified file directory/structure (e.g., the "/vid" file folder). Once the preview images and videos are stored in the S3 server 620, an exemplary embodiment of the video messaging application 130 can utilize a distribution network, such as Amazon's Cloudfront distribution network (cdn), to deliver the preview images and video messages to other servers located in the same or different geographic areas (e.g., copies of the preview images and video messages can be stored on multiple servers in multiple location or data centers so that the previews and videos are available globally instantaneously). Therefore, once a video is posted (uploaded) to a server implementing embodiments of the video messaging platform by a user at one geographic location (e.g., in the United States), another user in another geographic location (e.g., China) may quickly access and view the video message without his or her device having to communicate to the server 620 in the United States to which the video message was originally uploaded. Instead the user's device can request and get the thumbnail preview and video locally from a server located near the user (e.g., from the nearest server storing a copy of the video message), thus reducing the response time.

The EC2 or Elastic Compute server 610 can be responsible for directing data traffic between user devices and the S3 server 620 and executing video file operations such as post, delete, append to message thread, create video message addresses (URL's) and encryption. There are four sections or domains to the EC2 server 610. Each of these sections are responsible for executing and hosting the functions therein.

A "api.movy.co" section or domain handles communications between user devices and the S3 server 620 and contacts database (e.g., MySQL). The api.movy.co section or domain also conducts posting, appending video's into the message thread (e.g., concatenating videos) and deleting videos. Furthermore, the api.movy.co section or domain can create and encrypt an unique URL for each uploaded video and user.

The "mailer.movy.co" section or domain handles notifications used by the video messaging system to notify recipients (e.g., via email) that a new video message has been sent to them for retrieval and/or viewing via embodiments of the video messaging application.

The "gcm.movy.co" section or domain handles notifications received by recipients within embodiments of the video messaging application itself.

The "movy.co" section or domain is a parent domain to the above three domains (e.g., api.movy.co, mailer.movy.co, gcm.movy.co) and also hosts a web viewer used by recipients to use an embodiment of the video messaging system when they do not have the video messaging application on the mobile device to view a video message.

In exemplary embodiments, eight main operations can provide functions of exemplary embodiments of the video messaging application. These operations can include device executed actions, server executed actions, user actions, and/or a combination thereof.

Figure 5:
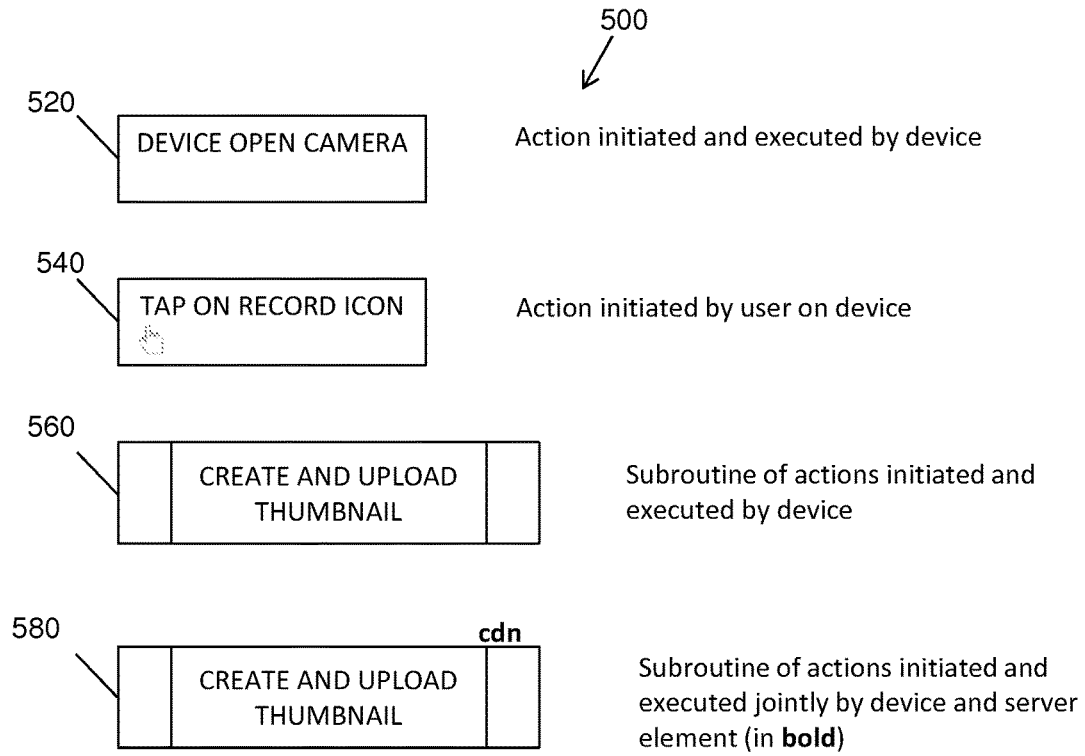
FIG. 5 shows symbol definitions used in conjunction with flowcharts provided herein.
Figure 7:
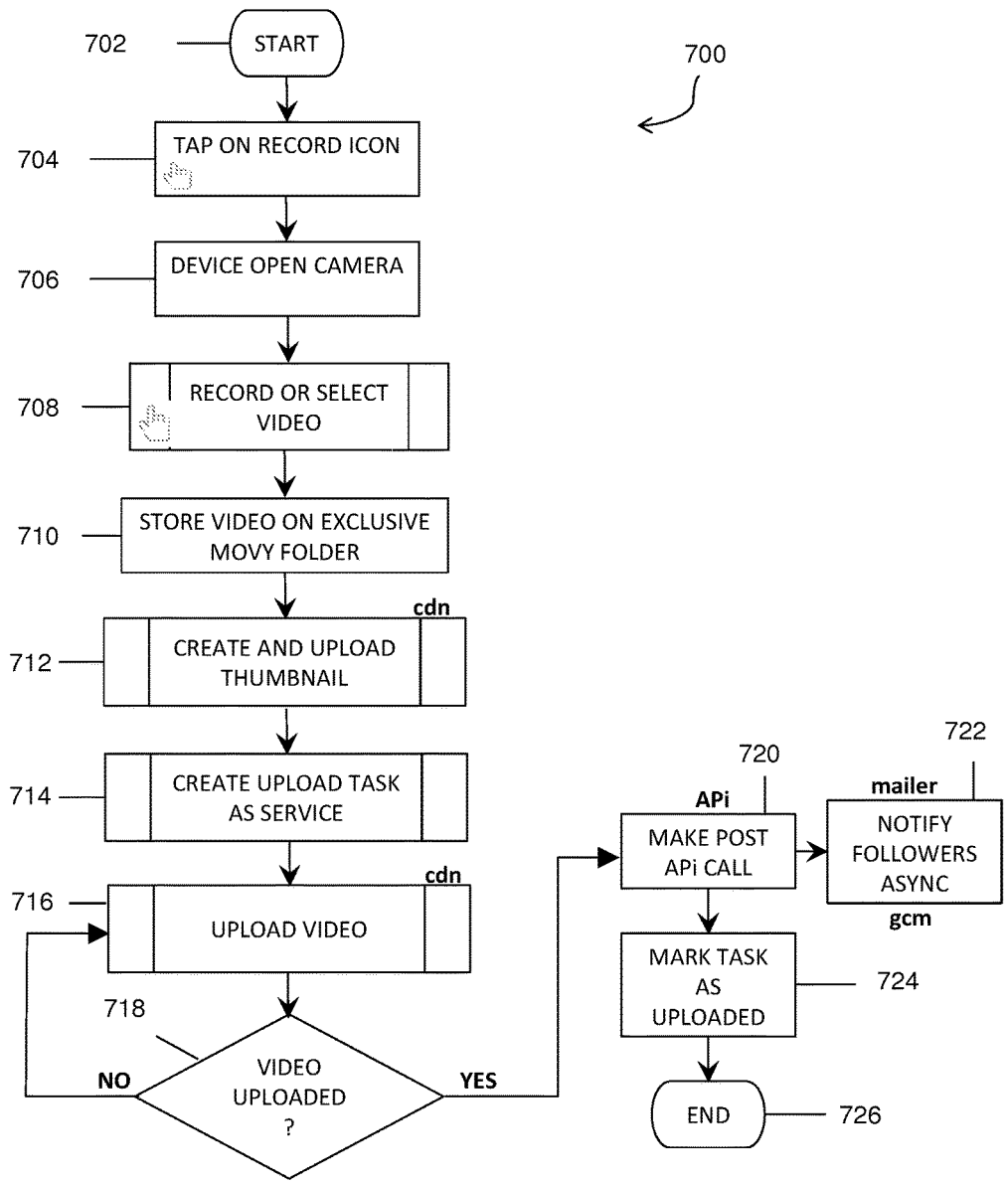
FIG. 7 shows a flowchart for recording a video message to a public stream using a video messaging application being executed on a user device in accordance with exemplary embodiments.

The first of these operations provides for creating and uploading a video message to the public stream. FIG. 7 is a flowchart illustrating the process to post a video to public stream 700 and background steps that can be used to create this public video message. FIG. 5 shows symbol definitions used in flowcharts of the present disclosure. The operation 520 is defined as an action initiated and executed by device. The operation 540 is defined is an action initiated by user on device. The operation 560 is defined as a subroutine of actions initiated and executed by device. The operation 580 defined as a subroutine of actions initiated and executed jointly by device and server element. The process begins at step 702. In operation 704, the user device receives an input in the form of the user tapping on the record icon, which activates a video capture unit of the user device in video mode in operation 706. In operation 708, user device records a video message. In operation 710, the video message is stored locally on the user device. Alternatively, an existing video already stored on the user device can be uploaded to the server from the user device. In operation 712, the user device creates a preview thumbnail image. In some embodiments, the preview thumb can be created by one of the servers and/or can be created based on an interaction between the user device and the servers (e.g., with the help of the Content Delivery Network, cdn). The video can be uploaded to the server (e.g. the Amazon S3 server 620). In operation 714, an upload task is created as a service. In operation 716, with the help of the cdn, the video message is uploaded to the S3 server 620. In operation 718, if the upload process is interrupted for any reason (user device being turn off, interruption on network or wifi reception, etc.), the video messaging application will control the user device to reconnect with the server to check if the upload process has been completed. If it has not, the user device continues to upload the video to completion in operation 716. In operation 720, the video is added to a video message stream with the help of an API server service and the server notifies, in operation 722, (e.g., with the help of gcm and mailer servers services) followers of the user that created the video message that a new post has been made. In operation 724, the task is marked as uploaded after the video is added into the video message stream.

Figure 8:
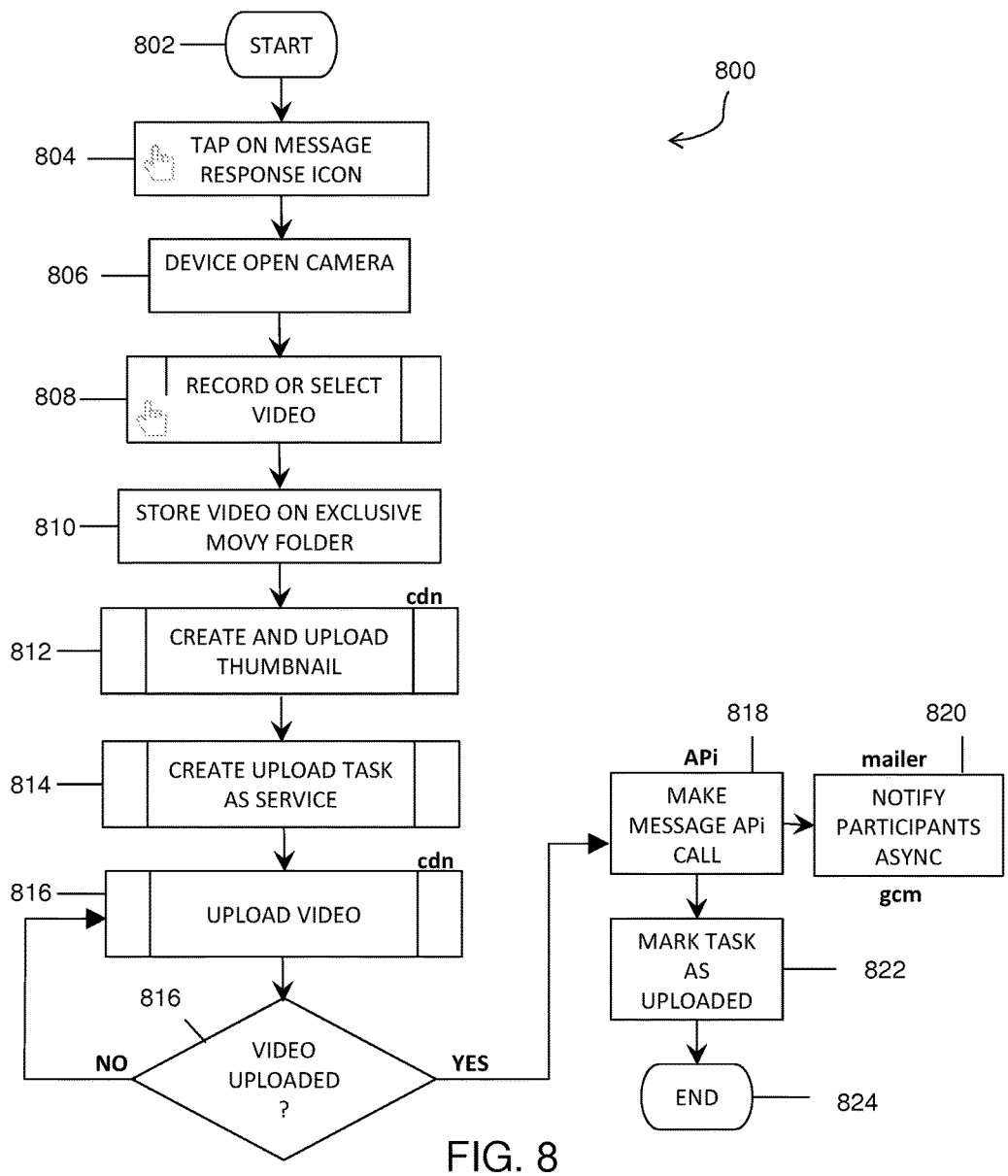
FIG. 8 shows a flowchart for creating a video message thread having responses to an initial video message using a video messaging application being executed on a user device in accordance with exemplary embodiments of the present disclosure.

FIG. 8 shows a flowchart illustrating a process 800 for creating a message thread and required steps and background actions of embodiments of the video messaging application to record a video message response. The process begins at step 802. In operation 802, the user device receives an input from the user in the form of the user tapping on a message response icon rendered in a user interface to activate video capture unit of the user device and operate in video mode in operation 806. In operation 808, the user device records a video message from the user. In operation 810, the video message is stored locally on the user device. Alternatively, an existing video already stored on the user device can be uploaded to the server from the user device. In operation 812, the user device creates a preview thumbnail image (e.g., with the help of the Content Delivery Network, cdn), and uploads the video to the server (e.g., the Amazon S3 server 620). In operation 814, an upload task is created as a service. In operation 816, with the help of the cdn, the video message is uploaded to the S3 server 620. In operation 818, if the upload process is interrupted for any reason (user device being turn off, interruption on network or wifi reception, etc.), the video messaging application controls the user device to reconnect with the server to check if the upload process has been completed. If it has not, the user device continues to upload the video in operation 816. In operation 820, the video is added to a video message stream (e.g., with the help of the APi server service) and the server notifies in operation 822, (e.g., with the help of gem and mailer servers services) followers of the user that a new post has been uploaded by the user. In operation 824, the task is marked as uploaded after the video is added into the message stream.

Figure 9:
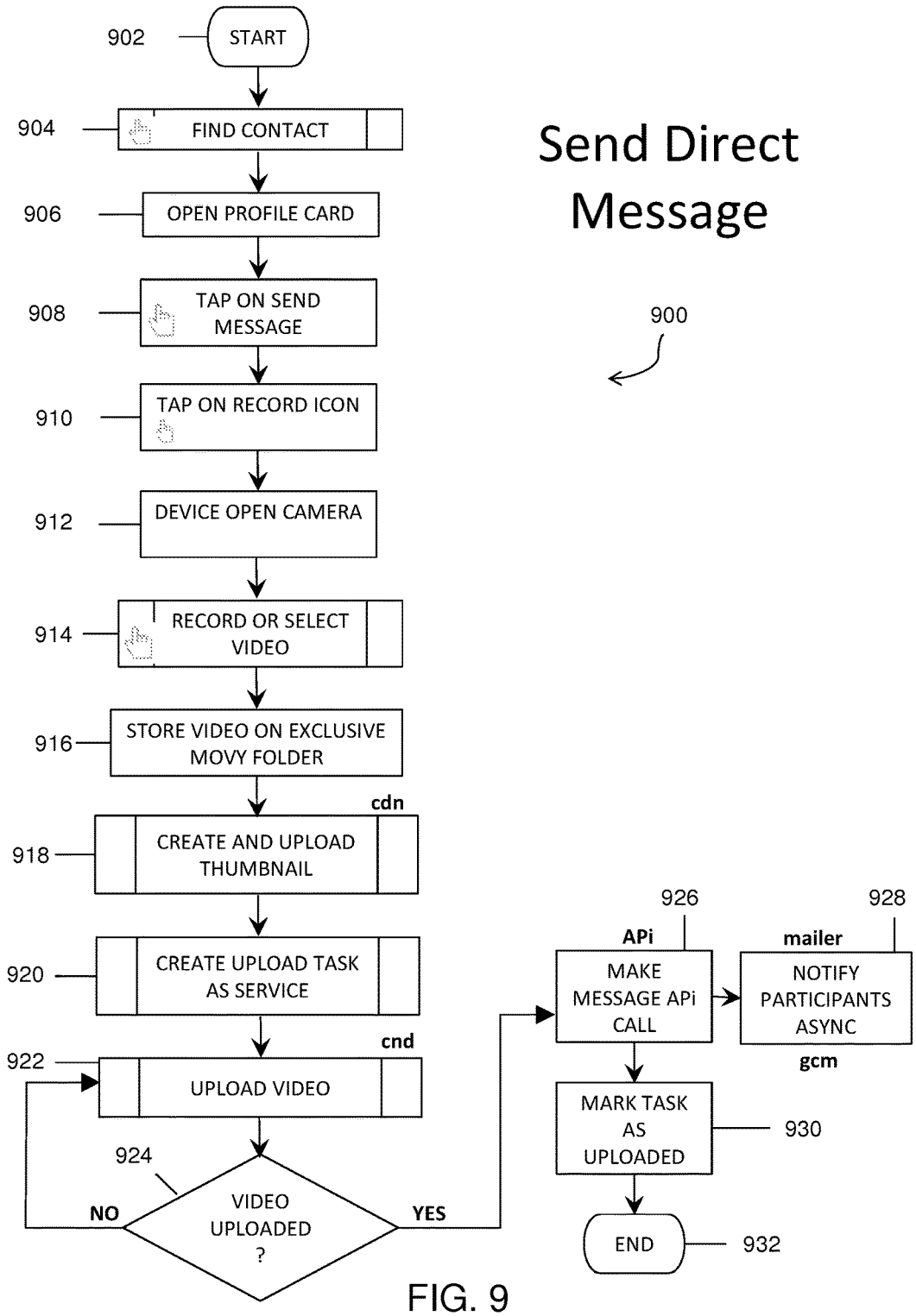
FIG. 9 shows a flowchart for recording a direct video message to a specific recipient or recipients with a user device executing a video messaging application in accordance with exemplary embodiments of the present disclosure.
Figure 10:
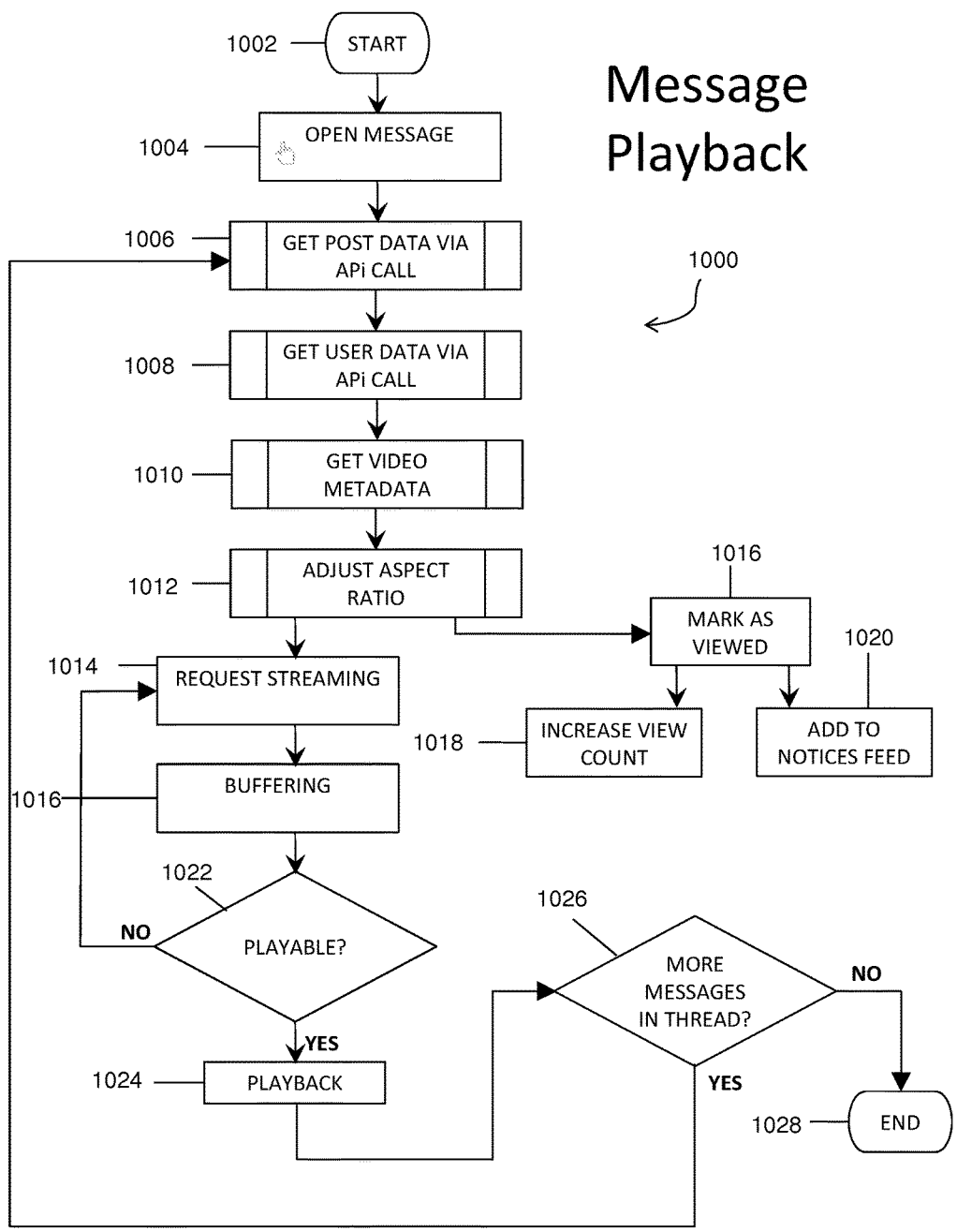
FIG. 10 is a flowchart illustrating steps and background actions for viewing or playing back a video message in accordance with exemplary embodiments of the present disclosure.

FIG. 9 shows a flowchart illustrating a process 900 for creating and sending a direct or private message to one or more recipients. The process begins at operation 902. In operation 904, the user device receives input from the user in the form of the user tapping on a recipient's icon in operation 904 to bring up a recipient's profile in operation 906. In operation 908, the user device receives an input from the user in the form of the user tapping on a "send a message" button/icon in a user interface provided by embodiments of the video messaging application. In operation 910, the user device receives another input from the user in the form of the user tapping on a record icon that activates the video capture unit of the user device in video mode in operation 912. In operation 914, the user device records a video message from the user. In operation 916, the video message is stored locally on the user device. Alternatively, an existing video already stored on the user device can be uploaded to the server by the user device. In operation 918, the user device creates a preview thumbnail image (e.g., with the help of the cdn (Content Delivery Network), uploads the video to the server (e.g., the Amazon S3 server 620). In operation 920, an upload task is created as a service. In operation 922, (e.g., with the help of the cdn), the video message is uploaded to the S3 server 620. In operation 924, if the upload process is interrupted for any reason (user device being turned off, interruption on network or WiFi reception, etc.), the video messaging application controls the user device to reconnect with the server to check if the upload process has been completed. If it has not, the user device continues to upload the video in operation 922. In operation 926, the video is added to a video message stream (e.g., with the help of the APi server service) and the server notifies in operation 928 (e.g., with the help of gem and mailer servers services), the specified recipient's that a new message has been sent by the user. In operation 930, the task is marked as uploaded after the video is added into the video message stream FIG. 10 shows a flowchart a process 1000 for viewing or playing back a video message and any subsequent responses to that message (e.g., a message thread). The process begins at step 1002. In operation 1004, the user device receives an input from the user in the form of the user tapping on a message button/icon provided by the video messaging application in operation 1004. In operations 1006-1010, the user device submits a request to the APi cloud server service to retrieve the video message, its author, and additional metadata, such as video resolution, orientation, date, time, number of views, etc. In operation 1012, an aspect ratio of the user device is confirmed. In operation 1014, a request is sent by the user device to the server to stream the video message to the user device. In operation 1016, the video message is buffered. In operation 1022, the user device determines if the video message is playable. If the video message is not playable, another request to stream is sent to the server by the user device in operation 1014. In operation 1024, if the video message is playable the video is streamed to the user device by the server at the required aspect ratio which provides for a seamless and clean viewing experience for the recipient. Simultaneously (or substantially simultaneously), in operation 1016, the video message can be marked as viewed and in operation 1018, the view counter of the video message can be increased. Furthermore, in operation 1020, notices are added to a video feed. In operation 1026, any additional responses to the video message are also delivered and played on the user device.

Figure 11A:
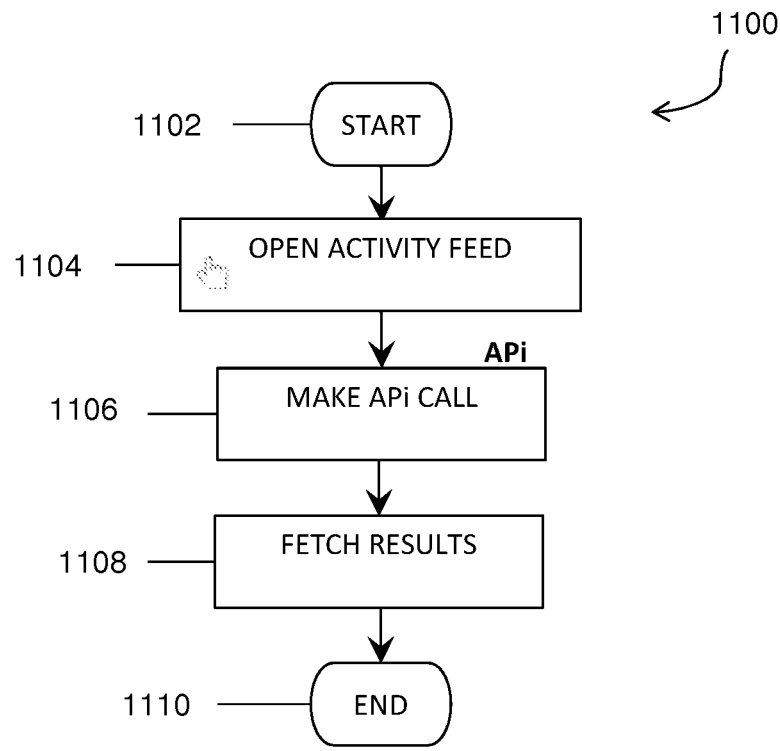
FIG. 11A shows a flowchart illustrating steps and background actions for on-demand notifications in accordance with exemplary embodiments of the present disclosure.

FIG. 11A shows a flowchart illustrates a process 110 implemented when a user refreshes their activity feed in order to view the most recent notifications. The process begins at step 1102. In operation 1104, the user device receives an input from the user in the form of a selection of an Activity Feed button/icon rendered on a display of the user device by the video messaging application. In operation 1106, the user device submits a request to the server via the APi service which, in operation 1108, also returns the information that is then populated on an Activity Feed screen of the user.

Figure 11B:
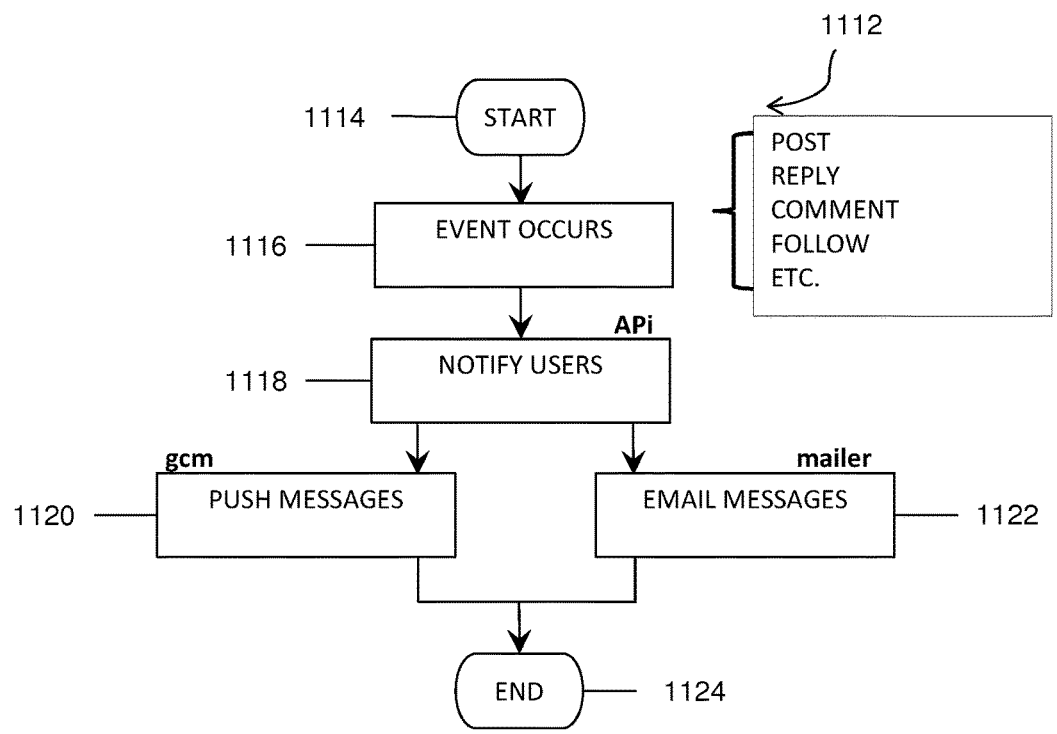
FIG. 11B shows a flowchart illustrates steps and background actions for real-time notifications.

FIG. 11B shows a flowchart illustrates a process 1112 for sending notifications when a message has been created, responded to, etc. (i.e. real-time notifications). The process begins at step 1114. In operation 1118, an event occurs (e.g., a create message event, response event, etc.). In operation 1118, the APi service creates a notification process. In operation 1120, the gem service sends a notification to recipients that are currently using the video messaging application. In operation 1122, the mailer service sends an email from the server to the e-mail address of those recipients that do not have the video messaging application installed on their device.

Figure 12:
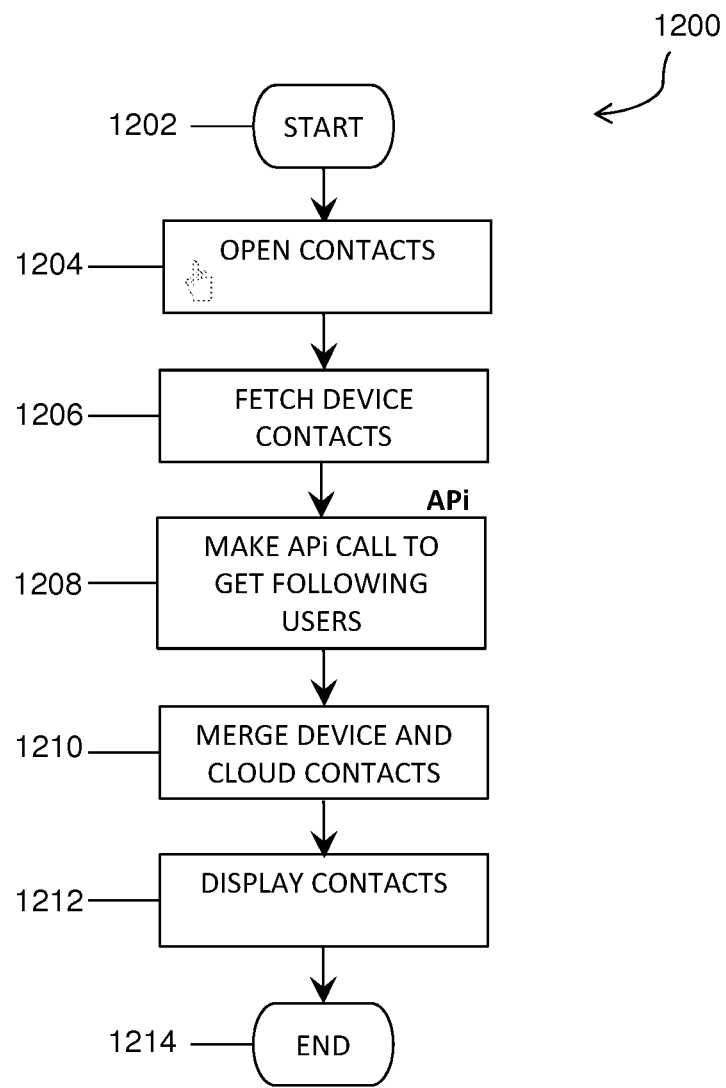
FIG. 12 shows a flowchart illustrating a contact management structure within a video messaging application being executed on a user device in accordance with exemplary embodiments of the present disclosure.

FIG. 12 shows a flowchart illustrates a process 1200 for interaction with a contact management structure within the video messaging application. The process begins at step 1202. In operation 1204, the user device receives an input from the user in the form of the user tapping a Contacts button/icon rendered on a display of the user device by the video messaging application. In operation 1206, the user's contact list on the user device is accessed and in operation 1208 the list is compared with a database on the MySQL server contacts database to see if any of contacts are already using the video messaging application. In operation 1210 the device contact list and server contact list are merged. In operation 1212 this information is returned to the user device and the merged contact list is displayed to the user.

Figure 13A:
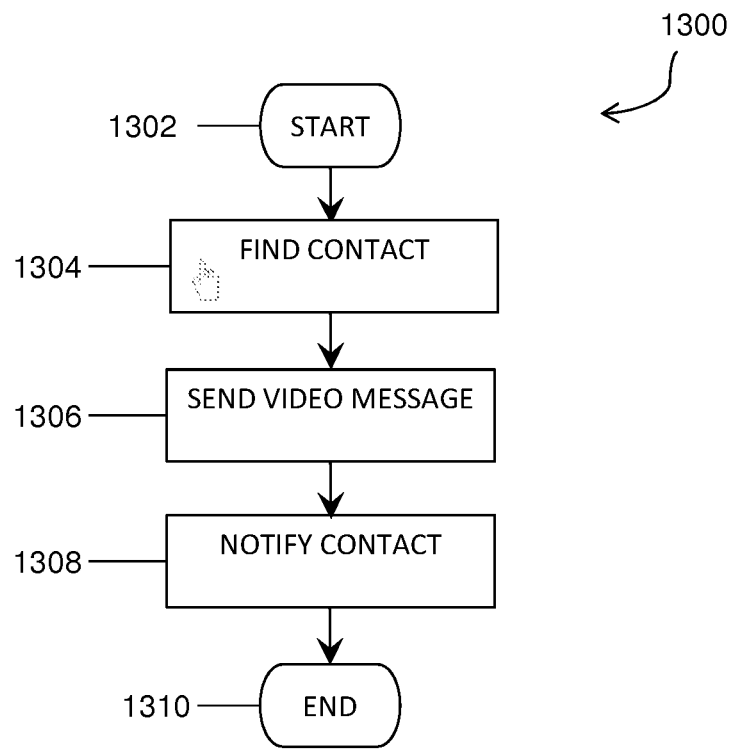
FIG. 13A shows a flowchart illustrating steps and background actions for sharing video threads with other users in accordance with exemplary embodiments of the present disclosure.

FIG. 13A shows a flowchart illustrating a process for sharing a video message or thread with another user also using the video messaging application. The process begins at step 1302. In operation 1304, the user device displays the video message to the user and in operation 1304, the use device receives an input from the user in the form of a selection of a participants button/icon and receives a selection of the contact to which they wish to send the video message. In operation 1306 the user device sends the video message (e.g., by uploading the video message to the server). In operation 1308 the recipient or recipients are then notified (e.g., by the server) using the real-time notification process as outlined in FIG. 11B.

Figure 13B:
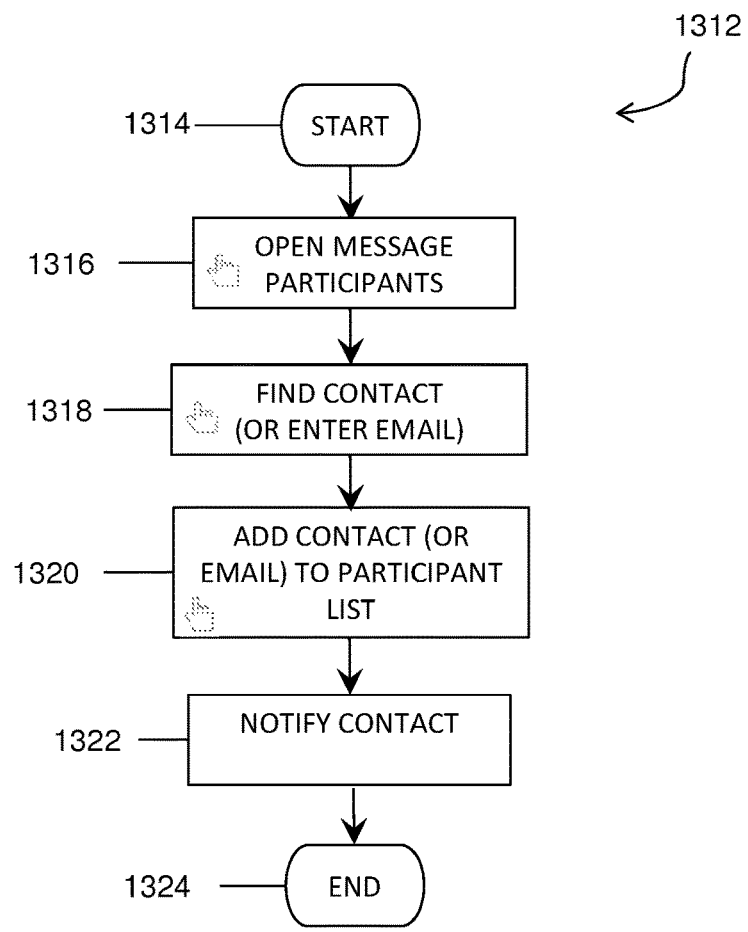
FIG. 13B shows a flowchart for inviting a user to an existing video thread in accordance with exemplary embodiments of the present disclosure.

FIG. 13B is a flowchart illustrates a process 1312 for inviting another user or someone that is not using the video messaging application to view the existing video message thread. The process begins at step 1314. In operation 1316, the user device can render the video message on the display to allow the user to view the video message and in operation 1318, the user device receives an input from the user in the form of a selection of a participants button/icon. In operation 1320, the user device receives further input from the user in the form of either a selection an existing contact in the video messaging application or enters a recipients email or other contact address to which the video message should be sent. Such contact addresses can be an email address, phone number, Facebook username, Twitter username or Google+ username. In operation 1322, the recipient or recipients are then notified by the server using the real-time notification process as outlined in FIG. 11B.

Figure 14:
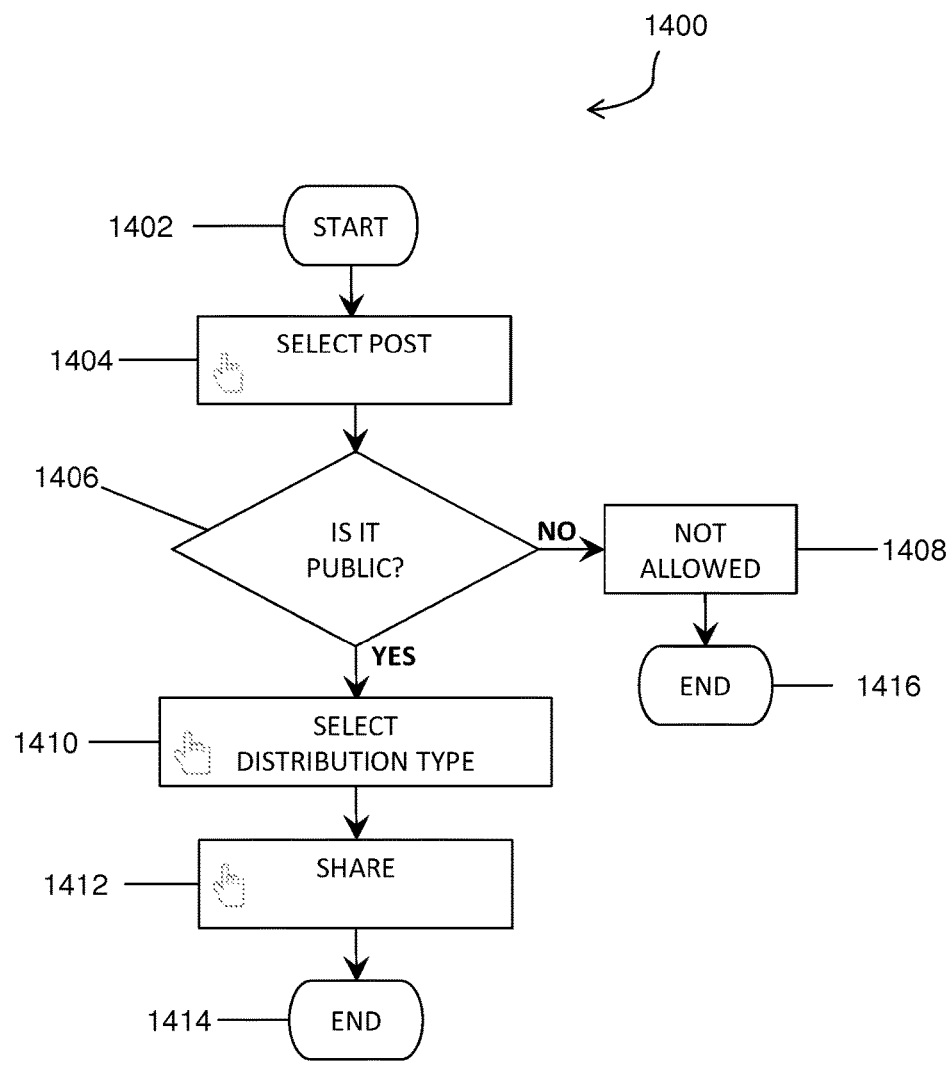
FIG. 14 shows a flowchart for sharing an existing video or thread in accordance with exemplary embodiments of the present disclosure.

FIG. 14 shows a flowchart illustrates a process 1400 for sharing a video message that is an existing post. This may be required when a particular video message is a direct message. In some embodiments, these video messages cannot be shared by anyone other than the original user or author. The process begins at step 1402. In operation 1404, the user device receives an input from the user in the form of a selection of a specific video message. In operation 1406, the user device (executing the video messaging application) or the server (executing the video messaging platform) determines if the message is publically viewable. In operation 1408, if the message is not publically viewable, the video messaging application or video messaging platform prevents the user from sharing the video message. In operation 1410, if the message is publically viewable, the user device can receive an input from the user in the form of a selection of a distribution type. In operation 1412 the video message can be shared based on the distribution type.

The video messaging application can include additional user interface screens, help and navigational elements. These additional screens add to the user experience.

Upon installing the video messaging application on a user device (e.g., a smartphone), the user can create a user account with authentication. At this point, the user is ready to create a video message.

To illustrate some advantages of the embodiments of the video messaging system described herein with respect to FIGS. 4-14, an embodiment of the video messaging system ## is compared to a conventional application for creating a video message on an Apple iPhone 5 (iOS version 6.1.4)

Creating and sending a video message using the native messages app of the IPhone 5 generally involves the following steps: 1. Click create message icon, 2. Select or type in recipient name or phone number, 3. Select camera icon, 4. Select "Take Phone or Video" button, 5. Select video icon, 6. Select start recording icon, 7. Select end recording icon, 8. Select "Use" button and 9. Select "Send" button. Therefore creating and sending a video message using the native messaging app on an Apple iPhone requires a total of 9 user steps.

As provided herein, with reference to FIGS. 1-14, creating and sending a video message with exemplary embodiments of the video messaging application 130 can be performed in response to the following user steps: 1. Tap and hold the video record icon 428 to automatically start recording and 2. Tap video record icon again to stop recording and automatically upload the video. Responding to a video message using the video messaging system described herein can be performed in response to the following steps: 1. Tap the comment icon 422 which automatically opens the video recording screen, 2. tap the video record icon 428 to start recording and 3. tap the video capture icon 428 again to stop recording and automatically upload the video to the message thread.

In some embodiments, the video message created using the video messaging system and the video response from another user created using the video messaging system can be associated or linked to each other. The video messaging system can associate the response to the initial video message and create an image, captured from the initial message, which can be added to the home screen. The linked videos can create a video message thread (e.g., a concatenation of video messages).

The video message thread can be accessible to any user in the contact list of the original thread starter (initial message sender). This is called a public message or post. As structured, the app now also becomes a platform for sharing these video messages within the user community. Therefore any public post may be viewed, rated or responded by any other user. In some embodiments, access to the video thread can be controlled or limited by one or more of the users who have created one or more of the videos in the video thread. Access can be pre-set by the user originated the initial message or can be modified by each user. The content of the video message thread can also be controlled, limited or edited by one or more of the users.

In some embodiments, the video message or message thread may be shared with any third party (not within the user community) via email, text messaging or other messaging or social networking applications, direct WiFi or Bluetooth transfer to other devices, etc. The externally shared video can contain all the videos messages merged sequentially together in chronological order and can be viewed on a web browser using a video or media player.

In exemplary embodiments, a user may decide to send a direct message to only one other user or a set of specific users. To initiate this private message (person-to-person), the user can perform the additional step of selecting the recipient(s) before (or in some embodiments after) proceeding to capturing the video message outlined herein. Creating and sending a private message may require an additional step over sending a public message (as described herein). Additional recipients may be added at a later stage only by the original user.

In exemplary embodiments, a user may decide to send a direct message and receive video message responses from one or more recipients, as described herein. These responses may trigger the need to add additional participants or remove existing participants. When added, these new participants can review the entire message thread from its inception, thus saving the valuable time normally used to bring these new participants "up to speed" regarding the topic being discussed. These new participants can now collaborate with the existing message participants and may further comment on the topic or add additional participants.

Therefore, the video thread containing an initial user message and subsequent responses, when viewed in totality, is itself a form of video content. Therefore, when viewed in entirety, the viewer gains a clear and concise understanding of the topic in discussion in the video message thread and can subsequently add their views. This non-linear form of video messaging allows for rich and descriptive discussions that may evolve over the course of additional messages. For example, in the case of lawyers within a law firm discussing the particulars of a case, the ensuing video thread discussing the case is itself "work product" and is of value to both the participants and their clients. In some embodiments, the access level for the video message thread may varied. The user may decide to grant or deny access to one or more messages within a given message thread, thus maintaining levels of confidentiality required for some collaborations.

Broadly, the device elements to execute the application can include one or more cameras, one or more microphones, one or more speaker(s), hardware or software enabled home and return (escape) button, internal memory, central processing unit(s), graphic processing unit(s), operating system (OS). In particular, the video message recording device should have a video message recording elements, such as at least one camera. In some embodiments, the device can have at least two cameras facing in opposite directions (front and rear facing).

The application can be coded in the open source operating system Android and therefore can function on any device using this operating system. In some embodiments, the operating system uses Android version 4.0 or higher.

The shared video message thread can be stored with its order, authors, and other details preserved. The video content can be replayed or shared at any time wherein the viewer can access the stored information.

Exemplary embodiments as described herein (e.g., with respect to FIGS. 4-14) is very fast and efficient in creating and responding to video messages, the present disclosure includes alternative enhancements to the application that enhance the user's navigation and video messaging experience.

The advantages of the present disclosure include, without limitation, i. ease of video message capture; ii. background video message upload to storage server; iii. ease of responding to a video message; iv. seamless video message thread creation (i.e. appending video messages together into a thread); v. the ability to create both a person-to-person (direct) message or person-to-public message with similar ease and efficiency; and vi. the ability to share a single video message or entire video message thread.

As described herein, conventional text messaging apps are cumbersome and require multiple steps just to add a video message to the text based message thread. This comparison serves as a basis for further comparisons between an embodiment of the video messaging application ## described herein and conventional messaging or video sharing applications.

The speed and simplicity in creating and sending video messages is key to the growth of video messaging as a communication and collaboration medium. Tests were conducted comparing an embodiment of the video messaging application ## described herein with current messaging and video sharing applications.

Experiments were performed to illustrate some advantageous of the exemplary embodiments of the video messaging system as they relate to a number of steps required by the user to create and send a video message. A step is counted for any user interface interaction by the user such as a tap, swipe or any other gesture. All tests were conducted using the same phone for a given operating system. Applications based on the Android operating system were conducted on a Samsung Galaxy Note 2 smartphone (Model number SCH-1605) running Android version 4.1.2 and on the Verizon 4G LTE network with a signal strength of −102 dBm (38 asu). Applications based on the Apple's iOS operating system were conducted on an Apple iPhone 5 (Model number MD638LL/A) running iOS version 6.1.4 (10B350) on the AT&T 4G LTE network. The signal strength, though equivalent for each app tested, was not numerically determined as the phone does not provide the data. Prior to launching the application, all other applications were closed. All applications were launched and tested from their home screen. The total number of steps taken to execute all the steps required to create and send a video was noted. If the application had the capability, both person-to-public and person-to-person tests were conducted.

The results of the experiment are displayed on Table 1 and 2 below. Table 1 details a comparison of an exemplary embodiment of the video messaging system with conventional text messaging applications with video capability. Table 2 details the comparison of an exemplary embodiment of the video messaging system with conventional video sharing applications. Note that not all applications had the capability of sending both person-to-public or person-to-person video messages.

TABLE 1

Number of steps to create and send a video message - comparison with text messaging applications with video.

| | Description | | | | |
|---|---|---|---|---|---|
| | iOS native | Android native | Kik Messenger | WhatsApp | Example I |
| App type | Text messaging w/ video | Text messaging w/ video | Text messaging w/ video | Text messaging w/ video | Video messaging & sharing |
| Operating system | iOS | Jelly Bean | Jelly Bean | Jelly Bean | Jelly Bean |
| OS Version tested | 6.1.4 | 4.1.2 | 4.1.2 | 4.1.2 | 4.1.2 |
| App version tested | n/a | n/a | 1.3.1 | 2.10.222 | 1.0 |

TABLE 1-continued

Number of steps to create and send a video message - comparison with text messaging applications with video.

|  | Description | | | | |
| --- | --- | --- | --- | --- | --- |
|  | iOS native | Android native | Kik Messenger | WhatsApp | Example 1 |
| Person to person - Minimum number of steps | 9 | 8 | 9 | 10 | 3 |
| Person to public - Minimum number of steps | NC | NC | NC | 9 | 2 |
| Background Upload? | No | Yes | Yes | Yes | Yes |
| Respond with a video message? | Yes | Yes | Yes | Yes | Yes |
| Create video thread? | No | No | No | No | Yes |
| Share video message? | No | No | Yes | Yes | Yes |

(NC = application not capable of tested functionality)

TABLE 2

Number of steps to create and send a video message - comparison with video sharing applications.

|  | Description | | | | | |
| --- | --- | --- | --- | --- | --- | --- |
|  | Keek | Viddy | Vine | Snapchat | Instagram video | Example 1 |
| App type | Video sharing | Video sharing | Video sharing | Video sharing | Video sharing | Video messaging & sharing |
| Operating system | Jelly Bean | iOS | Jelly Bean | Jelly Bean | Jelly Bean | Jelly Bean |
| OS Version tested | 4.1.2 | 6.1.4 | 4.1.2 | 4.1.2 | 4.1.2 | 4.1.2 |
| App version tested | 2.7.9 | 2.5.1 | 1.1.0 | 2.1.0 | 4.0.2 | 1.0 |
| Person to person - Minimum number of steps | 4 | NC | NC | 5 | NC | 3 |
| Person to public - Minimum number of steps | 5 | 5 | 7 | NC | 6 | 2 |
| Background Upload | Yes | No | No | No | No | Yes |
| Respond with a video message? | Yes | No | No | No | No | Yes |
| Create video thread? | No | No | No | No | No | Yes |
| Share video message? | Yes | Yes | No | No | No | Yes |

(NC = application not capable of tested functionality)

TABLE 3

Summary of the number of steps required to create and send a video message.

| Application | Minimum number of steps to create a video message (from Tables 1 & 2) | Actual time to create and send a video message (from Table 1 & 2) in seconds [1], [2] |
| --- | --- | --- |
| iOS native | 9 | 11.4 |
| Android native | 8 | 10.5 |
| Kik Messenger | 9 | 14.7 |
| WhatsApp | 10 | 12.7 |
| Keek | 4 | 6.0 |
| Viddy | 5 | 11.7 |
| Vine | 7 | 14.2 |
| Snapchat | 5 | 6.8 |
| Instagram video | 6 | 10.8 |
| Example 1 | 2 | 1.4 |

([1]. Average of 3 tests;
[2]. The measured time is the time required to interact with the app's user interface to create the video message and the time required by the app to send the message and return control back to the user.)

A quick inspection of Tables 1 and 2 reveal that most of the current applications are either designed for person-to-public or person-to-person video messaging, but not both. For those that do, there is minimal difference between the two modes. Further inspection reveals that many of the applications do not allow for background uploading of the video to the message server. This temporarily suspends the use of the device from the user, preventing them from further messaging or other uses, thus hampering their productivity. The present disclosure minimizes the number of steps and therefore the time required to create a video message as the enabling factor in video threads, richer content, advertising, etc. The system and method of the present disclosure is designed for video responses or for subsequent video sharing to enhance communication and collaboration.

Exemplary embodiments of the present disclosure enables users to (i.) collaborate instead of just communicate; (ii.) communicate with context and tonality (important for tonal languages like Chinese); (iii.) create multi user videos (crowdsourced videos); (iv.) generate video reviews or opinions of products or services from multiple users; (v.) monetization of the video message thread by the addition of (a) image advertisements within videos, (b) image or video advertisements between videos in a thread, and/or (c) message or message thread itself is the advertisement; and (vi.) monetization of the video message thread by assigning ownership of the message thread to the user who created the first message in the message thread, therefore conferring the right to that user to obtain payment from other users or third-parties to view the content in the video message thread (so-called pay-per-view).

The video threads hereby created may be simple video messages, instructions, advertisements or opinions on specific topic or product. It may contain image or video advertisements inserted between video segments within the thread to create a richer experience.

Additionally, this form of video communication also enables speakers of tonal languages (such as Chinese, Vietnamese and many African languages) to communicate more effectively than with simple text based messaging where a single character or word may have multiple meanings. In these tonal languages, both pitch and facial expression are used infuse the correct meaning of a word.

It should be further noted that although the certain example embodiments are described herein, other embodiments having broader terms and constructions are envisioned.

An example embodiment of the video messaging application is demonstrated as an application written for and operated on devices using the Android operating system. The application can also be created and executed on Apple's iOS, Blackberry OS, Microsoft Windows, Ubuntu's or other operating systems without losing the look, feel and capabilities of the Android based application.

Exemplary embodiments of the present disclosure can be created in HTML5 and executed on a compatible web browser. In such embodiments, the use of a web-powered application may potentially remove the device dependency or difficulties that arise from using a native application on different devices with different versions of the operating system.

The system and method of the present disclosure are demonstrated using the memory of a user device memory, cloud server storage, and/or a combination thereof. In some embodiments, a completely distributed peer-to-peer storage system can be utilized, which can eliminate or reduce the cost and issues associated with cloud storage.

As discussed in more detail herein, exemplary embodiments of the present disclosure can also be equipped with video to text transcription; automatic metadata tagging (based on transcription); text, image and video search capability; and date and location (GPS) stamps on the video itself, which can be beneficial for security and authentication such as lockout/tagout procedures for manufacturing plants, aircraft maintenance logs, and voice activation.

Exemplary embodiments of the video messaging application can be executed on various user devices or in other modalities, such as tablets, netbooks, notebooks and laptops, smart watches, wireless enabled digital cameras or video cameras, application on flash drive inserted into any camera enabled device, headphones, wireless & camera enabled TV's (smart TVs), game consoles, VOIP phones, media (MP3) players, virtual reality viewers.

V. Exemplary Search Capabilities and Supplemental Data Generation for Video

Exemplary embodiments of the present disclosure provide for rapid delivery of both search capabilities and additional content embedded in videos. For example, exemplary embodiments described with reference generally to FIGS. 15-22 can use speech recognition to transcribe the audio content of a video and can automatically embed supplemental data associated with the transcribed audio content into the video and/or can provide enhanced video search capabilities. The search capabilities and supplemental data can be implemented for videos in general and/or can be implemented for specific applications of videos, as such for use in or with a video messaging system that can be formed based on an execution of a video messaging application and a video messaging platform.

Exemplary embodiments of the present disclosure can be designed to: (i.) create a text transcript during the recording of the video by using the device's own speech recognition engine; (ii.) make the transcript available for use by delivering it with the video and its metadata when playback is requested by the recipient and (iii.) create and display embedded functionalities such as hot spots or hot icons that provide further information, links or searches pertaining to the topic being discussed in the video message.

While certain features and functions of exemplary embodiments are described with respect to a non-limiting example embodiment of a video messaging system including video messaging application being executed by a user device, exemplary embodiments of the present disclosure can be implemented for video in general as well as for other applications for which video is utilized.

Figure 15:
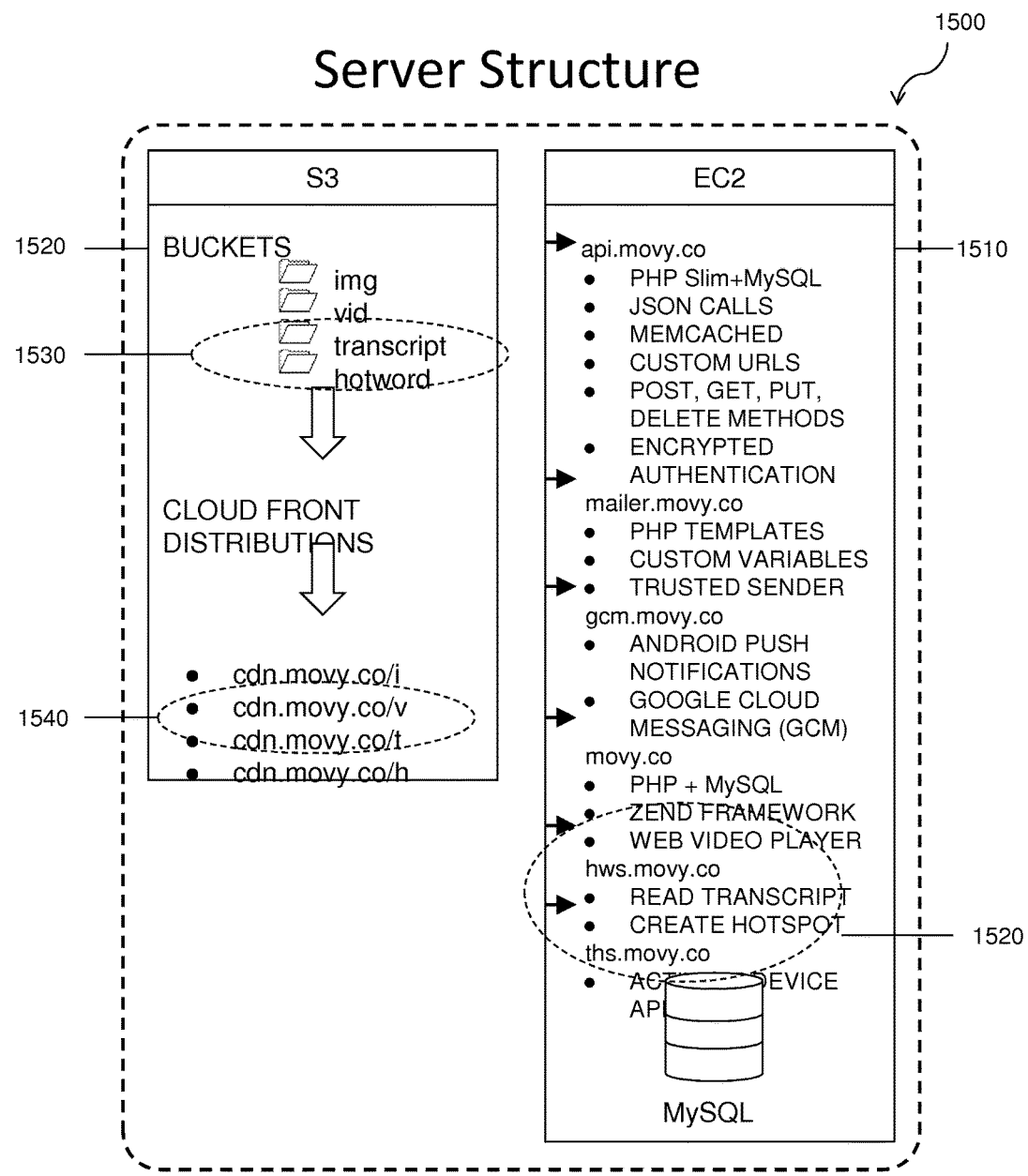
FIG. 15 shows an exemplary representation of cloud or server based elements used when providing search capabilities and/or supplemental data for videos in accordance with exemplary embodiments of the present disclosure.

FIG. 15 shows one examples of a basic structure of server based elements 1500 that can be implemented on a server. In an example embodiment, two basic elements used can include the Amazon S3 (Simple Storage Service) server 1520 and the Amazon EC2 (Elastic Compute) server 1510. In other embodiments of the present disclosure, other elements have similar capabilities can be used.

In addition to the basic function of the video messaging structure (e.g., as described with reference to FIG. 6), the S3 1520 or Simple Storage Service server can store text transcriptions associated with each video uploaded to the servers. For example, Amazon's Cloudfront Distribution Network (CDN) can make this data, in addition to the thumbnail image and video itself, available for search and distribution around the world. The S3 1520 server also contain another folder called "hotwords" 1530 that contains a library of context sensitive words and phrases that can be used to trigger embedded functionalities when viewed by the recipient upon playback. Some examples of such hotwords and phrases are "meeting", "search", "search for closest takeout", "find" and "contact".

In addition to the basic function of the video messaging structure (e.g., as described with reference to FIG. 6), the EC2 or Elastic Compute server 1510 contains two additional services, the "hws.movy.co" service or domain and the "ths.movy.co" service or domain 1550.

When a new video message is uploaded to the S3 server 1520, the hws.movy.co section or domain can access the transcript file and search for any of the aforementioned "hotwords" or phrases 1530. It can then create the embedded feature that is added to the video message upon playback.

These features include text information boxes, url links, links to calendar application on device and links to contact application on device.

The ths.movy.co section or domain can be used when the recipient taps on an embedded icon or link. It can activate the link or calendar or contacts application on the recipient's device and add the appropriate entry to that application.

Figure 16:
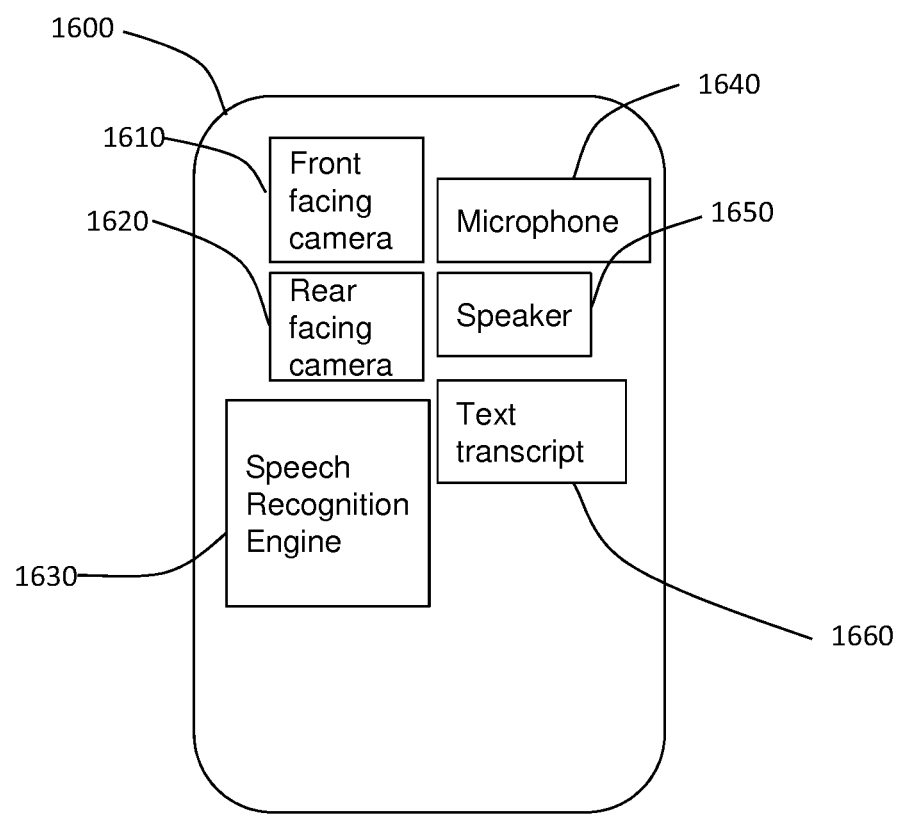
FIG. 16 shows an exemplary representation of elements of a user device for implementing search capabilities and/or supplemental data for videos in accordance with exemplary embodiments of the present disclosure.

FIG. 16 shows one example of a basic structure 1600 of device-based elements of a user device. These include the requisite hardware components such as cameras 1610 and 1620, microphone 1640 and speaker 1650 as well as software elements such as the device based Speech Recognition Engine 1630 and text editor 1660.

In this embodiment, three main operations constitute the application function. These operations are a combination of device-executed actions, server executed actions and user actions.

Figure 17:
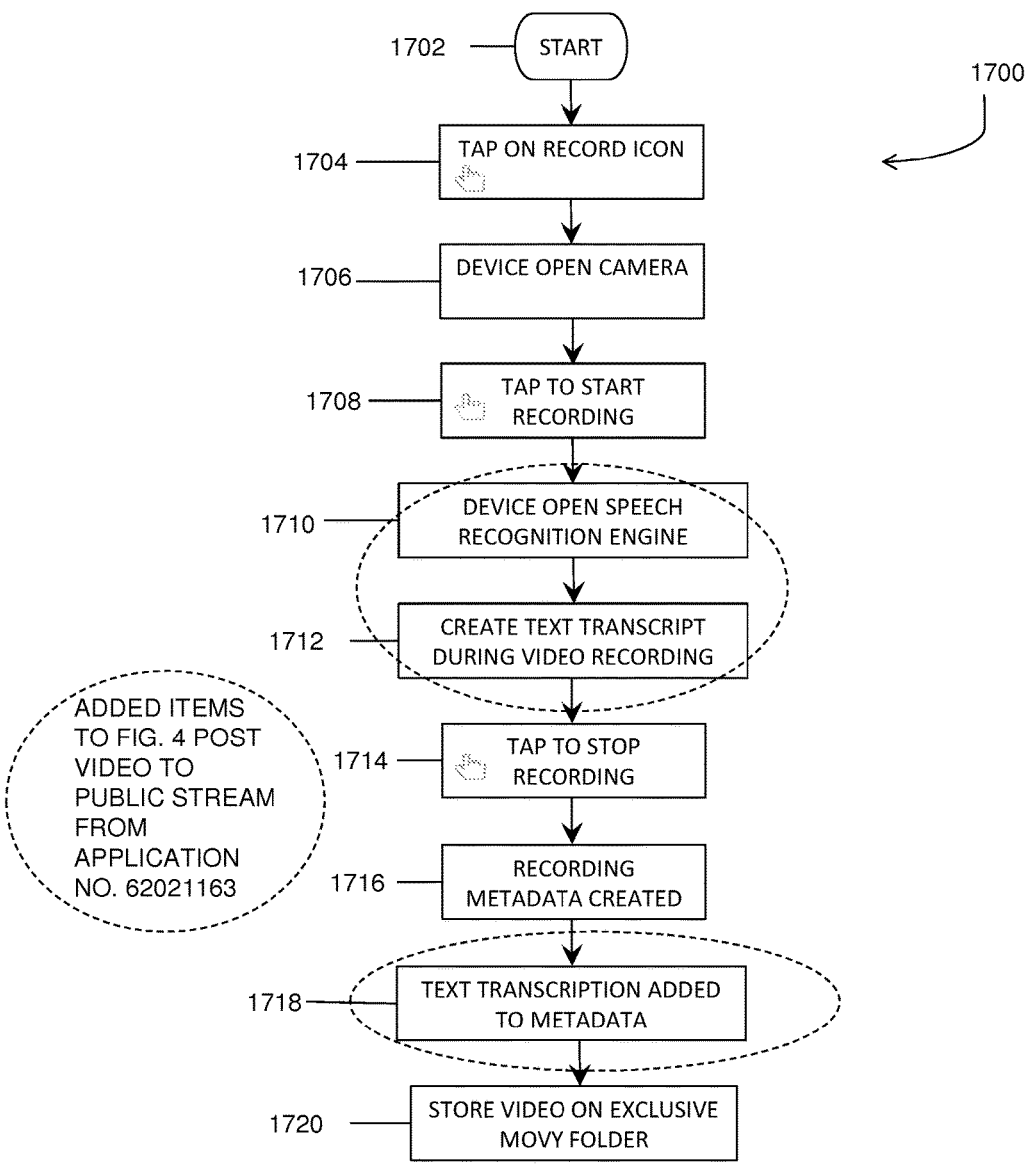
FIG. 17 is a flowchart illustrating a process for synchronous speech recognition and creation of a text transcript in accordance with exemplary embodiments of the present disclosure.

The first of these operations is speech recognition and creating a text transcript. FIG. 17 shows the user and background steps that can be used to create the text transcript of the spoken audio of the video message 1700. The operation starts 1702 with the user tapping on the record icon on the app user interface (UI) in operation 1704. In operation 1706, the camera is activated in video mode. In operation 1708, user then taps the record icon again to start the recording. In operation 1710 the device-based speech recognition engine is activated and in operation 1712 creates a transcript that is stored in the device's text editor or notepad app. In operation 1714 when the user taps the record icon again to stop the recording, in operation 1716 the message's metadata is created. In operation 1718, the text transcription from the editor is also added to the metadata. Finally, in operation 1720, the video and metadata are stored on the device and uploaded to the server.

Figure 18:
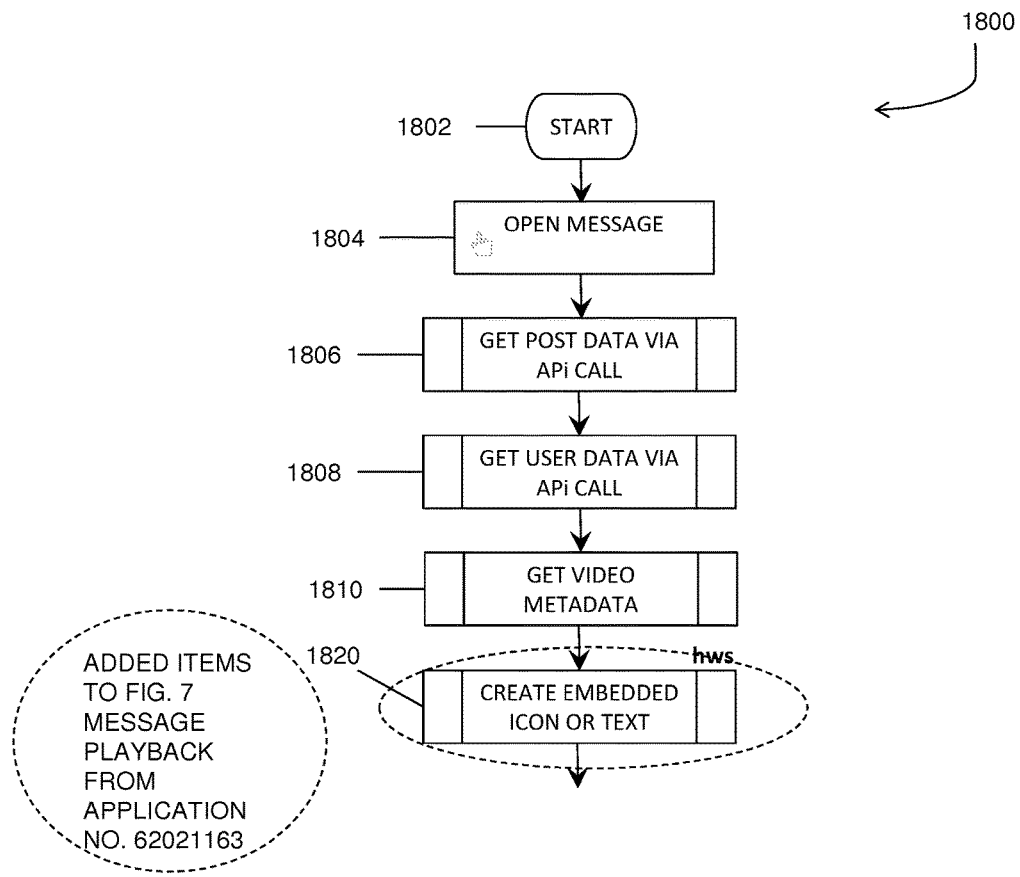
FIG. 18 shows a flowchart illustrating a process for adding embedded content to a video message in accordance with exemplary embodiments of the present disclosure.

FIG. 18 is a flowchart representation of the steps of the creation of the embedded hotspots on the recipient's screen during message playback as detailed 1800. The operation starts 1802 by the user tapping on the video message in operation 1804, where, in operation 1806, the device makes a request the APi cloud server service to retrieve the video message, its author in operation 1808 and additional metadata in operation 1810 such as video resolution, orientation, date, time, number of views, etc. This metadata also now includes the text transcript of the spoken audio in the message. In operation 1812 an embodiment of the video messaging application and/or platform creates the embedded icon or test using the hws server service. Furthermore, like the steps describing playing back a message described in FIG. 10 In operation 1012, the device's display aspect ratio is confirmed. In operation 1014, a request is sent to stream the video message. In operation 1016, the video is buffered. In operation 1022, the system determines if the video message is playable. If the video message is not playable another request to stream is sent out in operation 1014. In operation 1024, if the video message is playable the video is streamed to the device at the required aspect ratio which provides for a seamless and clean viewing experience for the recipient. Simultaneously (or substantially simultaneously), in operation 1016, the video message is marked as viewed and the view counter of the message is increased in operation 1018. Furthermore, in operation 1020, notices are added to the feed. In operation 1026, any addition responses to the message are also delivered and played on the device.

With the text transcript available, the user may now use this information to conduct a search for videos containing particular words or pertaining to a particular topic. The search functionality may also allow for searching by author, video size, number of views and user rating.

Figure 19:
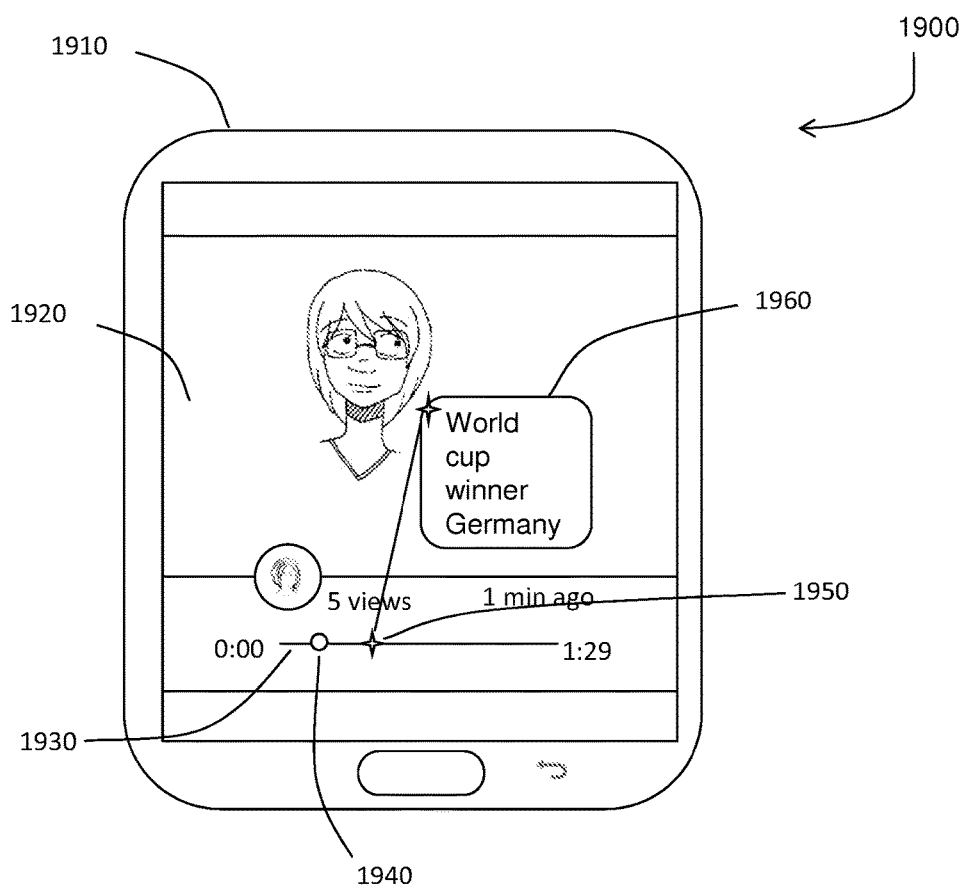
FIG. 19 is a plan view of a user interface (UI) showing an embedded hot spot in a video containing information in accordance with exemplary embodiments of the present disclosure.
Figure 20:
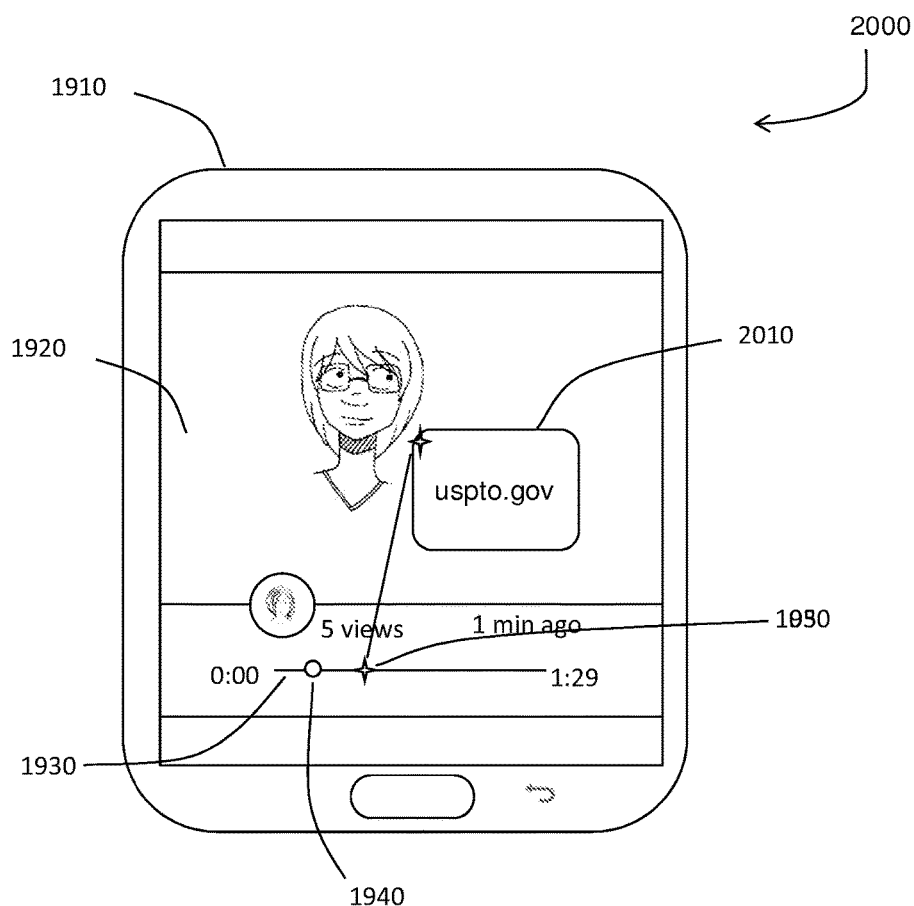
FIG. 20 is a plan view of a user interface (UI) showing an embedded hot spot containing a hyperlink in accordance with exemplary embodiments of the present disclosure.
Figure 21:
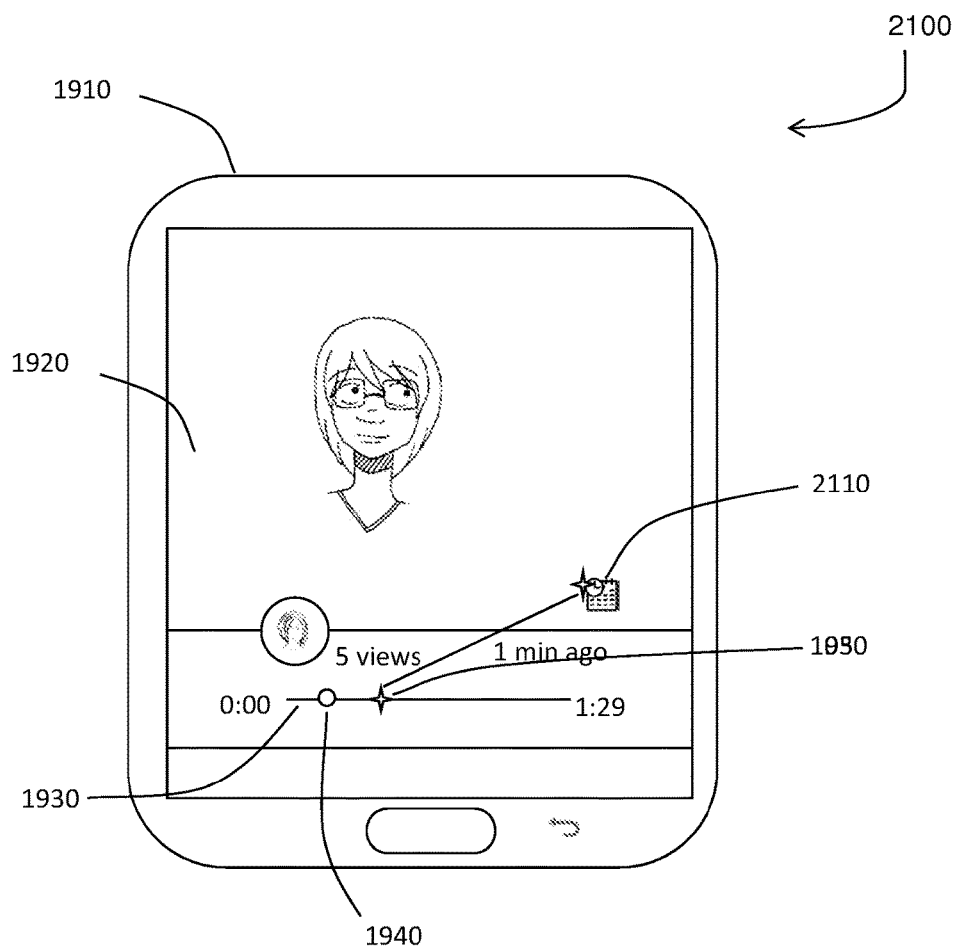
FIG. 21 is a plan view of a user interface (UI) showing an embedded hot spot containing task addition in accordance with exemplary embodiments of the present disclosure.

FIGS. 19-21 illustrates several examples of embedded hotspots viewable by the recipient upon video playback.

FIG. 19 illustrates playback user interface (UI) showing embedded hotspot with information 1900. The UI 1910 rendered on a display of the user device contains several key elements, including the playback screen 1920, message time progress bar 1930, time progress register 1940, hotspot time stamp 1950 and hotspot 1960. Hotspot 1960 contains the information and the entire hotspot box can be tapped to enable further functionalities. This hotspot can be created automatically when a hotword is found in the message text transcript and can be viewable to the recipient upon playback synchronized to the moment that it coincides with the video playback. For example, if the author states something about the World Cup and "World Cup" is a predefined hotword, then the hws service creates an embedded text box viewable to the recipient during message playback. This text box contains further information about the hotword, such as the winner of the most recent World Cup.

FIG. 20 illustrates playback UI showing embedded hotspot with url link 2000 that can be tapped to take the recipient to the specified link using the device based web browser. The UI 1910 rendered on a display of the user device contains several key elements, including the playback screen 1920, message time progress bar 1930, time progress register 1940, hotspot time stamp 1950 and hotspot 2010. Hotspot 2010 contains the url link and the entire hotspot box can be tapped to open the device's web browser with the specified hyperlink. This hotspot can be created automatically when a hotword is found in the message text transcript and can be viewable to the recipient upon playback synchronized to the moment that it coincides with the video playback. For example, if the author states that more information about patents may be found on the US Patent Office's website, the hws service creates an embedded text box containing a link to uspto.gov viewable to the recipient during message playback.

FIG. 21 illustrates a UI showing the embedded hot spot containing a calendar icon 2100 that can be tapped to automatically add an entry in the recipient's calendar app resident on the recipient's device. The UI 1910 rendered on the display of the user device contains several key elements, including the playback screen 1920, message time progress bar 1930, time progress register 1940, hotspot time stamp 1950 and hotspot 2110. Hotspot 2110 is a calendar icon. This hotspot can be created automatically when a hotword is found in the message text transcript and can be viewable to the recipient upon playback synchronized to the moment that it coincides with the video playback. For example, if the author requests a meeting with the recipient for a certain date and time, the hws service automatically creates an entry in the recipient's calendar app for the specified date and time and with the author listed as a participant as detailed in FIG. 22.

Figure 22:
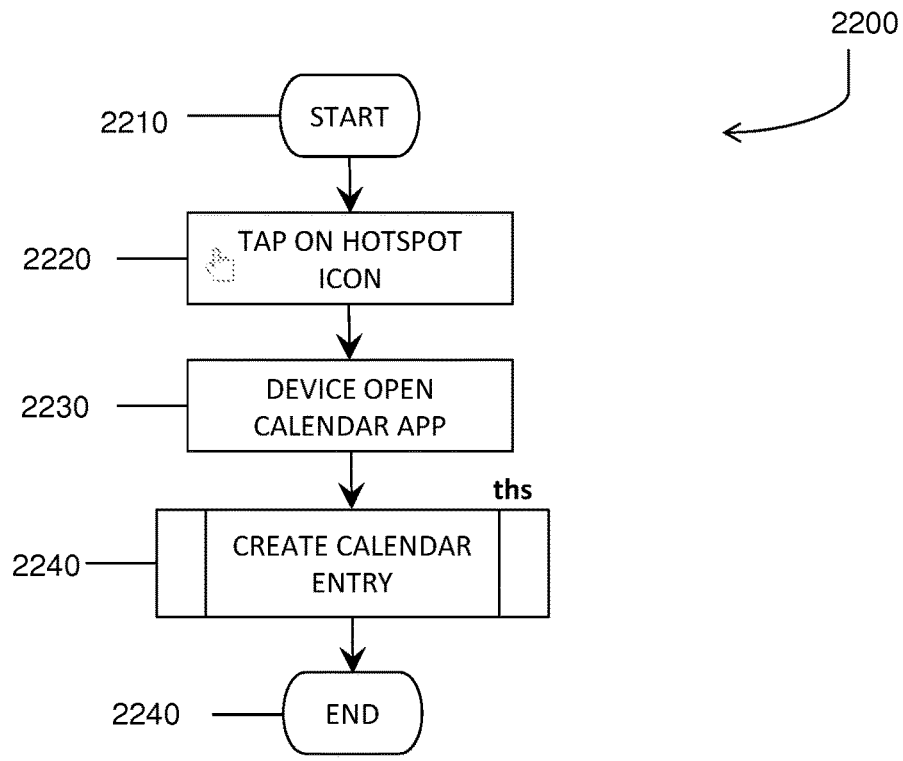
FIG. 22 shows a flowchart illustrating a process for creating an actionable task as an embedded hot spot in a video in accordance with exemplary embodiments of the present disclosure.

FIG. 22 illustrates a flowchart representation of the steps to create a calendar task with tapping a hotspot 2200. The operation is started 2210 when the user clicks on the hotspot icon in operation 2220. In operation 2230 the calendar application is launched on the device. In operation 2240 the user creates a calendar entry.

Other examples of hotspots include but are not limited to contacts, search bar and advertisements.

Broadly, the user device elements to execute the above-described features can include one or more cameras, one or more microphones, one or more speaker(s), hardware or software enabled home and return (escape) button, internal memory, central processing unit(s), graphic processing unit(s), operating system (OS). In particular, the video message recording device should have a video message recording elements, such as at least one camera. In some embodiments, the device can have at least two cameras facing in opposite directions (front and rear facing).

The advantages of the present disclosure include, without limitation, (i.) rapid text transcript creation by synchronous speech recognition, (ii.) context and time coupled embedded hotspots containing information or actionable tasks and (iii.) the ability with one tap, create a task or contact that enhances the user's productivity by minimizing or even eliminating additional steps.

It should be further noted that although the preferred embodiment is described in detail, other embodiments in having broader terms and constructions are envisioned.

In another embodiment of the present disclosure, the audio portion of the video message may contain audible sounds without spoken words. Examples include a baby crying, dog barking or music. These sounds can be synchronously recognized and a text description of these sounds can be added to the text transcript of the video message. Upon playback to the recipient, the message could include embedded content pertaining to these sounds. For example, if a video message is recorded with Mozart's "Requiem" playing it the background, then the recipient may view a embedded hotspot containing a link to a website selling Mozart's concertos.

In another embodiment of the present disclosure, video message may contain visual symbols or signs. Examples include a road sign, sports team jersey or brand logo. As with the system and method described in Example 1, these images can be synchronously recognized and a text description of these sounds can be added to the text transcript of the video message. Upon playback to the recipient, the message could include embedded content pertaining to these images. For example, if a video message is recorded by a person wearing a football team's jersey, then the recipient may view a embedded hotspot containing a link to a website selling team memorabilia. Alternatively, the sender may also be presented with an embedded hotspot with the same information during the recording of the original message or when he receives a response.

In another embodiment of the present disclosure, video message may contain notable facial information or features. Examples of notable facial features include earrings, glasses, bald-headed, scars or eye color. As with the system and method described in Example 1, these features can be synchronously recognized and a text description of these features can be added to the text transcript of the video message. Upon playback to the recipient, the message could include embedded content pertaining to these features. For example, if a video message is recorded by a bald-headed person, then the recipient may view a embedded hotspot containing a link to a website contain information about male-pattern baldness or one selling hair restoration services. Alternatively, the sender may also be presented with an embedded hotspot with the same information during the recording of the original message or when he receives a response.

Exemplary embodiments of the present disclosure can be created in HTML5 and executed on a compatible web browser. In this embodiment, the use of a web-powered application may potentially remove the device dependency or difficulties that arise from using a native application on different devices with different versions of the operating system.

VI. Exemplary Video Compression and Decompression Techniques

Exemplary embodiments of the present disclosure provide for compression and decompression videousing a video codec. For example, in order to efficiently compress video data, the color values for each pixel for every frame can be characterized and fingerprinted. Therefore instead of sending frame by frame color data, only the fingerprint can be sent. In some embodiments, the fingerprint can include only two numbers for each color element (i.e. red, green and blue) for a total of six numbers per pixel.

In the exemplary embodiments the codec can be designed to: (i.) create a numerical fingerprint for each pixel; (ii.) create a data file containing the data for all pixels of the video frame; (iii.) add additional header data to the data files and (iv.) decode the data file so that it may be viewed by the recipient.

Unlike conventional video compression/decompression schemes, exemplary embodiments of the video codec can create a data file that is not dependent on the length of the input video file. For example, in exemplary embodiments, the resultant compressed data file may only based on the resolution at which the video was originally recorded. Therefore, when compressed by the exemplary embodiments of the present disclosure, a video recorded at a resolution of 480p will be of a fixed size regardless of the length of the recording. This is accomplished by creating a fingerprint of the color data for each pixel through time. During the encoding, each pixel's color information (i.e. Red, Blue and Green color number) as a function of time is characterized by its fractal dimension and only the fractal dimension information and total duration of the video (both scalar numbers) are transmitted. When received, the fingerprint is used to regenerate the video file, pixel by pixel over time and then rendered to the recipient.

The codec can be implemented for videos in general and/or can be implemented for specific applications of videos, as such for use in or with a video messaging system that can be formed based on an execution of a video messaging application and a video messaging platform. While certain features and functions of exemplary embodiments may be described with respect to a non-limiting example embodiments (e.g., in a video messaging environment and/or on a mobile device), exemplary embodiments of the present disclosure can be implemented for video in general as well as for other applications for which video is utilized.

Figure 23:
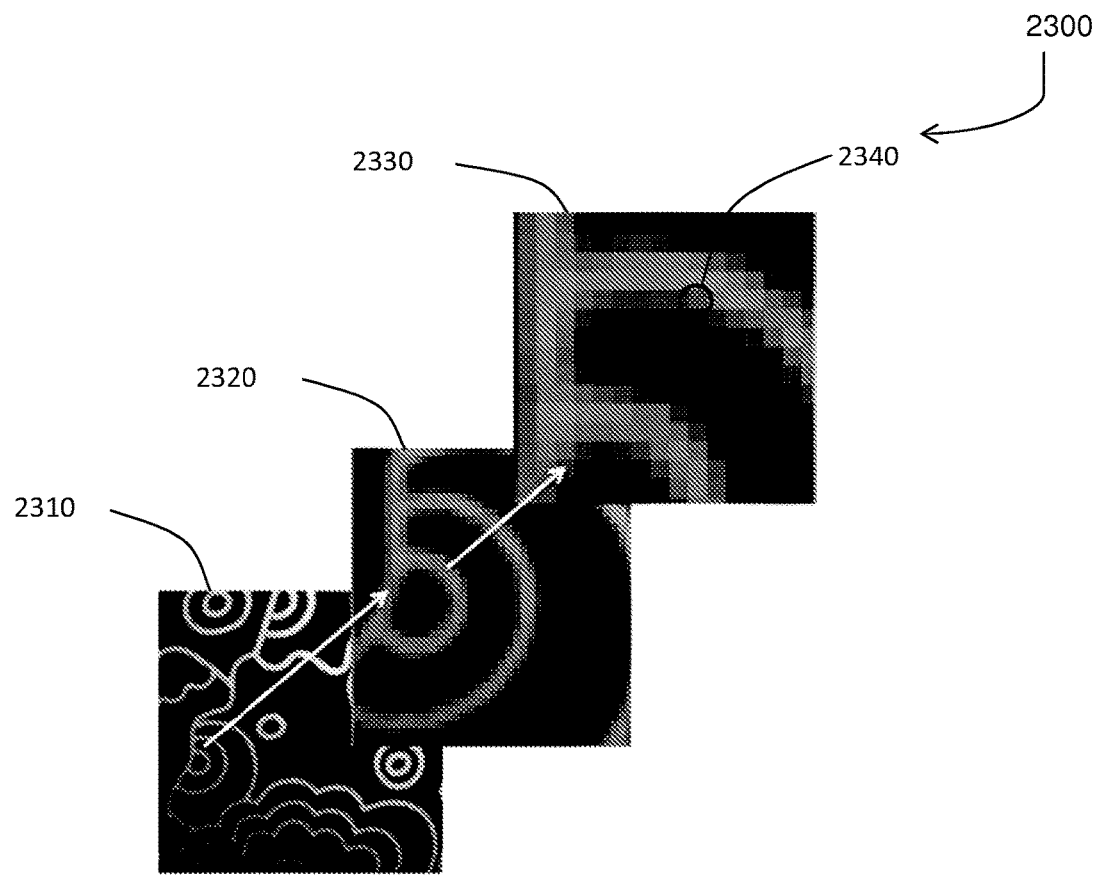
FIG. 23 shows an exemplary structure of a single frame of video having an array pixels in each frame in accordance with exemplary embodiments of the present disclosure.

FIG. 23 illustrates a video frame magnification to show pixels 2300. A video frame 2310 is an image made up of pixels. When magnified, in 2320 and further in 2330 these pixels 2340 are more apparent. Each pixel can be characterized with a RGB or red-blue-green color model. Alternatively, other color models such as a CMYK color model (cyan, magenta, yellow, and key), a LAB color model (CIE 1976, L*, a*, b* color space), HSV/HSL color model (cylindrical-coordinate representations of points in an RGB color model), and NCS (Natural Color System) color model can be utilized.

Figure 24:
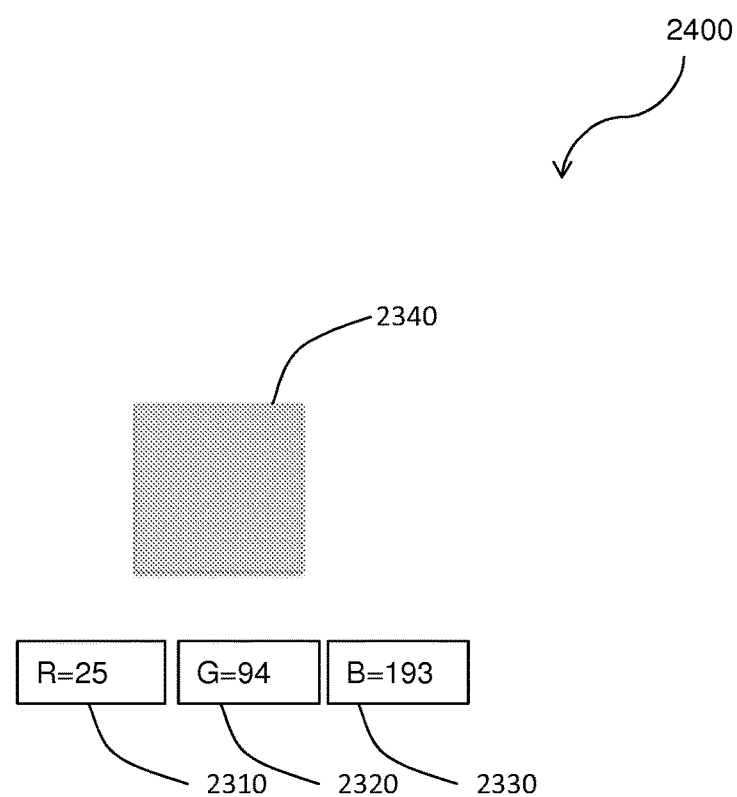
FIG. 24 shows color information of each pixel, red, blue, green in an exemplary single frame of video in accordance with exemplary embodiments of the present disclosure.

FIG. 24 shows one example of a color information for a given pixel. Each pixel 2340 is represented by a red value 2410, green value 2420 and blue value 2430, each between 0 and 255.

Figure 25:
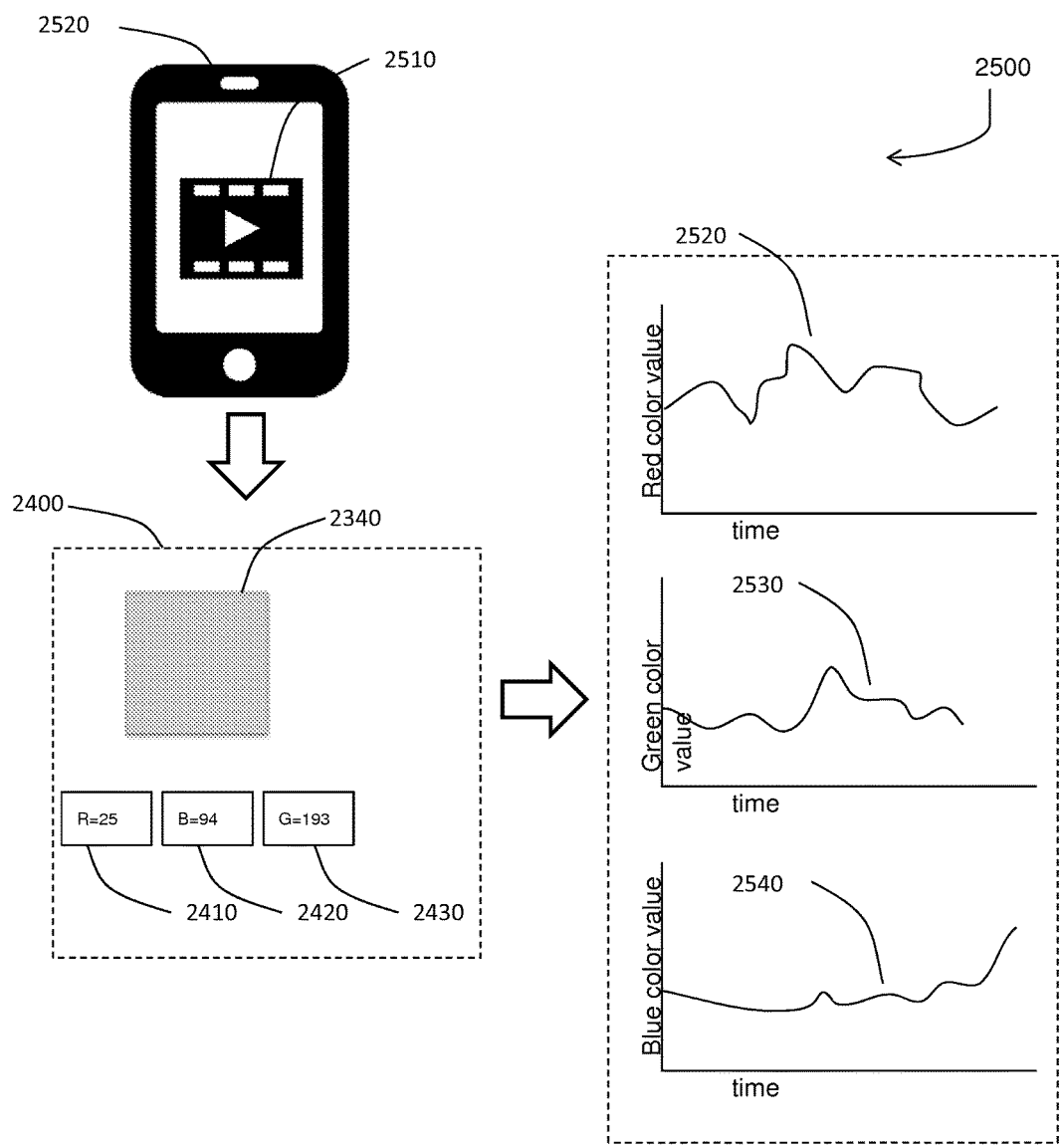
FIG. 25 is a graph showing an exemplary change in a color number for a pixel over time in accordance with exemplary embodiments of the present disclosure.

FIG. 25 shows one example of how the color information for each pixel changes throughout the length of the video.

For a given video recorded on a device 2520, each video frame 2510 consists of a frame measuring X pixels wide and Y pixels high. Each pixel 2340 as detailed in FIG. 24 is defined by its red, green and blue value. As the video unfolds, the color information for each pixel 2340 changes from frame to frame as a function of time. The rendering of these changing pixel makes up the content of the video. The plot 2530 of the red color value as a function of time details its fluctuation based on the video content. A similar plot may be constructed for the green color values 2530 and blue color values 2540.

In an example embodiment for which the codec is implemented, for example, on a user device, such as a mobile device, four main services or subroutines are employed to execute the codec. These subroutines are mainly device-executed actions and may be further optimized depending on the operating system (OS), device chipset and memory.

A "DIMCALC" subroutine uses the video color plot for each pixel and calculates the fractal dimension of the line using the box counting method. The box counting method is defined by Equation 1 below.

$$\mathrm{Log}(N(r)) = D \cdot \mathrm{Log}(1/r) + \mathrm{Log}(k) \tag{1}$$

Figure 26A:
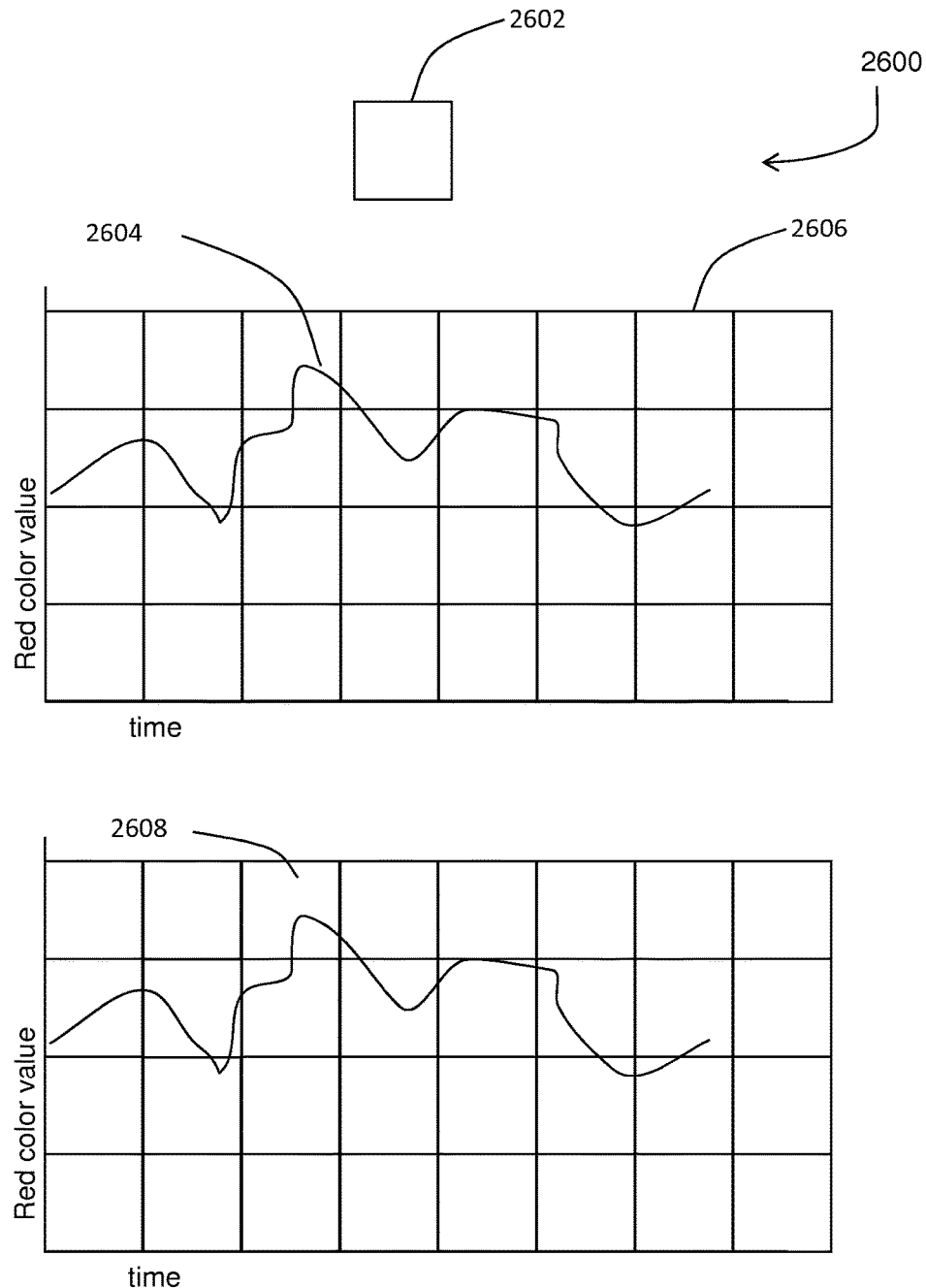
FIG. 26A illustrates a box counting method according to an exemplary embodiment.
Figure 26B:
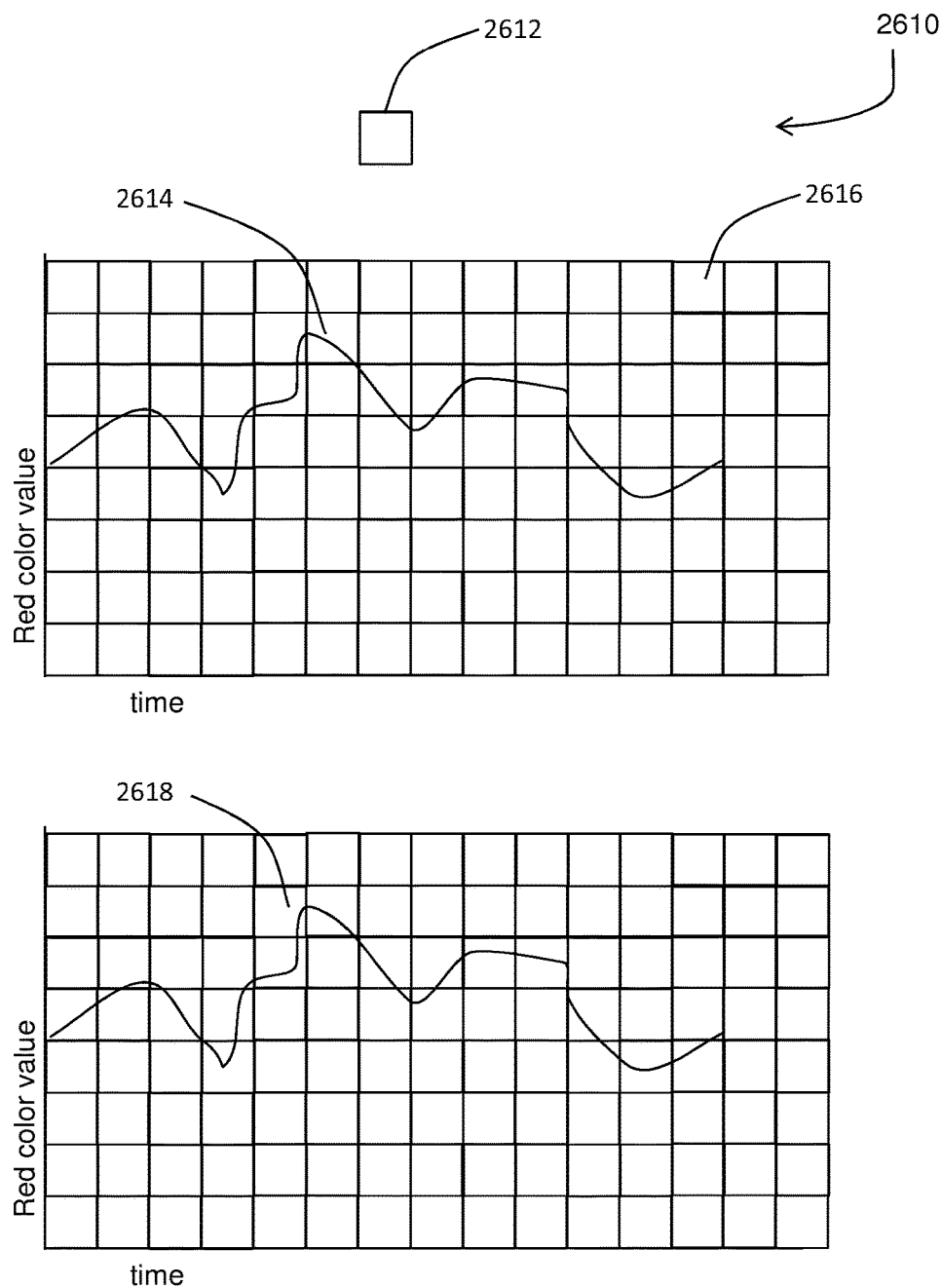
FIG. 26B illustrates a box counting method according to an exemplary embodiment.

The box counting method is a technique for calculating fractal dimension "D" by first partitioning the graph 2606 into boxes of size $r_1$ 2602. The "box counting" is the number of boxes $N_{r1}$ that captures the color value plot. FIG. 26A illustrates a boxing counting method 2600. The box that contains a segment of the plot is colored gray 2602 and is counted by the subroutine DIMCALC. The subroutine continues by reducing the box size to ¼ the size of $r_1$. This $r_2$ box 2612 as illustrated in FIG. 26B is now used to partition the same plot 2604 and again the number of boxes capturing the plot 2604 is counted as $N_{r2}$. This subdivision of $r_1$ is continued for n number of times. In most cases n is equal to 4 or 5 subdivisions.

Figure 26C:
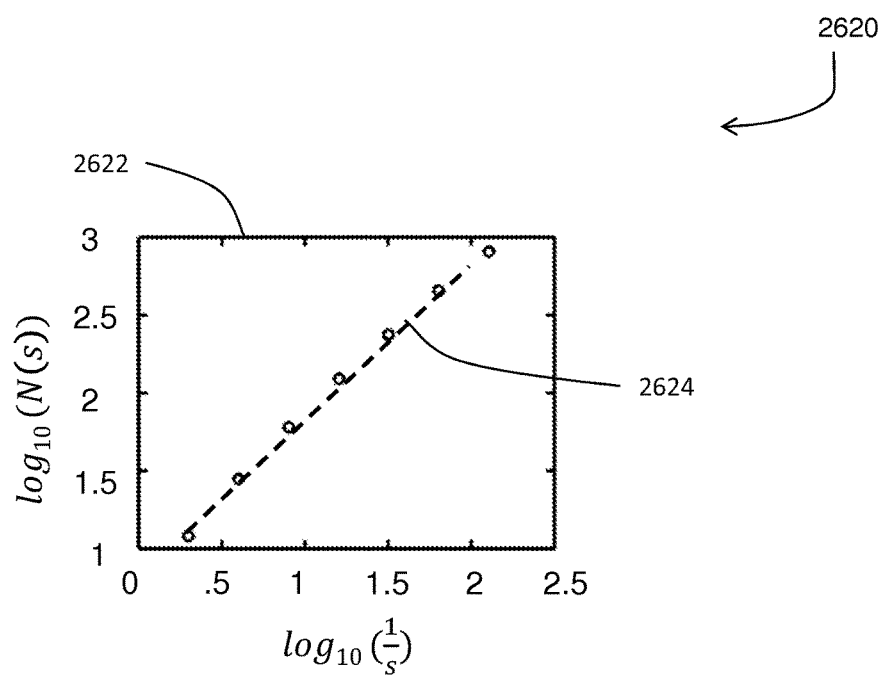
FIG. 26C is a graph showing a calculation of a fractal dimension, slope and y-intercept in accordance with exemplary embodiments of the present disclosure.

FIG. 26C illustrates the calculation of fractal dimension 2620. To calculate D, $\mathrm{Log}(N_r)$ is plotted against $\mathrm{Log}(1/r)$ 2622 and the best fit linear regression line fitting Equation 1 is calculated. From the regression 2624, both the fractal dimension D and the y-intercept $\mathrm{Log}(k)$ is obtained for each pixel. Therefore, regardless of the length of the video, each pixel color data is represented by only D and $\mathrm{Log}(k)$. This process is repeated for the green and blue color numbers. Alternatively, the plots for red, green and blue may be combined into one plot or the three plots may be computed simultaneously. The process is then repeated for each pixel in the video frame. If the video frame is 480p or 480×640 pixels, DIMCALC is employed 307,200 times. Although this may sound CPU intensive and require a significant amount of time to execute, significant effort has been undertaken to create box-counting algorithms that, when coded and executed, are extremely fast. See, e.g., B. S. Raghavendra, and D. Narayana Dutt detail in their 2010 publication "Computing Fractal Dimension of Signals using Multiresolution Box-counting Method" in International Journal of Information and Mathematical Sciences 6:1 2010, which are incorporated by reference herein in their entirety and show that using the Sevcik or MRL method, the fractal dimension D may be calculated in approximately 0.001 seconds per 10000 sample points. Each plot in this example is sampled approximately 1000 times. This results in a calculation time of 0.00001 seconds per calculation.

An "ENCODER" subroutine takes the output for each color and pixel and creates a simple data file with the values for the fractal dimension D and y-intercept $\mathrm{Log}(k)$. For example the "ENCODER" subroutine creates a string of six digits that are the values for each color of each pixel. Therefore for a given pixel and color, a D of 1.22 and y-intercept of 1.04 would be represented as 122104 knowing that the first three digits pertain to the fractal dimension D and the next three pertain to the y-intercept. The ENCODER subroutine strips the decimal points knowing that only two significant digits after the decimal are encoded. For a 480p video frame, the ENCODER subroutine creates a data file that is approximately 800 kb or 0.8 MB. For a 720p resolution video, the ENCODER subroutine creates a data file that is 2.4 MB. For a 1080p resolution video, the ENCODER subroutine creates a data file that is 5.4 MB.

A "READER" subroutine is utilized by the recipient's device. It parses the encoded data file and regenerates the fractal dimension D and y-intercept $\mathrm{Log}(k)$ values from the integer data. Therefore from the above "ENCODER" example, the "READER" subroutine reads the values 122104 and translates it to 1.22 and 1.04 which are the values of the fractal dimension D and y-intercept $\mathrm{Log}(k)$ for a given pixel.

A "DECODER" subroutine is utilized by the recipient's device. It recreates the video file by creating a proxy plot for each color. The subroutine then adjusts the color values for the plot until the simple linear regression for Equation 1 converges to the transmitted values.

In this embodiment, two main operations constitute the application function.

The first of these operations is the encoding of the captured video file or message.

Figure 27:
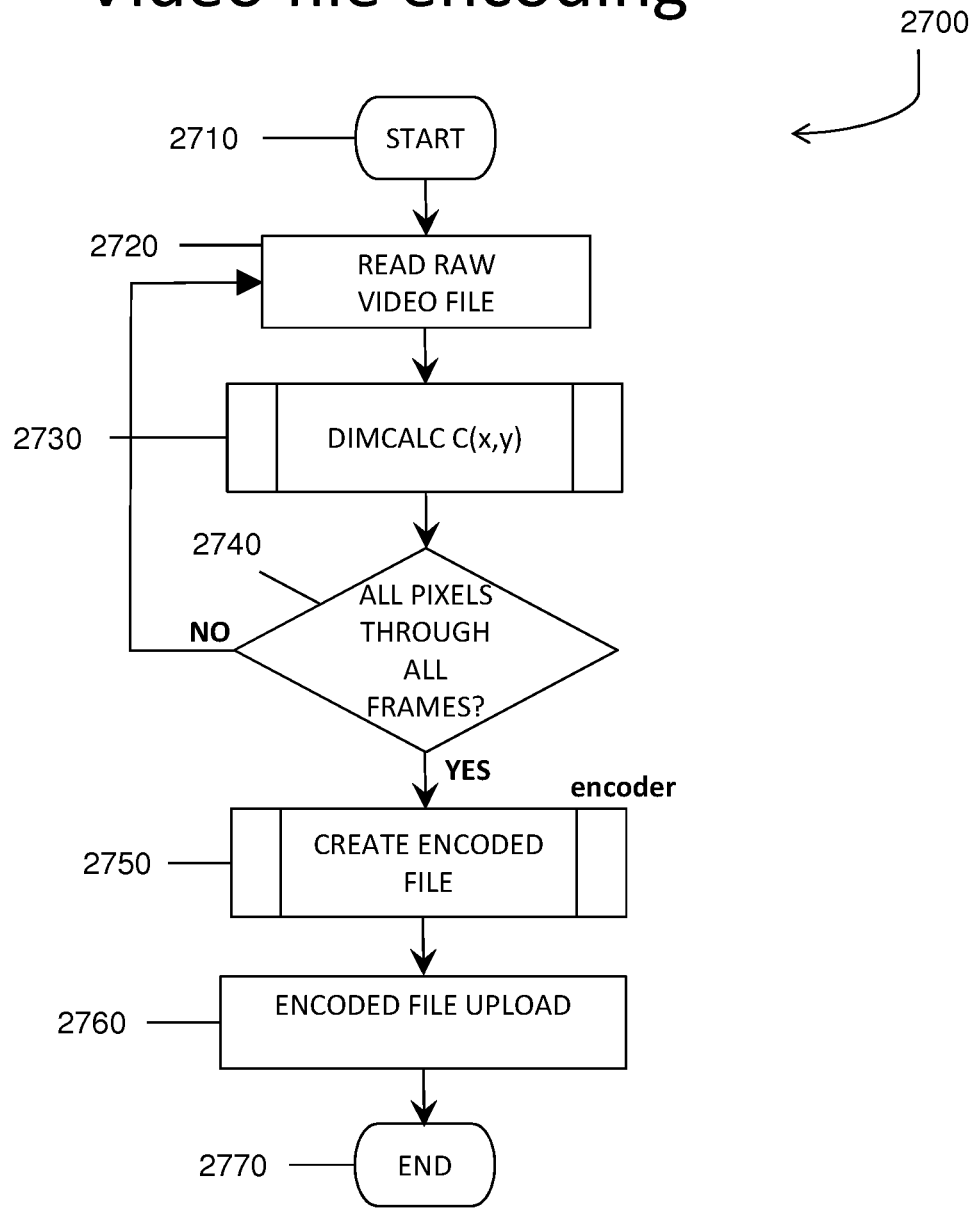
FIG. 27 is a flowchart illustrating a process of encoding a video file to compress the video file in accordance with exemplary embodiments of the present disclosure.

FIG. 27 is a flowchart detailing an exemplary encoding process 2700. The process begins at step 2710. In operation 2720, a raw video file is read into the DIMCALC subroutine. In operation 2730 the fractal dimension D is calculated for each pixel and color as described herein with respect to the DIMCALC subroutine. In operation 2740 the system determines the factual dimension has been calculated for all the pixels through all the frames. In operation 2750 the ENCODER subroutine creates the encoded file ready for upload and transmission via a communications network (e.g., mobile network). In operation 2760 the encoded file is uploaded.

Figure 28:
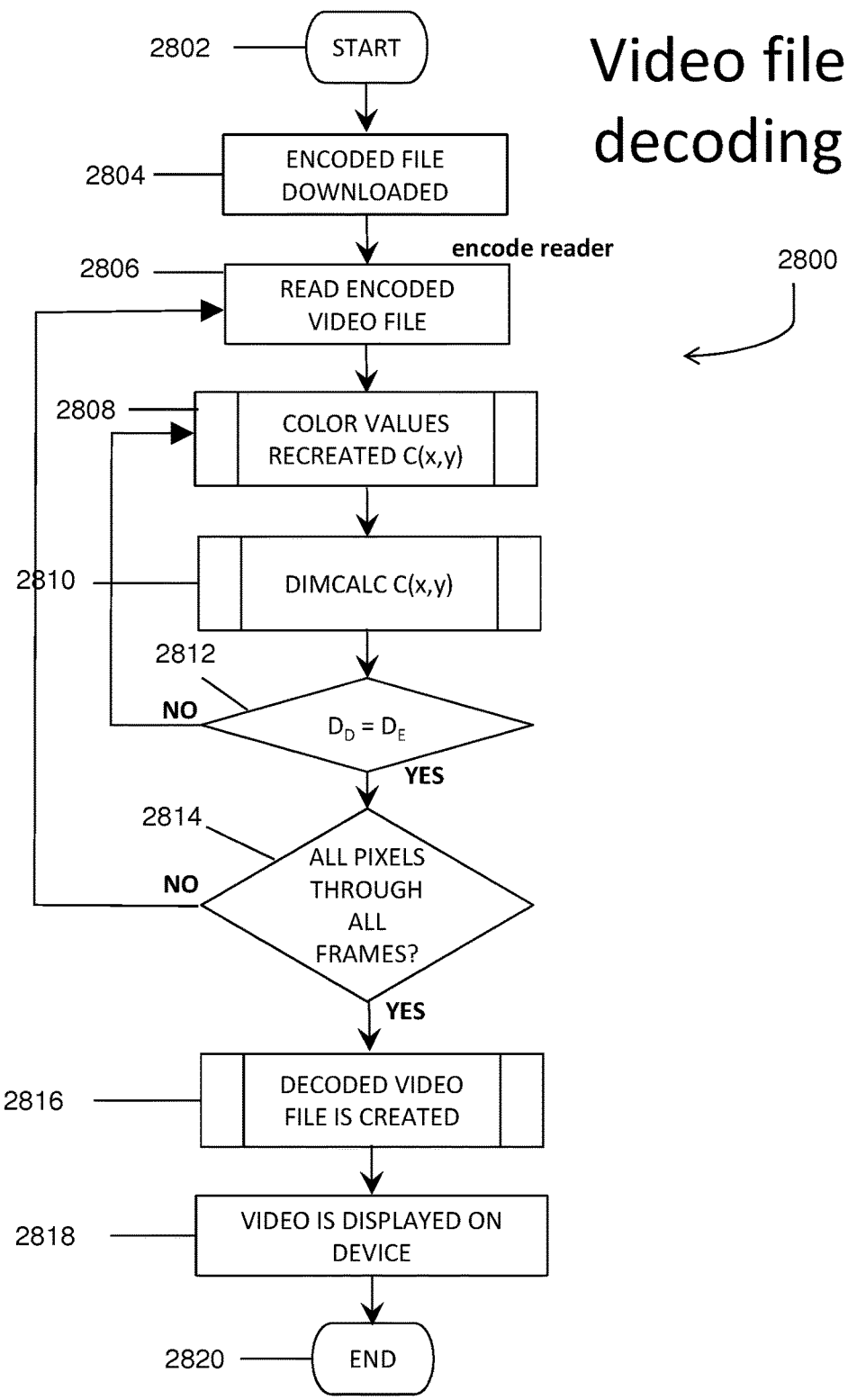
FIG. 28 is a flowchart illustrating a process of decoding an encoded video file to decompress the video file.

FIG. 28 illustrates a decoding process 2800 for decoding of a transmitted compressed/encoded video file into a viewable video. The process begins at 2802. In operation 2804, an encoded video file (that has been encoded according to exemplary embodiments) is downloaded to a user device. In operation 2806, the encoded video file is then read by the READER subroutine. In operation 2808, the DECODER subroutine creates a proxy plot for each color versus time. In operation 2810 and 2812, DIMCALC then iterates by changing the color values until D for the decoding operation ($D_D$) equals D for the encoding operation ($D_E$). This is replicated for each pixel, thereby recreating the color values for each color as a function of time. In operation 2816 the decoded video file is then created using these values and in operation 2818 the decoded video is displayed on the user device.

It is important to note that with the assistance of the subroutines, the calculation and therefore data file size does not increase with the length of the video. The color number plot is "box counted" by increasing or decreasing the size of the initial box and therefore does not change the computational time. However, with ever increasing video length, the is some loss to the accuracy of the video decoding.

Broadly, the user device elements used to execute the codec can include one or more central processing units (CPUs), one or more graphic processing units (GPU) and an operating system (OS). Processing may be further optimized by incorporating one or more of the disclosed subroutines within the OS kernel or even within the CPU or auxiliary processing chip such as a floating point unit (FPU).

The application can be coded to operate in any operating system, including but not limited to Android OS, iOS from Apple Inc., MS Windows from Microsoft Corporation.

Advantages of exemplary embodiments of the codec include, without limitation, (i.) simplified data encoding and decoding; (ii.) greatly reduced data file for transmittal via bandwidth strapped mobile networks; (iii.) datafile size purely based on the video resolution and not the length of the video.

Advantages of exemplary embodiments of the codec of the present disclosure are further illustrated by the following comparative examples.

Table 4 provides a data file comparison in which the data file size of disclosed video file encoded using an exemplary embodiment of the present disclosure is compared to data file sizes of the video file compressed using MPEG-4.

TABLE 4

| CODEC method | 480 p video File size (MB) | 720 p video File size (MB) | 1080 p video File size (MB) |
| --- | --- | --- | --- |
| MPEG-4 (1 min video) | 28.2 | 85.5 | 137.2 |
| MPEG-4 (5 min video) | 141 | 428 | 686 |
| Example 1 (independent of video length) | 0.8 | 2.4 | 5.4 |

Table 5 provides a data file upload time comparison between for a video file encoded using an exemplary embodiment of the codec of the present disclosure and for the video file being encoded using MPEG 4. The upload time required for each of these files is provided using both 3G and 4G LTE network speeds.

TABLE 5

| CODEC method | 3 G Network | 4 G LTE Network |
| --- | --- | --- |
| Data rate | 0.72 MB/sec | 6.25 MB/sec |
| MPEG-4 - 480 p (1 min video) | 39.2 sec | 4.51 sec |
| MPEG-4 - 480 p (5 min video) | 196 sec | 23 sec |
| Example 1 - 480 p (independent of video length) | 1.1 sec | 0.13 sec |

Table 6 provides an encoding computational time comparison between an encoding computational time for a video file encoded using an exemplary embodiment of the codec of the present disclosure and for the video file being encoded using MPEG 4. The computational encoding times are provided for several video resolutions.

TABLE 6

| Video resolution | Pixel count | Encoding time (seconds) |
| --- | --- | --- |
| 480 p | 307,200 | 3.07 |
| 720 p | 921,600 | 9.21 |
| 1080 p | 2,073,600 | 20.73 |

Table 7 combines the encode and upload time to compare the present disclosure as described herein with the MPEG-4 codec. It is important to note that the encode and upload time for exemplary embodiments of the codec of the present disclosure do not change with video length or duration. As no estimate was readily found for the MPEG-4 encoding, only the upload time was compared.

TABLE 7

| Video resolution | Network | Example 1 Encode + Upload time in seconds | MPEG-4 upload time - 1 min video in seconds | MPEG-4 upload time - 5 min video in seconds |
| --- | --- | --- | --- | --- |
| 480 p | 3 G | 4.18 | 39.17 | 195.83 |
| 480 p | 4 G LTE | 3.20 | 4.51 | 22.56 |
| 720 p | 3 G | 12.55 | 118.72 | 593.58 |
| 720 p | 4 G LTE | 9.60 | 13.68 | 68.38 |
| 1080 p | 3 G | 28.24 | 164.38 | 821.92 |
| 1080 p | 4 G LTE | 21.60 | 22.30 | 111.50 |

In exemplary embodiments, the accuracy of the decoded video may be further enhanced by including time dependent markers to the encode file. These markers for example would be the actual color values of the red, green and blue color channels at defined time intervals, such as, for example, every 20 seconds. This additional information would have a negligible effect on the encoded file size.

In another embodiment, the fingerprint used may be a curve fitted equation of the color values over time. Again, only the coefficients of the fitting equation would need to be transmitted. Examples of such curve fitting equations are Fourier Series, Legendre Polynomials and Trigonometric equations.

Multiple video messages, i.e. video threads as described herein may be encoded using the codec to further enhance the delivery of not just one but multiple video messages in series.

Although not detailed, audio information frequently accompanies video data. These audio tracks may be encoded by traditional methods or by the method as described herein that are adapted for audio information.

Exemplary embodiments of the codec can be implemented on various devices with one or more CPU's or in other modalities, such as tablets, netbooks, notebooks and laptops, smart watches, wireless enabled digital cameras or video cameras, application on flash drive inserted into any camera enabled device, headphones, wireless & camera enabled TV's (smart TVs), game consoles, VOIP phones, media (MP3) players, virtual reality viewers. In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

V. Exemplary Video Message Resolution Capture Embodiment

Exemplary embodiments of the present disclosure provide for capture of a multimedia file's or video message's resolution (i.e., number of pixels wide "W" and number of pixels high "H") and the recording device's orientation at time of image capture. The picture or video can be captured by the device's camera sensor that is activated by the image capture application. For example, exemplary embodiments described with reference generally to FIGS. 29-37F can capture a picture using the native camera application of a smartphone or specialty image capture application can be 640 pixels wide by 480 pixels high, having an aspect ratio of 1.333. A video recorded using similar means can be 1280 pixels wide by 720 pixels high, having an aspect ratio of 1.77 and a duration of 1 minute 33 seconds. Depending on the orientation of the recording device, which can change during the recording, the size and aspect ratio may vary over the duration of the video. The video's orientation and the resolution can be captured over the duration of the video, as well. This information, as such metadata, is attached to the image file and is, for example, stored in the capturing device.

Exemplary embodiments, of the present disclosure be designed to upload the captured data to a server e.g., cloud server. The data may also be directly transmitted via short messaging service (SMS) text messaging to the recipient's playback device.

Furthermore, in exemplary embodiments of the present disclosure, can also be designed such that the metadata may be understood by an application (app) running on the capturing device and playback device. Portions of these applications may also run on a cloud server that stores, manipulates and relays the multimedia files and relevant data, including metadata, required to render the files properly. The cloud server therefore also contains an application database which stores, row by row, details of each image file such as where it is stored, who authored it, location, etc.

Furthermore, in exemplary embodiments of the present disclosure can also be designed to extract orientation data and make a redundant record in the application's database. Extraction of the metadata can be achieved by standard methods known to one skilled in the art, such as by a server run API or subroutine that scans the image file's metadata. For example, if the orientation tag in a video file's metadata is 90°, the server run API utilizes a "string rotation" command that extracts only the orientation information (i.e. 90°) and stores it in the application database row pertaining to the particular video file.

Furthermore, in exemplary embodiments of the present disclosure can also be designed to render the picture or playback the video when required by a rendering display or playback device in the orientation that the display or device is held without distortion or rotation, such that the image may be viewed correctly.

While certain features and functions of exemplary embodiments are described with respect to a non-limiting example embodiment of a video messaging system including video messaging application being executed by a user device, exemplary embodiments of the present disclosure can be implemented for video in general as well as for other applications for which video is utilized.

Figure 29:
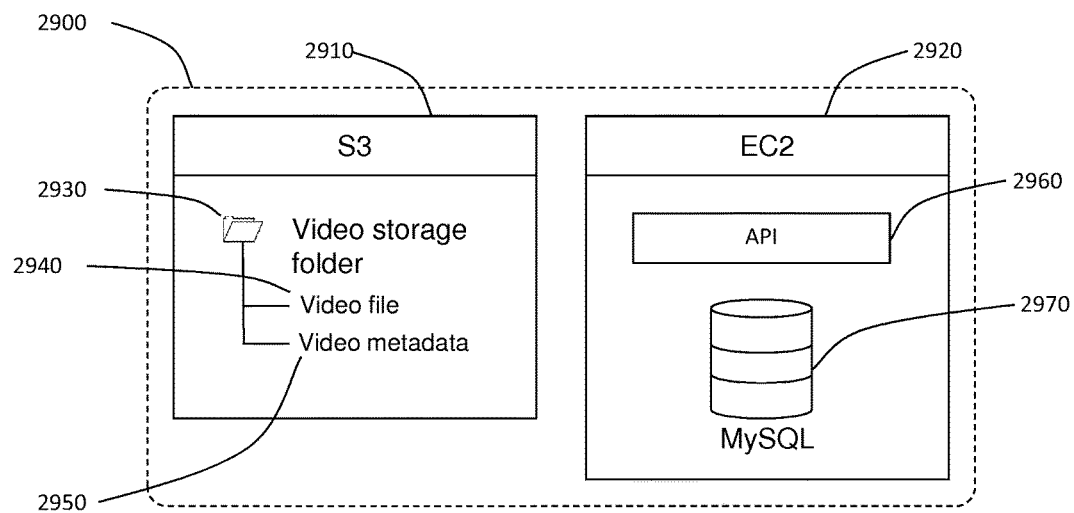
FIG. 29 shows a representation of a cloud or server elements.

FIG. 29 shows one example of the basic server 2900 elements. The two basic elements used are the S3 storage server 2910 and the EC2 compute server 2920. The S3 storage server 2920, among other elements and capabilities, contains a file folder 2930 that contains the video files 2940 and their respective metadata 2950. The EC2 compute server 2920, among other elements and capabilities, contains the application API or instructions 2960 and a MySQL database 2970 that contains the records of all the videos in the S3 server 2920. Each record contains the location or URL of the video, its author's information, duration and other attributes required by the application.

Figure 30:
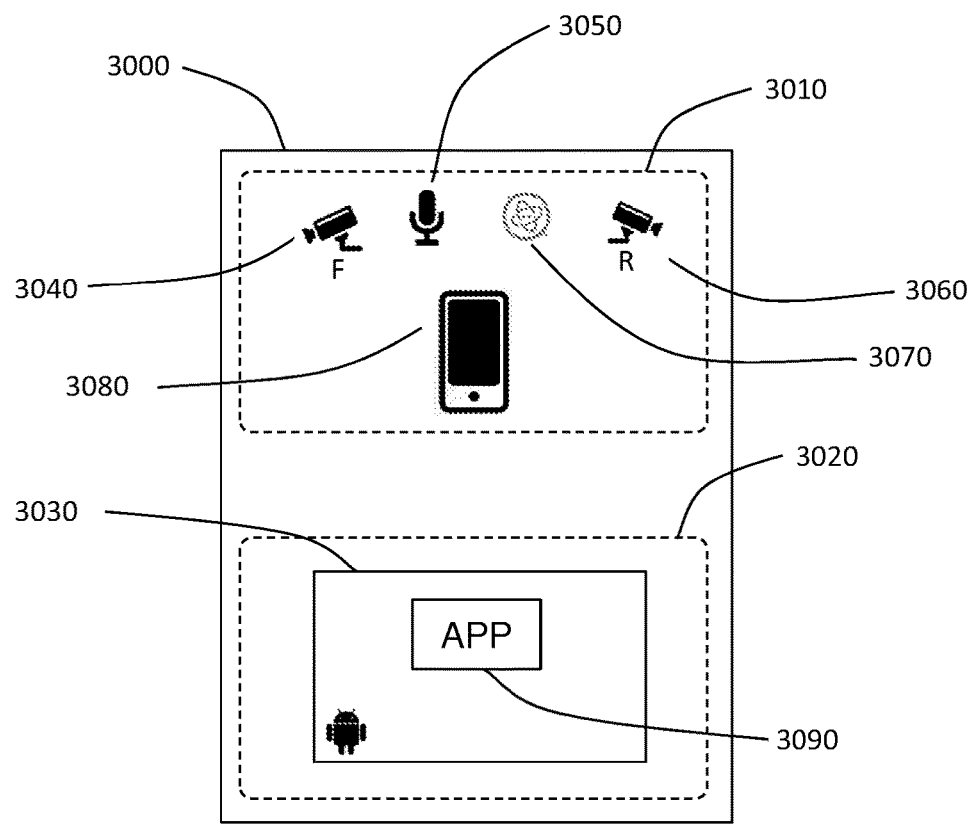
FIG. 30 shows a representation of a mobile device elements.

FIG. 30 shows one examples of a basic structure of these device-based elements 3000. These include the requisite hardware components 3010 such as front facing camera(s) 3040, rear facing camera(s) 3060, microphone(s) 3050, gyroscope(s) 3070 and display 3080, as well as software elements 3020 such as the operating system or OS 3030 and video player application 3090.

Figure 31:
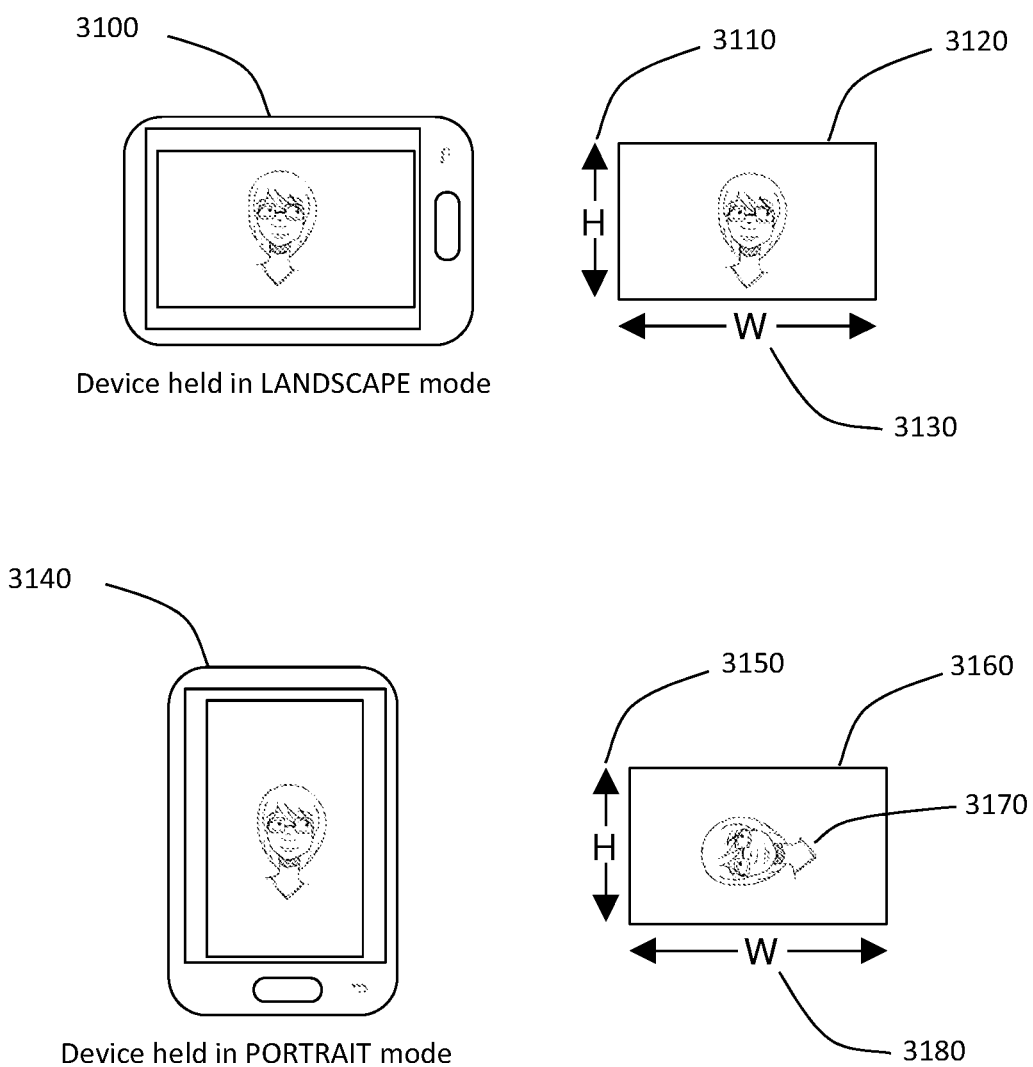
FIG. 31 shows the resultant orientation of a video recorded from a mobile device in landscape and portrait mode including the width (W) and height (H) dimensions.

FIG. 31 shows a video recording device held in landscape mode 3100 and the resultant video captured and saved 3120 with the respective height "H" 3110 and width "W" 3130 dimensions indicated. Furthermore, FIG. 31 shows a video recording device held in portrait mode 3140 and the resultant video captured and saved 3160 with the respective height "H" 3150 and width "W" 3180 dimensions indicated. Note that the video content 3170 is rotated to the left 90° and that the height dimension is always along the y-axis of the video and the width dimension is always along the x-axis of the video. This is particularly important as camera sensors always record and store the videos in landscape view (as depicted in FIG. 31). Therefore a video recorded with a device held in portrait results in a video that is saved in landscape view with the video rotated 90° to the left.

This is due to the fact that when originally create the video formats and resolutions were designed for television displays which are usually in landscape. The standard video resolutions recorded by the device cameras are as follows (in W×H notation): i. 640×480 or 480p—standard definition or SD with an aspect ratio of 4:3 or 1.33; ii. 1280×720 or 720p—high definition or H-D with an aspect ratio of 16:9 or 1.77; iii. 1920×1080 or 1080p—high definition or HI-D with an aspect ratio of 16:9 or 1.77; and iv. 3840×2160 or 2160p—ultrahigh definition or UHD with an aspect ratio of 16:9 or 1.77.

Figure 32:
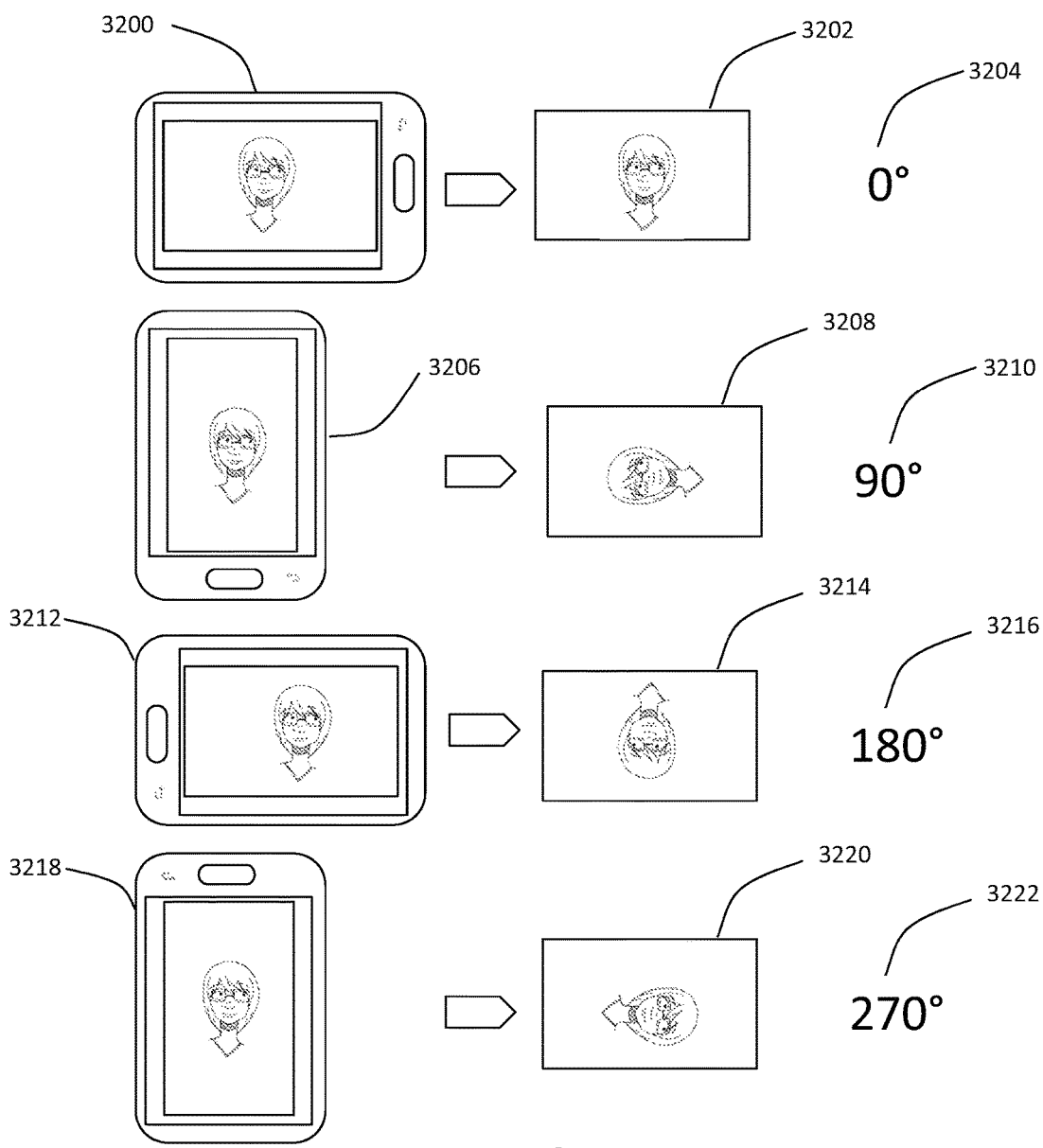
FIG. 32 shows the angle required to rotate a resultant video given the orientation of the recording device for all four expected orientations.

FIG. 32 shows a various orientations that the video recording device may be held while recording a video and the ensuing orientation and orientation metadata. For example, when the recording device is held in landscape mode with the bottom of the device pointing to the right 3200 the captured video 3202 has the same orientation as when previewed on the device and therefore the orientation added to the metadata 3204 is 0°. For example, when the recording device is held in portrait mode with the bottom of the device facing downwards 3206 the captured video 3208 is rotated to the left by 90° when compared to when previewed on the device and therefore the orientation added to the metadata 3210 is 90°. For example, when the recording device is held in landscape mode with the bottom of the device pointing to the left 3212 the captured video 3214 is upside down as when previewed on the device and therefore the orientation added to the metadata 3216 is 180°. Finally, for example, when the recording device is held in portrait mode with the bottom of the device facing upwards 3218 the captured video 3220 is rotated to the right by 90° when compared to when previewed on the device and therefore the orientation added to the metadata 3222 is 270°. This additional orientation angle provides the instruction to the playback device to rotate the video by the given angle to have it properly displayed on the PBD.

Figure 33:
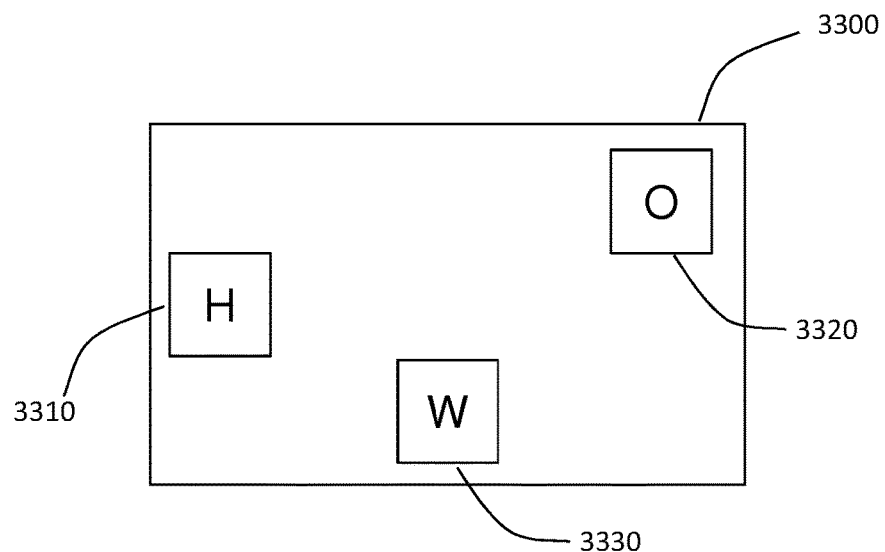
FIG. 33 shows video metadata values encoded with a recorded video.
Figure 34:
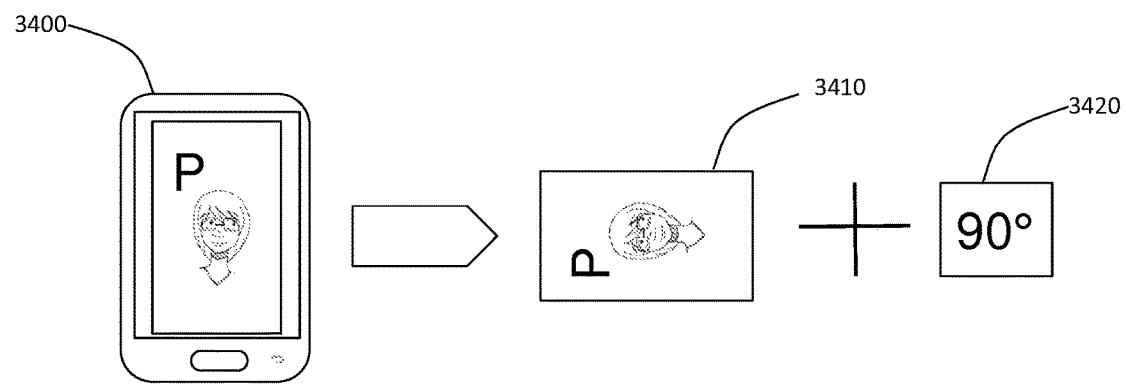
FIG. 34 shows an example of the angle required to rotate a resultant video given the orientation of the recording device for a video recorded in portrait mode.

FIG. 33 shows the some of the elements of the recorded video that are encoded in the video's metadata 3300. These include the video's height dimension in the y-axis 3310, the width dimension in the x-axis 3330 and the orientation angle 3320.

A mobile device running a video messaging application with orientation and aspect ratio correction is described. In this Example, as detailed in FIG. 6, a video captured from a device held in portrait mode 3400 results in a saved video rotated to the left by 90° 3410 and the orientation metadata added is 90° 3420.

In this embodiment, three main operations constitute the application function. These operations are a combination of device-executed actions, server executed actions and user actions.

Figure 35:
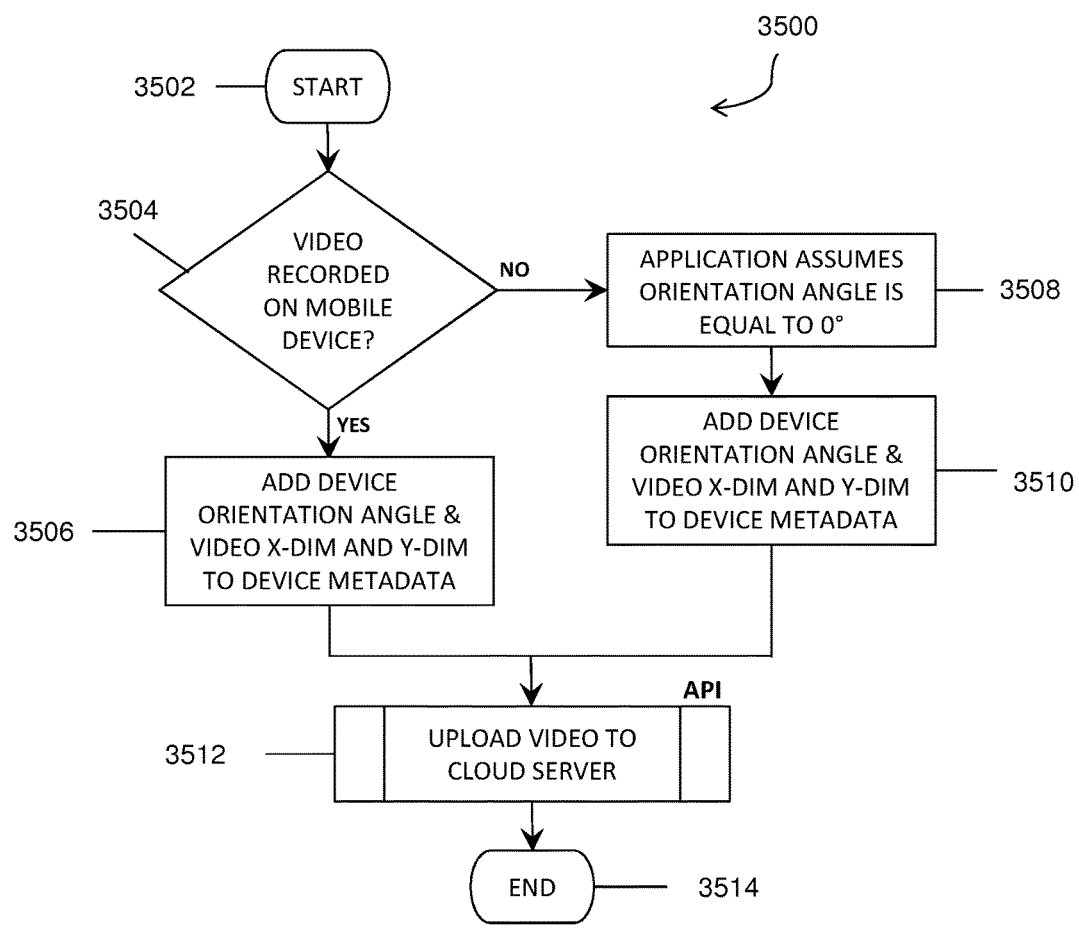
FIG. 35 shows a flowchart representation of metadata added to a video created on a mobile device.

The first of these operations is video capture with respect to resolution and orientation. FIG. 35 illustrates a flowchart representation of the requisite video capture steps and the information encoded in the video file 3500. The operation starts 3502 with the app in the device checking whether the video file was recorded on the device or if the file was uploaded, but recorded on another device such as a conventional digital camera or video recorder in operation 3504. In operation 3506, if YES, then the app adds the video X-dimension (W), Y-dimension (H) and the device orientation angle at time of recording to the video's metadata. In operation 3508, if NO, the app assumes that the video was originally recorded by a conventional video recording device and in operation 3510 adds the video's X-dimension (W) and Y-dimension (H) to the video's metadata. In this case, however, it assumes that the orientation angle is 0° and also adds that to the metadata. In operation 3512, the video is uploaded to the cloud server with the help of the cloud server API.

Figure 36:
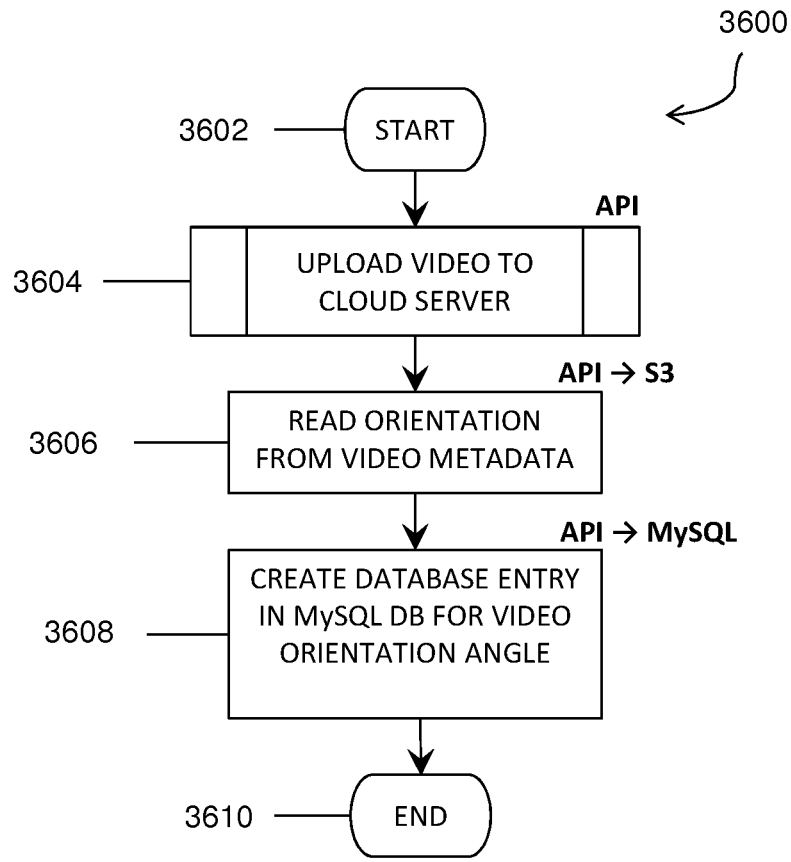
FIG. 36 shows a flowchart representation of orientation data extraction from an encoded video metadata and added to a MySQL database.

FIG. 36 illustrates a flowchart representation of the metadata extraction by the cloud server 3600. The operation starts 3602 with the video uploaded to the cloud server in operation 3604. This step is merely replicated from the previous operation to help describe the subsequent steps. In operation 3606, once the video is uploaded, the API reads the orientation angle from the video metadata in the S3 storage server. In operation 3608, the API creates a new field in the MySQL database for the video's record and adds this orientation angle to this field. Therefore, in addition to the other items that describe a particular video message, the database also now contains the orientation angle of the recording device.

At this stage the video is available for playback when called for by a client or user.

FIG. 37 a-e describes the steps required for video playback on a playback device held in a particular orientation. The key purpose is to ensure that the video playback occurs in the proper orientation when viewed by the playback user and is sized correctly to his playback device's display.

Figure 37A:
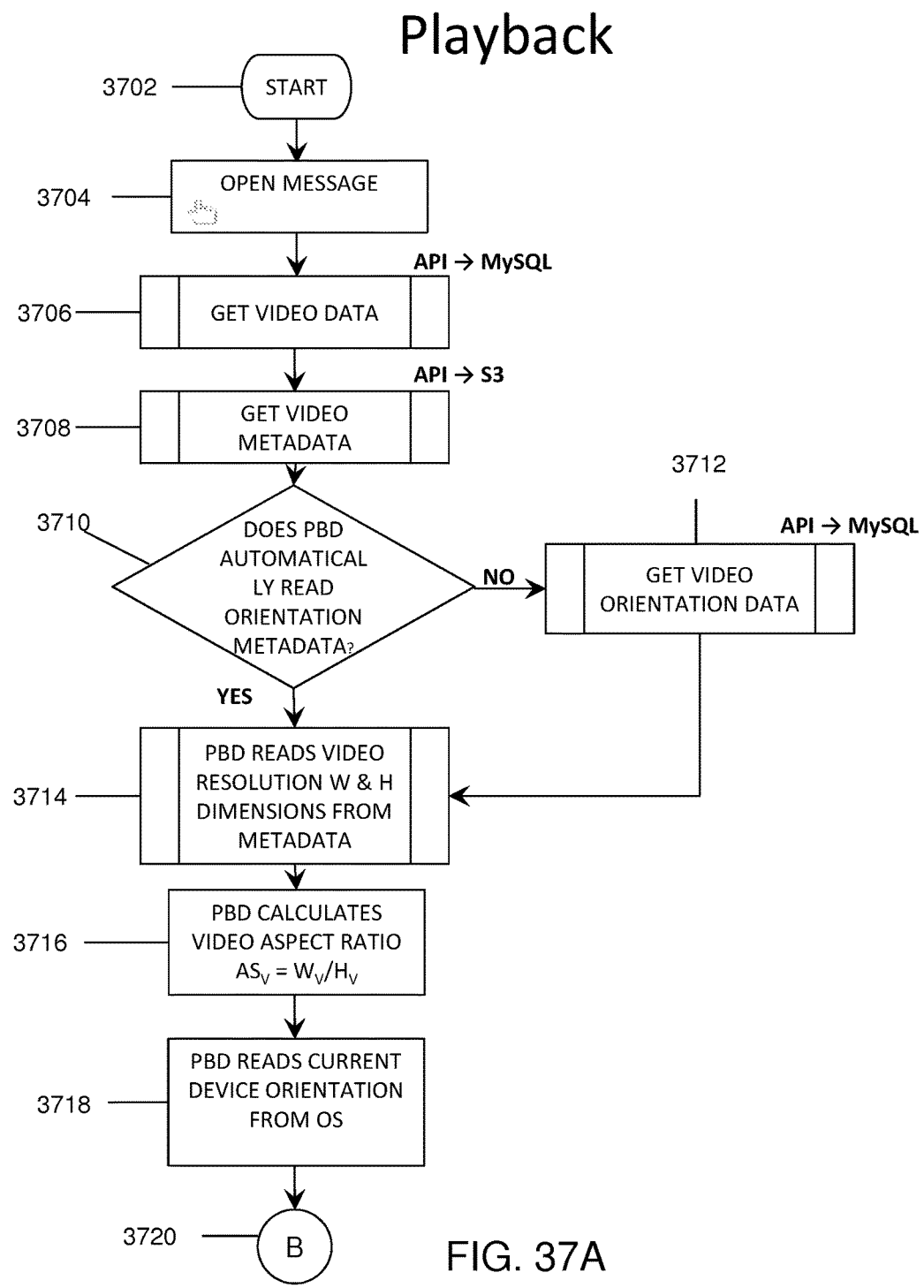
FIG. 37A-F show a flowchart representation of steps required to playback a video on a playback device in the correct orientation.

FIG. 37A illustrates the steps required for video playback on a playback device held in a particular orientation. The operation starts 3702 when the user taps on the message to view it in operation 3704. In operation 3706 the app request the video data from the cloud server database MySQL via the EC2 server API. With this call, the app in the playback device now has the server location of the video, its author's information, duration and other required details. In operation 3708 the app requests, with the assistance of the API, the video metadata to obtain the video dimensions (W and H) and orientation data from the S3 server. In operation 3710 if this cannot be obtained due to the presence of an OEM overlay, in operation 3712 then the app makes an additional call to the MySQL database and obtains the orientation angle.

In operation 3714, the PBD app reads the video resolution W and H dimensions and in operation 3716 calculates the video's aspect ratio, ASV=Wv/Hv. Here the subscript "V" is used to denote the video in the form that it was recorded by the recording device and saved in the server.

In operation 3718, the PBD reads its own orientation from the device's OS.

Figure 37B:
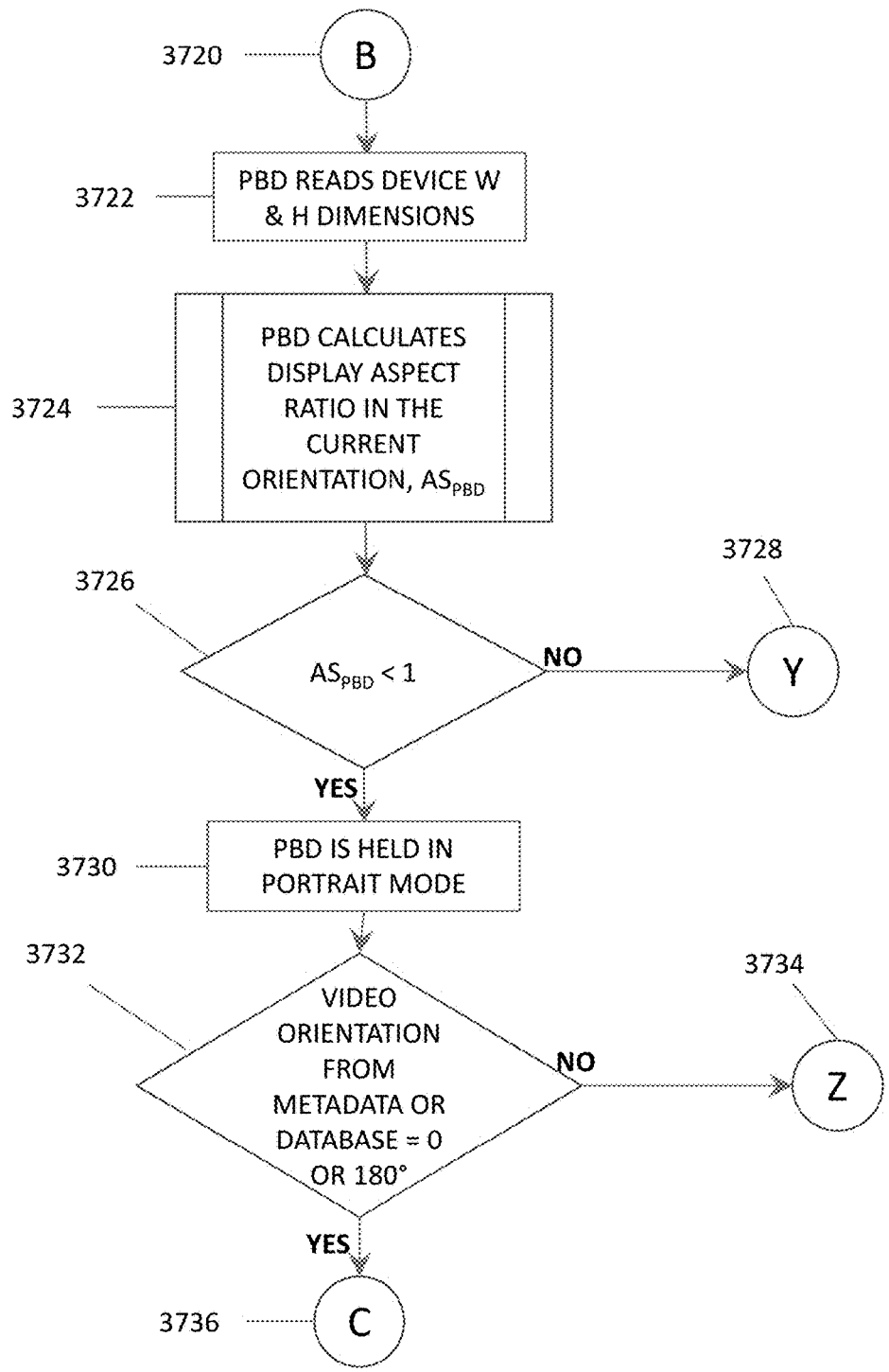

FIG. 37B illustrates the steps required for video playback on a playback device held in a particular orientation. In operation 3722, the PBD reads the dimensions in W and H the dimensions of its own display.

In operation 3724, the PBD calculates its display aspect ratio in the orientation it is currently being held, ASPBD=WPBD/HPBD.

In operation 3726, the system determines if ASPBD is <1, in operation 3730 then the PBD is being held in PORTRAIT mode. In operation 3728 if ASPBD is >1, then the PBD is being held in LANDSCAPE mode.

In operation 3730, the PBD can be held in PORTRAIT mode. In operation, 3732 the system determines if the video orientation angle from the metadata or database is equal to 0° or 180°.

Figure 37C:
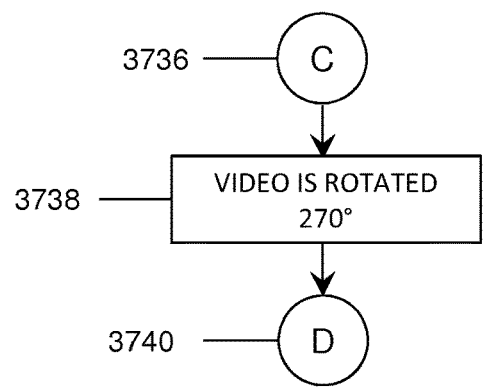

FIG. 37C illustrates the steps required for video playback on a playback device held in a particular orientation if it is determined that the video orientation angle from the meta data is equal to 0° or 180°. In operation 3738 the original video was recorded in landscape mode and therefore must be rotated 270° to render properly on the PBD being held in PORTRAIT mode.

Figure 37D:
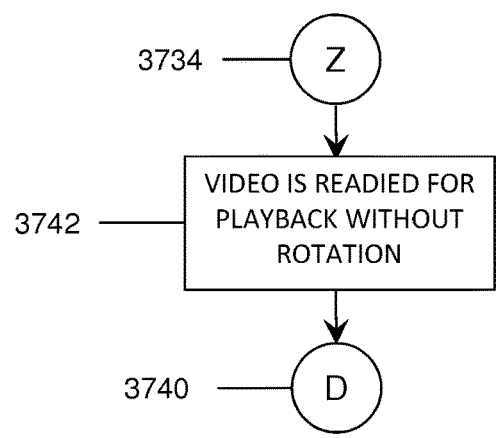

FIG. 37D illustrates the steps required for video playback on a playback device held in a particular orientation if it is determined that the video orientation angle from the meta data is not equal to 0° or 180°. In operation 3742 the PBD can be held in PORTRAIT mode and if the video orientation angle from the metadata or database is equal to 90° or 270°, the original video was recorded also in portrait mode and therefore NO rotation is required to render properly on the PBD being held in PORTRAIT mode.

Figure 37E:
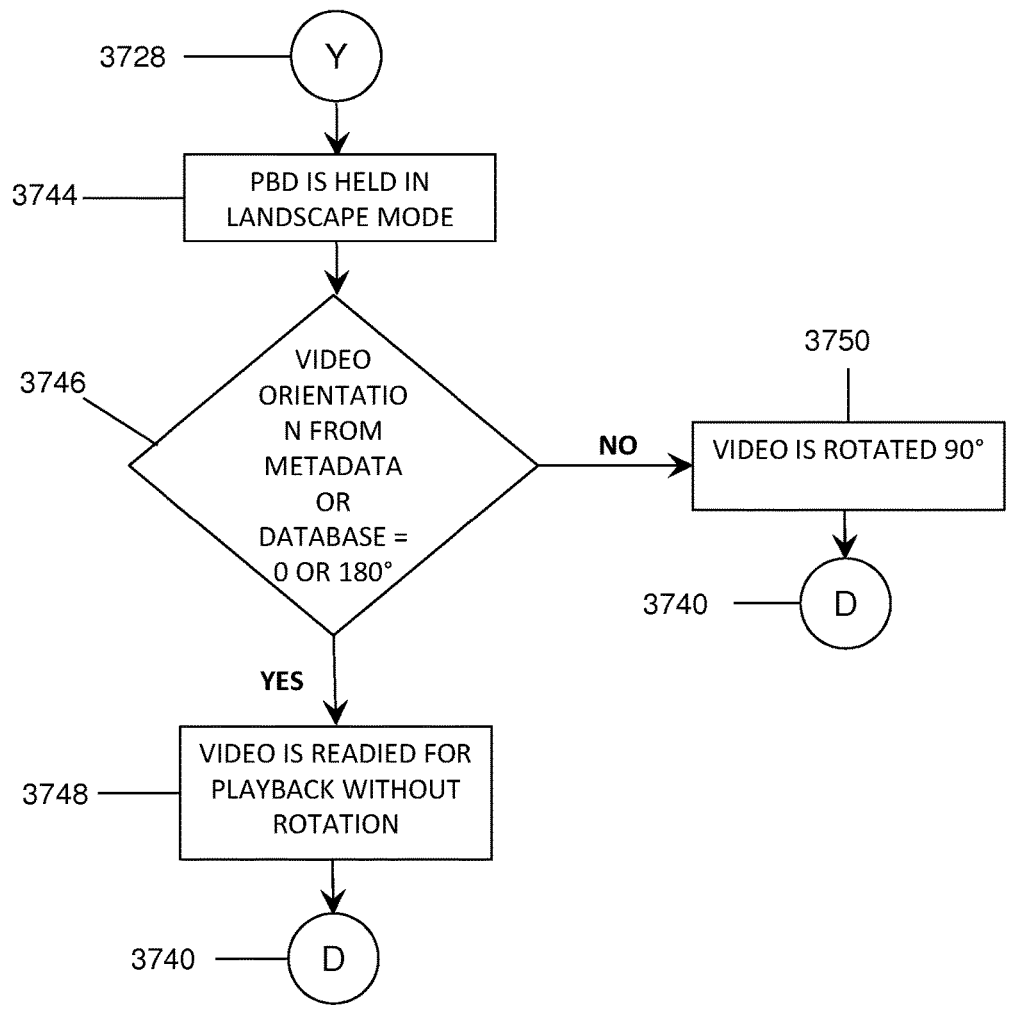

FIG. 37E illustrates the steps required for video playback on a playback device held in a LANDSCAPE mode. In operation 3744 the PBD can be held in LANDSCAPE mode. In operation 3746 it is determined if the video orientation angle from the metadata or database is equal to 0° or 180°, the original video was recorded also in landscape mode and in operation 3748 therefore NO rotation is required to render properly on the PBD being held in LANDSCAPE mode.

Finally, in operation 3750 the PBD can be held in LANDSCAPE mode and if the video orientation angle from the metadata or database is equal to 90° or 270°, the original video was recorded in portrait mode and therefore must be rotated 90° to render properly on the PBD being held in LANDSCAPE mode.

Application of these four cases insures that the video played on the PBD's display will always be in the proper orientation when viewed regardless of device. The orientation angle extraction and additional PBD's call to the database feeds the PBD with the necessary metadata that was originally blocked by the OEM overlay.

At this stage the video is ready to be sized for the PBD's display dimensions. In this way, even though the video was originally recorded in one of the four standard resolutions described earlier, it may be played back on the PBD's display without distortion, stretching, compression, etc.

Figure 37F:
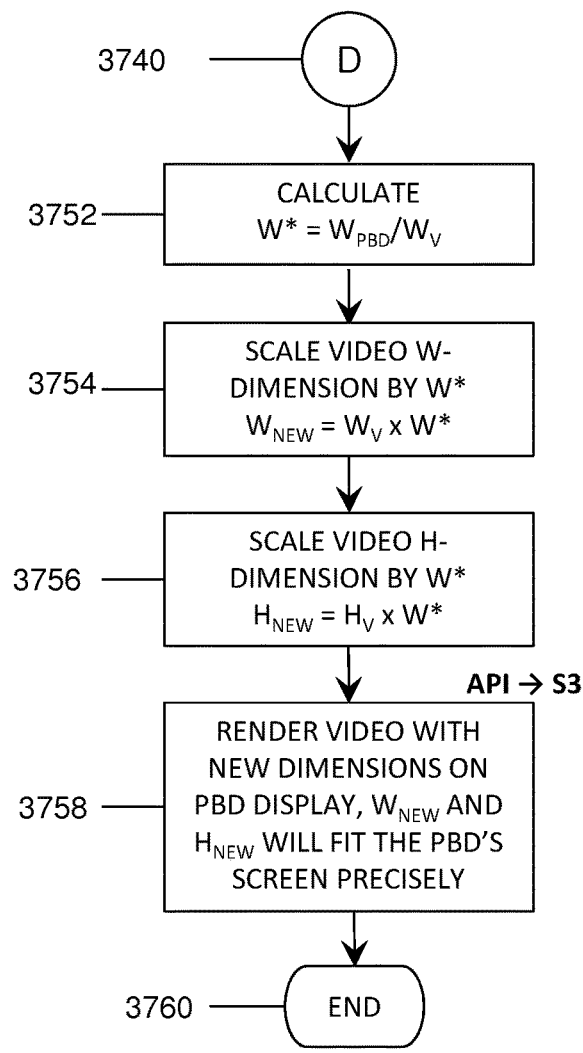

FIG. 37F illustrates the steps for sizing and displaying the video. The operation starts 3740 with the app calculating a W-dimension scaling parameter W*=WPBD/WV in operation 3752. In operation 3754 the video's W-dimension, WV, is scaled by this scaling parameter to obtain the W-dimension required to properly fit the display of the PBD, WNEW=WV×W*. In operation 3756, the video's H-dimension is similarly scaled to obtain the H-dimensions, HNEW=HV×W*, to retain the aspect ratio of the originally recorded video, ASV.

In operation 3758 the video is properly scaled and is rendered on the PBD's display in the correct orientation and in the same aspect ratio as when originally recorded, thus preventing the video from being rotated, stretched, compressed, or incorrectly rendered on the PBD's display.

In one embodiment, the present disclosure relates to a method for image content delivery comprising providing an image file on an electronic device, wherein the image file has metadata related to its display orientation and dimensions, such as display size, aspect ratio and orientation angle, reading some or all of the metadata, extracting some or all of the metadata, adding the extracted metadata to the image file, and transferring the metadata to a playback device wherein the playback device is capable of rendering the image with the correct orientation and dimensions.

The image can be a picture. Picture formats that contain the orientation metadata must conform with the Exchangeable image file format or Exif. The image can also be a video. Video file formats that contain the orientation metadata include the standard H.26x format and its various versions and implementations.

The electronic device can be any device capable of recording or providing an image. The electronic device can also be one that is in data communication with other electronic devices and can send the image to other electronic devices. The device can be a portable electronic device, such as a smartphone or tablet. The device can be used to capture the image, e.g., picture or video. The display orientation can be landscape or portrait. It may be further advantageous to encode the exact orientation angle by use of the recording device's gyroscope. Therefore for devices with circular displays such as the Moto 360 from Samsung Group, images may be displayed in the exact orientation perpendicular to the line of sight of the recipient.

For video files, the video can have a defined duration. The display orientation and dimensions can dynamically change during the duration of the video. The changes can be part of the metadata. The playback device can play the video in the orientation that the display or device is held without distortion or rotation, except for changing the size or dimensions of the video in response to the changing metadata over the duration of the recording, such that the image may be viewed correctly.

In one embodiment, the present disclosure can overcome the difficulty of rendering an image or playing back a video wherein the playback device is running an outdated operating system version (such as versions prior to Android 4.2 for devices running the Android OS) or otherwise cannot read the metadata of the image file on the electronic device. For devices that cannot read, or otherwise utilize the metadata, the image cannot be rendered or played with the correct dimensions or orientation consistently over devices.

In another embodiment, the present disclosure can overcome the difficulty of rendering an image or playing back a video wherein the playback device has overlays that interfere with the reading or extracting of the image file metadata. An overlay is an extensive customization of the stock or default operating system. These overlays run within the OS and modify features such as graphics, user actions, animations, sounds, etc. Due to their ability to modify the stock OSs, these overlays often block or ignore the orientation metadata of an incoming picture or video. As a consequence of this, the incoming video's orientation angle is reverted to 0° and plays on the playback device in landscape mode. If the PBD is being held in any orientation other than landscape, the image will be rotated to clockwise or counterclockwise by 90°.

It should be further noted that although the preferred embodiment is described in detail, other embodiments in having broader terms and constructions are envisioned.

The system and method of the present disclosure are demonstrated as an application written for and operated on devices using the Android operating system. The application can also be created and executed on Apple's iOS, Blackberry OS, Microsoft Windows, Microsoft Mobile, Ubuntu's or other operating systems without losing the look, feel and capabilities of the Android based application.

The system and method of the present disclosure can be created in HTML5 and executed on a compatible web browser. In this embodiment, the use of a web-powered application may potentially remove the device dependency or difficulties that arise from using a native application on different devices with different versions of the operating system.

The system and method of the present disclosure are demonstrated using both the user's device memory and cloud server storage, in some embodiments the present disclosure can use a completely distributed peer-to-peer storage system.

The system and method of the present disclosure can be used on other devices or in other modalities, such as tablets, netbooks, notebooks and laptops, smart watches, wireless enabled digital cameras or video cameras, application on flash drive inserted into any camera enabled device, headphones, wireless & camera enabled TV's (smart TVs), game consoles, VOIP phones, media (MP3) players, virtual reality viewers.

In some embodiments, the playback device has a square display where the number of pixels in the W direction equals that in the H direction. For these devices the following convention can be used by device manufacturers—the orientation that the device is most commonly used is by convention the portrait orientation and this can be assigned by the OS and supplied to the app as described herein. Recent examples include certain smart watches (even the circular ones are actually square cropped displays into circles) and the Blackberry Passport.

The advantages of the present disclosure include, without limitation, i. rendering images (e.g., videos and/or video messages) on mobile devices in the correct orientation so that the image is not rotated; ii. rendering images (e.g., videos and/or video messages) on mobile devices in the correct aspect ratio such that the image is not compressed, stretched or incorrectly rendered on the playback device's display; iii. these advantages extend to a plurality of device display sizes (i.e. multiple devices) and operating system overlays.

VI. Exemplary Speech Prompter Embodiment

Exemplary embodiments of the present disclosure relate to a speech prompter ("prompter") and a video synopsis ("synopsis") for video messaging. Particularly, the present disclosure relates to a prompter for assisting in the efficient and professional creation of a video message. The present disclosure also relates to a synopsis for summarizing or personalizing a video message and/or assisting in the notification of a Recipient to a video message. The present disclosure can be used to enhance any video messaging system, such as, for example, WhatsApp Messenger from WhatsApp inc., Facebook Messenger from Facebook, and Kik Messenger from Kik Interactive Inc., etc.

In one embodiment, the present disclosure relates to a video messaging system comprising a graphic user interface, a camera, a microphone, and a prompter. The prompter can display the text of the message to be delivered on the screen before and as it is be being used to create a video message. By displaying the text on the screen, the User's attention, focus and eyes are directed to the camera or device. The use of a prompter in making a video message eliminates the need of the User to look away at a script, pause to find the correct words, misspeak, etc. Using a prompter generates a more professional and seamless video message. A video message can also be created more efficiently than one without the use of a prompter. In some embodiments, the design of the system can incorporate a rear or forward facing camera, and the camera can be placed in any position on the system or device.

In exemplary embodiments of the present disclosure, the prompter text can be indexed. The transcript of the video message can also be indexed. The indexed text can be used for searching. For example, the video message may be searched to apply tags to the video message to assist in further searches or to categorize the video message. The message may be searched to direct advertising to the User, Recipient or both related to the subject, or other parameters, of the video message.

Exemplary embodiments of the present disclosure also relates to a method of creating a video message using a prompter function comprising the steps of providing text for the prompter; activating a video record icon on a device to automatically start recording wherein the prompter displays the text, and subsequently activating the video record icon a second time to stop recording. The providing of the text can be accomplished by any of the above-mentioned means, e.g., audio-voice recognition, uploading a text file, etc.

Exemplary embodiments of the present disclosure also relates to a video messaging system comprising a graphic user interface, a camera, a microphone, and a synopsis (e.g., banner or icon). The synopsis can be a static text message, a scrolling text message or an icon that can be displayed on the graphic user interface of a Recipient of the video message. The synopsis can be used as a summary of the video message to provide a quick overview of the main point, an introduction or a message about the video. For example, a synopsis for the video of a CEO's address to a company launching a new product can read "New Product Launch Address by CEO." The synopsis can also be used as an indicator of the User or User group to which the message was sent. For examples, a synopsis for a video to the sales team can read "Sales Team."

In exemplary embodiments of the present disclosure relates to a video messaging system comprising a graphic user interface, a camera, a microphone, and Topics, Tags, Hubs, Groups or combinations thereof. Topics are similar to tags for indexing and searching, but work differently. Topics are individual phrases. Topics can be considered categories. Topics are clean and used most often for conversations. Tags are customizable keywords. Tags are used for more precise defining, searching, and qualifying. Tags are also inline words or phrases with no spaces. Tags can be considered custom keywords. Tags are messy and used most often for text.

The underlying video message generated by a User can be tagged with identifying, indexed and searchable metadata. These topics, or topics tagging, or topics indexing, or metadata can be User defined and created, selected from a pre-defined list of tags, provided by the community, or combinations thereof.

The underlying video message generated by a User can also be organized in a Hub. A hub is a feed of conversations that meet certain conditions of privacy, authorship, content, networking or combinations thereof. Hubs can be considered a type of video post streams that help the user to digest the interaction with its network and follow the community and public trends and topics. They are an additional source of data that can be manipulated or indexed. A custom location (or hub) can be for conversations between a specific group of people. Examples of Hubs are video messages that are Most Popular Videos, Trending Conversations, Hot Topics, Most Viewed Videos, Highest Rated Videos, Sent Messages, Received Messages, Public Posts, All Merged, Group Posts, Family Posts, Business Posts, Fun Posts, etc. A hub can also be a for specific members.

Figure 38:
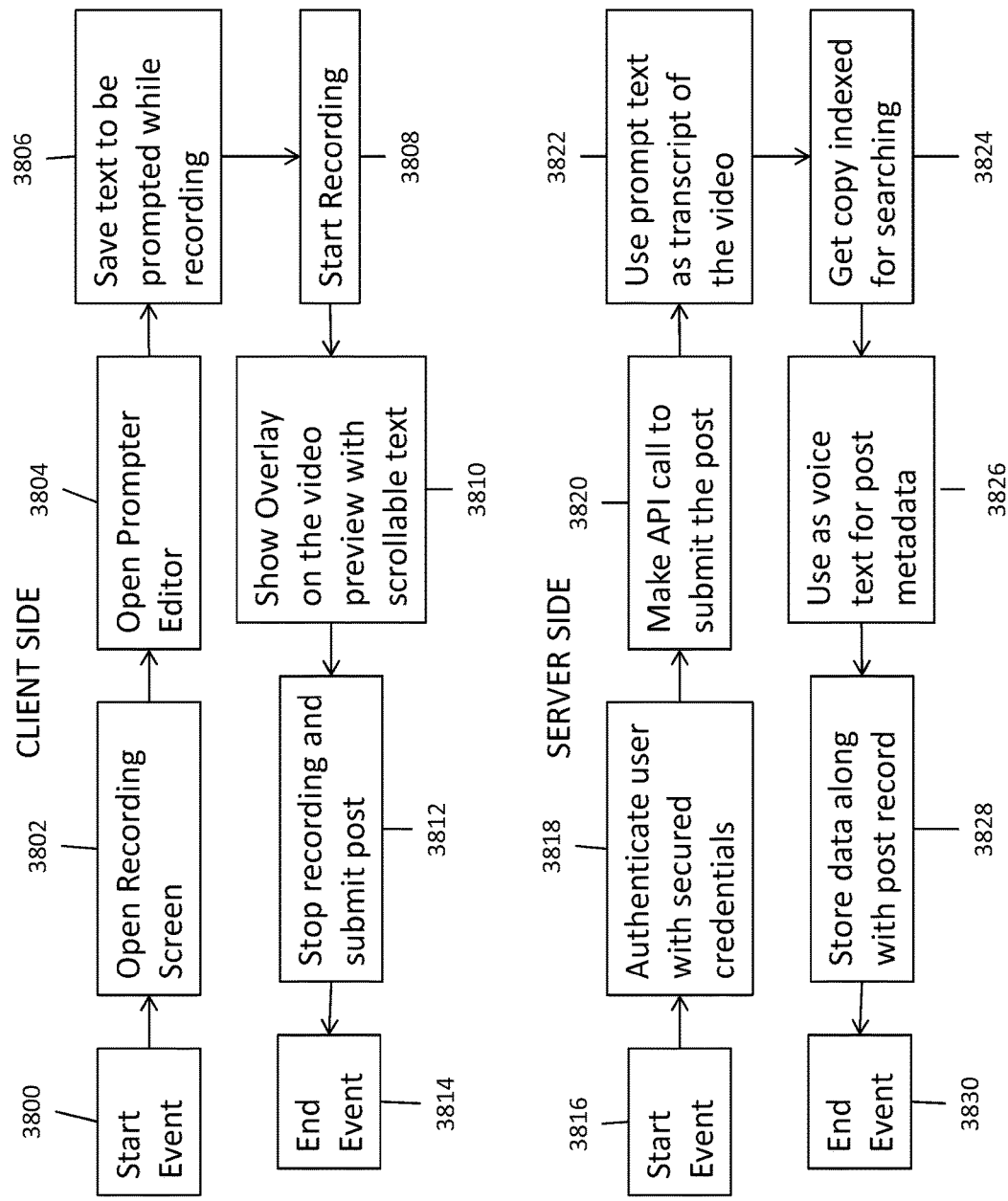
FIG. 38 shows a flow chart representation of an embodiment of the present disclosure having a prompter as experienced by the client (e.g., user) side, and by the server side.

FIG. 38 shows a flow chart representation of an embodiment of the present disclosure having a prompter as experienced by the client (e.g., User) side, and by the server side. The Start Event 3800 can include the User activating the button on the device, such as a smartphone, to open the video messaging application, or recording screen in operation 3802. In operation 3804, the User can then open the prompter feature or editor. In operation 3804, the User can then upload or generate and in operation 3806 save the text to be prompted. In operation 3808, during the recording of the video message, in operation 3810 the prompted text can be overlayed on the graphic user interface for the User to see and read. In operation 3812, the User can activate another button to stop the recording and, in some instances, automatically upload and send the video message.

On the server side, the start event 3816 can include authenticating the user's credentials in operation 3818. In operation 3820 there is a call made to the API to post. In operation 3822 the prompter text is used as a transcript of the video. In operation 3824 a copy is indexed for searching. In operation 3826 the voice data is text is used for metadata. In operation 3828 the data is stored along with the post recorded.

Figure 39:
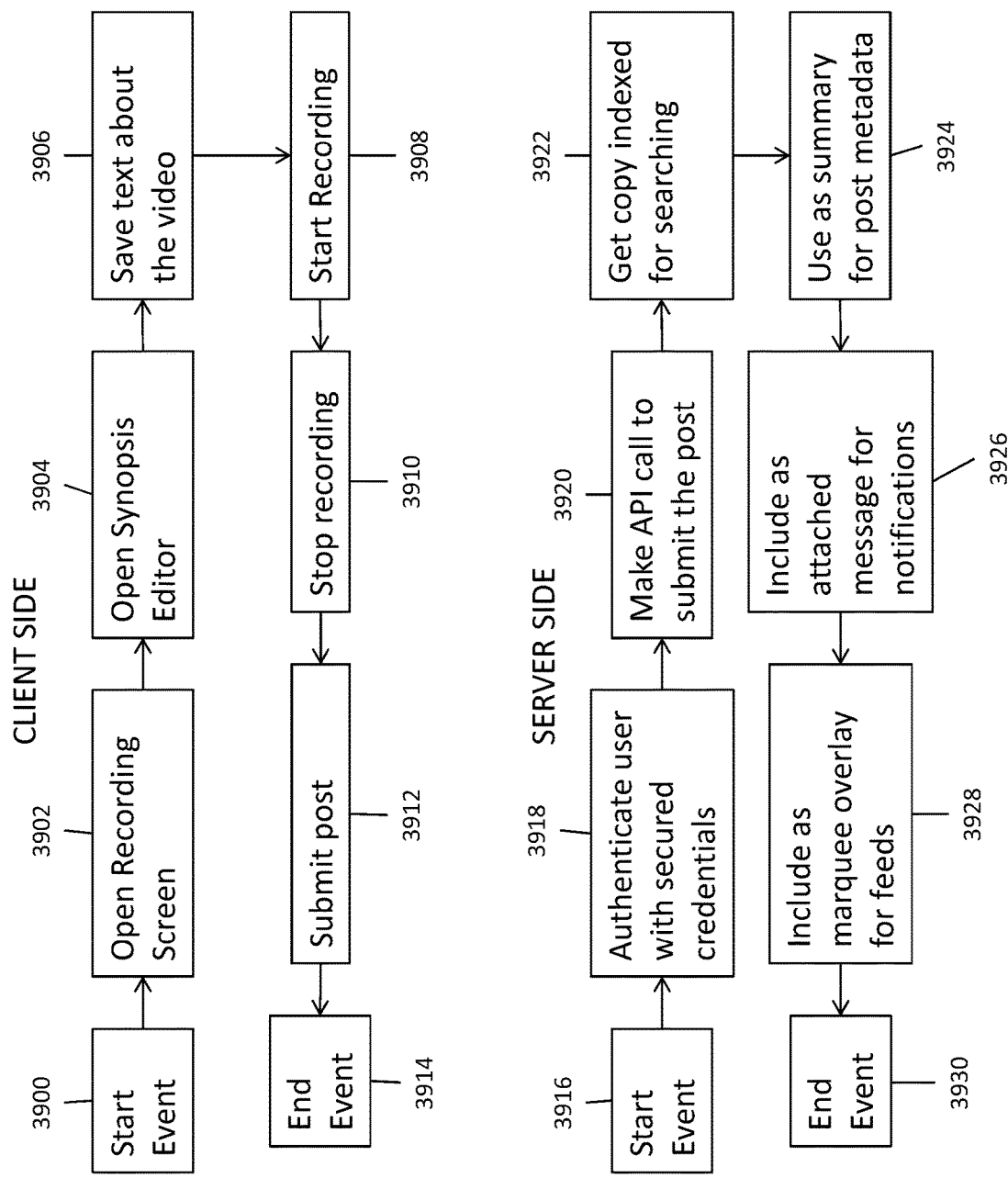
FIG. 39 shows a flow chart representation of an embodiment of the present disclosure having a synopsis as experienced by the client (e.g., User) side, and by the server side.

FIG. 39 shows a flow chart representation of an embodiment of the present disclosure having a synopsis as experienced by the client (e.g., User) side, and by the server side. The Start Event 3900 can include the User activating the button on the device, such as a smartphone, to open the video messaging application, or recording screen in operation 3902. In operation 3904, the User can then open the synopsis feature or editor. In operation 3904, the User can then upload or generate and in operation 3906 save the synopsis text. In operation 3908, the recording of the video message begins and in operation 3910 the recording is stopped. In operation 3912, the User can upload and send the video message.

On the server side, the start event 3916 can include authenticating the user's credentials in operation 3818. In operation 3920 there is a call made to the API to post. In operation 3924 a copy is indexed for searching. In operation 3926 attached messaged is included for notification. In operation 3928 synopsis is included as marquee overlay.

Figure 40:
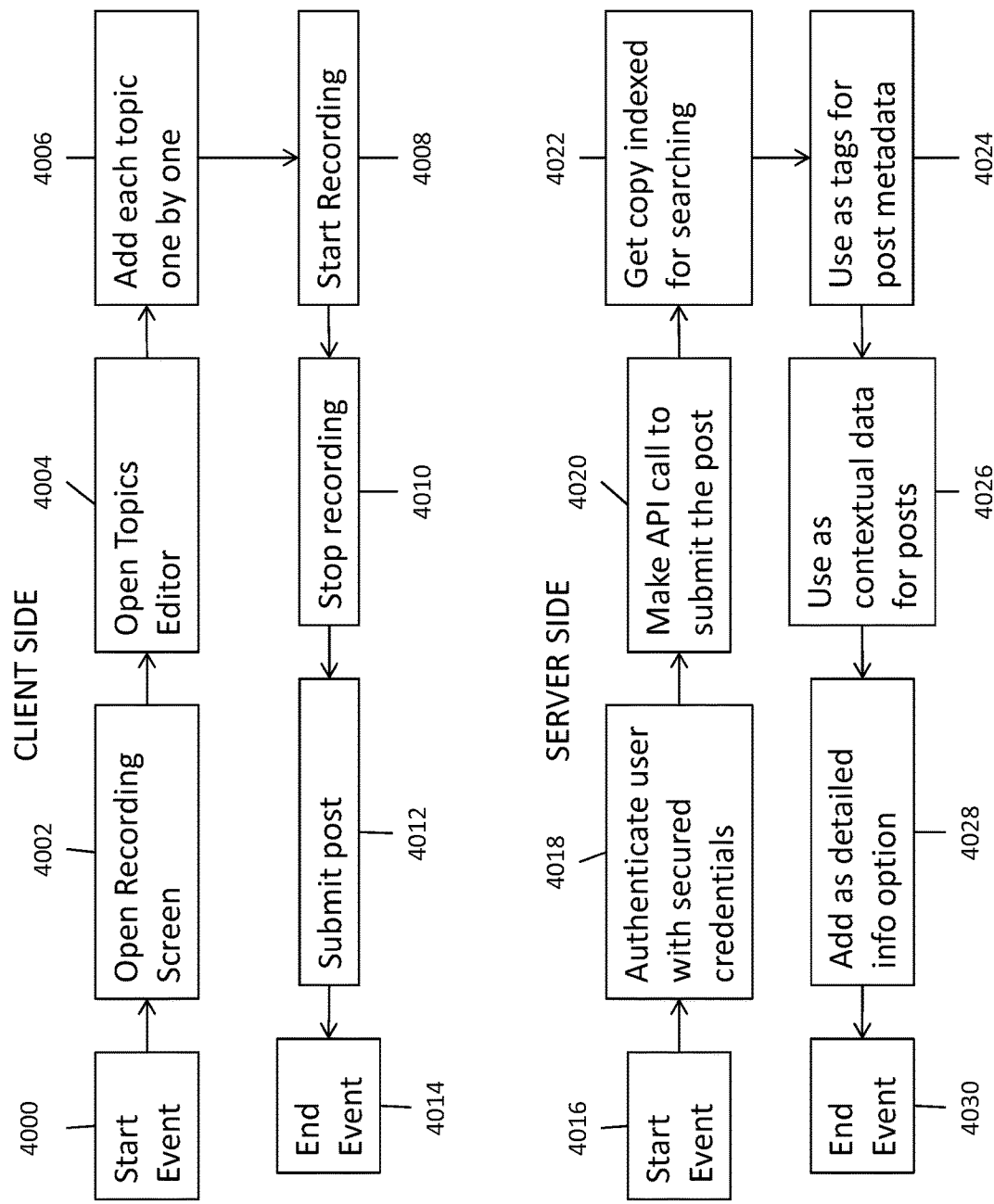
FIG. 40 shows a flow chart representation of an embodiment of the present disclosure having Topics, Tags, Hubs, Groups or combinations thereof as experienced by the client (e.g., User) side, and by the server side.

FIG. 40 shows a flow chart representation of an embodiment of the present disclosure having Topics, Tags, Hubs, Groups or combinations thereof as experienced by the client (e.g., User) side, and by the server side. The Start Event 4000 can include the User activating the button on the device, such as a smartphone, to open the video messaging application, or recording screen in operation 4002. In operation 4004, the User can then open the topics feature or editor. In operation 4006 add each topic one by one. In operation 4008, the recording of the video message begins and in operation 4010 the recording is stopped. In operation 4012, the User can upload and send the video message.

On the server side, the start event 4016 can include authenticating the user's credentials in operation 4018. In operation 4020 there is a call made to the API to post. In operation 4022 a copy is indexed for searching. In operation 4024 tags are used for metadata. In operation 4026 contextual data is used for posts. In operation 4028 detailed information is added into the option.

Figure 41:
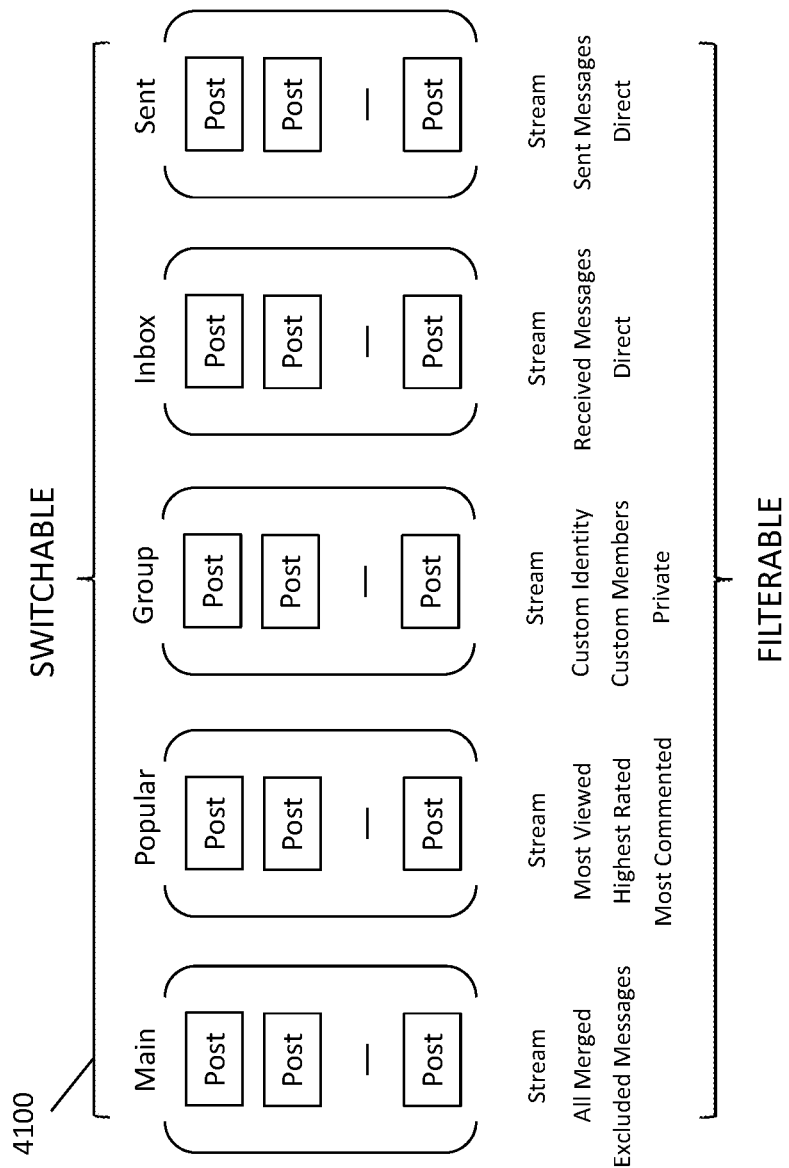
FIG. 41 illustrates a list of exemplary Topics, Tags, Hubs, Groups.

FIG. 41 4100 illustrates a list of exemplary Topics, Tags, Hubs, Groups.

Figure 42:
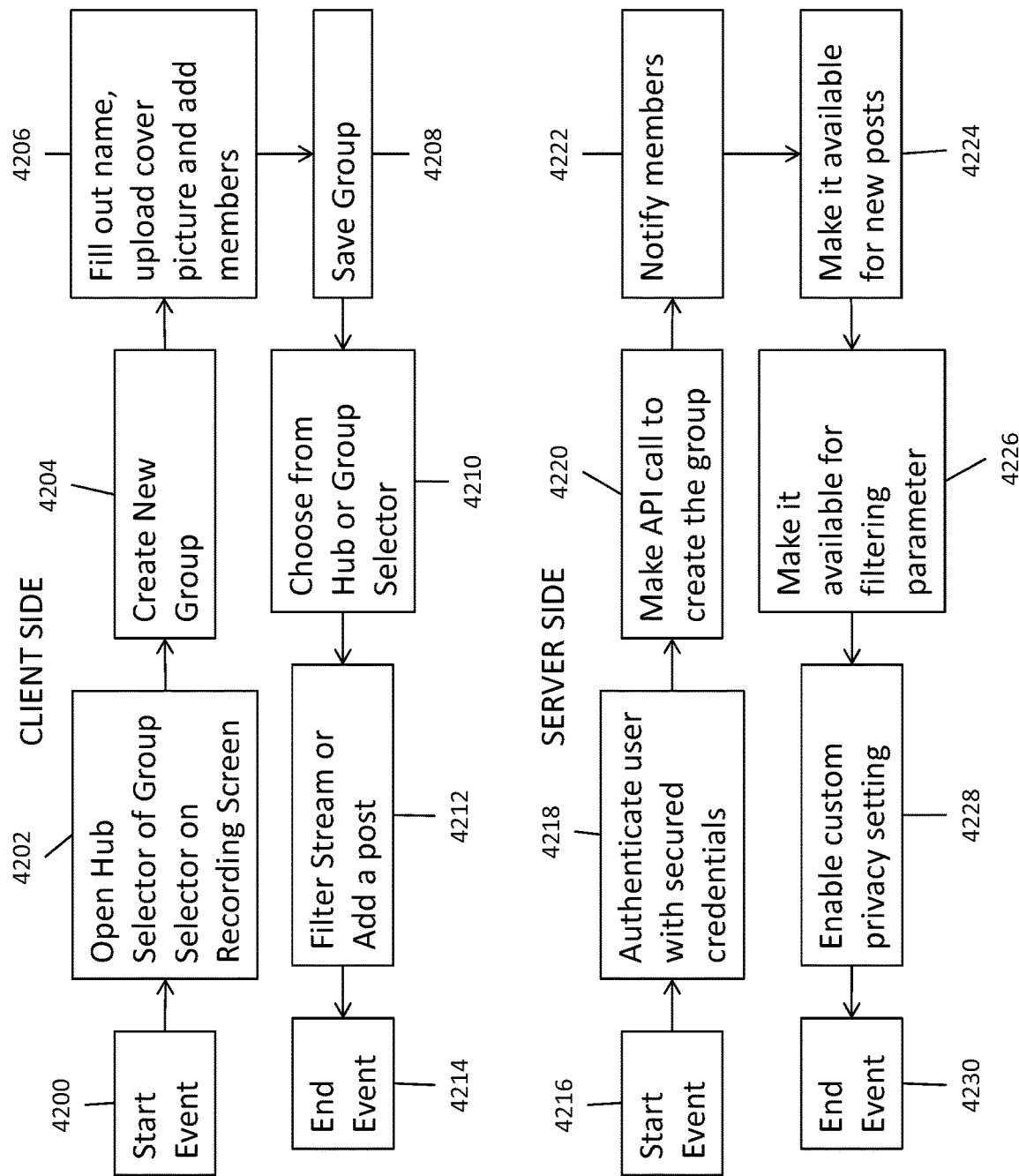
FIG. 42 shows a flow chart representation of an embodiment of the present disclosure having Hubs as experienced by the client (e.g., User) side, and by the server side.

FIG. 42 shows a flow chart representation of an embodiment of the present disclosure having Hubs as experienced by the client (e.g., User) side, and by the server side. The Start Event 4200 can include the User activating the button on the device, such as a smartphone, to open the Hub Selector on Stream or Group Selector on Recording Screens in operation 4202. In operation 4204, the User can create a new group. In operation 4206 the user can fill out the name, upload cover picture, and the members. In operation 4208, the user can save the group. In operation 4210, the user can chose the hub from the group selector. In operation 4210 user can filter stream or upload the video message.

On the server side, the start event 4216 can include authenticating the user's credentials in operation 4218. In operation 4220 there is a call made to the API to post. In operation 4222 the members are notified. In operation 4224 the hub is available for new posts. In operation 4226 it is made available for a filtering parameter. In operation 4228 custom privacy settings are enabled.

The video messaging system can further comprise device memory (e.g., volatile memory or RAM, hard storage, cloud, internal, external, etc.), hardware, an operating system, a speaker or combinations thereof: The video messaging system can be, in part, a smartphone or similar device (e.g., tablet, computer, etc.) running a video messaging application having a prompter or prompter function. The prompter can be displayed on the graphic user interface. The location of the prompter can be customized by the User. The prompter screen can overlay part or all of the graphic user interface. The font and size of the text can be customized by the User.

The text to be used with the prompter can be generated in different ways. The text can be a readable text file or text based file ("text file"). The text file can be accessed by the video messaging system to display on the prompter. The text file can also be created by the User and stored as a text file for later use, or created and used immediately in the next video message. The creation of the text file can be by the User speaking into the speaker and the device converting the speech into text using audio-voice recognition. The text file can also be created by typing the text message. The video messaging system can also have a connection to a server wherein a User can upload a text file from the server. The prompter displays the text during a recording of the video message. The text file can be stored in internal memory, external memory (e.g., SD card), the cloud, etc.

The text of the prompter can be displayed on the graphic user interface. If the text is short, the entire text can be displayed. The displayed text can be static during a video recording. In some embodiments where the text is long and the font type and size are selected by the User so as to be readable, the entire text cannot be displayed at once. The text can be scrolled in the prompter window on the graphic user interface. The rate of the scrolling can be a pre-determined constant value. The rate can be pre-set by the User to scroll at one line every few seconds. For example, if the User can read a line of text at 1 line per second, then the scroll rate can be set at 1 line per second. The prompter window can display from about 1 to about 100 lines of text. The actual number of lines of text will depend on the size of the graphic user interface and the font type and size are selected by the User so as to be readable.

The rate can also be a pre-determined variable rate over time. For example, if the User reads different sections of the text at different rates then the scroll rate can be pre-adjusted to match the rate of which the User can read the text. The rate can also be controlled by touch or gesture. The User can touch or otherwise interact with the screen to manually scroll the text. The degree of scrolling can be dependent on the characteristics of the User's touch or gesture (e.g., swipe, tap, tap and hold, etc.). For example, a short swipe can move the lines slowly or only scroll a few lines. A long swipe can move the lines faster or scroll many lines at once.

The scroll rate can be controlled by audio-voice recognition of the User. As the User reads the text, the device recognizes where in the text the User is. The text scrolls to the next line as the User completes that line. The User can select which line of text, assuming more than one line of text is displayed, for the audio-voice recognition scroll rate to highlight and maintain in a pre-defined spot. For example, a prompter window displays 10 lines of text. The User can selected one of the lines to key to the audio-voice recognition, such as line 2. As the User reads the entire text of line 2 and moves onto line 3, the prompter scrolls one line (i.e., line 3 moves up to line 2). The rate of the scrolling is dependent on the User's pace and reading of the text and can vary from line to line. Similarly, the scroll rate can be controlled by the relative position of the User's eyes. As the User reads the text, the device recognizes the relative position of the User's eyes. The text scrolls to the next line as the User's eyes complete one line and moves to the next line.

The synopsis can be customized by the User. The type, size, appearance, content, location, etc. on the GUI can all be customized. For example, the content can be a set of photos that cycle (e.g., an electronic picture frame).

In some instances, a Recipient of a video message does not know a video message has been sent. The Recipient may not have the video message application open to see that the video message has been received. The Recipient may have registered an email address or other accounts or alert means to receive notification of a new video message from the video message application. The notification (e.g., email or SMS) is usually non descriptive of the video message. In one embodiment, the synopsis can be sent in the notification to the Recipient to inform the Recipient of the video message's content or other characteristic.

The present disclosure also relates to a method of creating a video message having a synopsis comprising the steps of providing text or icon for the synopsis; creating a synopsis; activating a video record icon on a device to automatically start recording, and subsequently activating the video record icon a second time to stop recording, wherein the synopsis is displayed on the graphic user interface of a Recipient of the video message. In some embodiments, the synopsis can be generated in the same manner or means as the prompter text.

The present disclosure also relates to a method of notifying a Recipient of a video message comprising the steps of providing text or icon for a synopsis; creating a synopsis; activating a video record icon on a device to automatically start recording, and subsequently activating the video record icon a second time to stop recording, wherein the synopsis is sent to the Recipient's electronic mail account to notify the Recipient of the video message.

In some embodiments, the use of hubs makes the video conversations easier to organize. It is a way to organize different types or conversations into the same category matching the people involved, topics, privacy, intimacy, discovery, exploration, etc.

The underlying video message generated by a User can also be placed in a Group. Examples of Groups are Family Group, Business Group, Company Department Group like Sales or Design or Development, a Deal Room, Brainstorming Session, Community, etc.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method of forming a multi-user video message thread, the method comprising:
   receiving, at a server a video message captured by a first user device, the video message being associated with a first user account and being stored in a database by the server;
   transmitting a notification to a contact associated with the user account that the video message is viewable by the contact;
   receiving, at the server, in response to the notification, a response video message captured by a second user device, the response video message being associated with a second user account belonging to the contact and being stored in the database by the server;
   forming, by the server, a video thread that includes the video message and the response video message; and
   streaming the video thread to a third user device to facilitate playback of the video message and the response video message in sequence by the third user device.

2. The method of claim 1, further comprising:
   receiving, at the server, a further response video message to the video thread from the third user device;
   adding the further response video message to the video thread; and
   streaming the video thread to one of the first user device, the second user device, or a fourth user device to facilitate playback of the video message, the response video message, and the further response video message in sequence by the first user device, the second user device, or the fourth user device.

3. The method of claim 1, further comprising:
   receiving, at the server, an indication from the first user device indicating that the user associated with the first user account wishes to share the video message with the contact.

4. The method of claim 3, further comprising:
   preventing the contact from distributing the video message to others.

5. The method of claim 1, further comprising:
   receiving, at the server, an indication from the first user device indicating that the user associated with the first user account wishes to share the video message with all contacts associated with the first user account.

6. The method of claim 1, further comprising:
   generating, by the server, supplemental data to embed in the video message or the response video message based on a transcription of an audio component of the video message or the response video message and a comparison of words or phrases included in the transcription to a library of words.

7. The method of claim 6, further comprising:
   embedding the supplemental data in the video message or the response video message programmatically upon determining that one of the words or phrases included in the transcription are also included in the library of words.

8. The method of claim 6, wherein embedding the supplemental data comprises embedding the supplemental data in the video message or response video message so that display of the supplemental data is aligned with an occurrence of the one of the words or phrases during playback.

9. The method of claim 6, wherein the supplemental data includes a selectable object that is selectable during playback of the video message or during playback the response video message and selection of the selectable object causes one or more actions to be performed.

10. A system for forming a multi-user video message thread, the system comprising:
    a data storage device; and
    a server having a processor operatively coupled to the data storage device, wherein the server is operative coupled to a communication network and is programmed to:
    receive, via the communication network, a video message captured by a first user device, the video message being associated with a first user account and being stored in a database by the server;
    transmit, via the communication network, a notification to a contact associated with the user account that the video message is viewable by the contact;
    receive, via the communication network, in response to the notification, a response video message captured by a second user device, the response video message being associated with a second user account belonging to the contact and being stored in the database by the server;
    form a video thread that includes the video message and the response video message; and
    stream the video thread to a third user device to facilitate playback of the video message and the response video message in sequence by the third user device.

11. The system of claim 10, wherein the server is further programmed to:
    receive, via the communications network, a further response video message to the video thread from the third user device;
    add the further response video message to the video thread; and
    stream the video thread to one of the first user device, the second user device, or a fourth user device to facilitate playback of the video message, the response video message, and the further response video message in sequence by the first user device, the second user device, or the fourth user device.

12. The system of claim 10, wherein the server is further programmed to:
   receive, via the communications network, an indication from the first user device indicating that the user associated with the first user account wishes to share the video message with the contact.

13. The system of claim 12, wherein the server is further programmed to:
   prevent the contact from distributing the video message to others.

14. The system of claim 10, wherein the server is further programmed to:
   receive, via the communications network, an indication from the first user device indicating that the user associated with the first user account wishes to share the video message with all contacts associated with the first user account.

15. The system of claim 10, wherein the server is further programmed to:
   generate supplemental data to embed in the video message or the response video message based on a transcription of an audio component of the video message or the response video message and a comparison of words or phrases included in the transcription to a library of words.

16. The system of claim 14, wherein the server is further programmed to:
   embed the supplemental data in the video message or the response video message upon determining that one of the words or phrases included in the transcription are also included in the library of words.

17. The system of claim 14, wherein the server is programmed to embed the supplemental data in the video message or response video message so that display of the supplemental data is aligned with an occurrence of the one of the words or phrases during playback.

18. The system of claim 14, wherein the supplemental data includes a selectable object that is selectable during playback of the video message or during playback the response video message and selection of the selectable object causes one or more actions to be performed.

* * * * *

UNITED STATES PATENT AND TRADEMARK OFFICE
CERTIFICATE OF CORRECTION

PATENT NO. : 10,356,022 B2
APPLICATION NO. : 15/324510
DATED : July 16, 2019
INVENTOR(S) : Joyce et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this
Twenty-fourth Day of November, 2020

Andrei Iancu
*Director of the United States Patent and Trademark Office*